United States Patent
Blackburn et al.

(10) Patent No.: US 8,606,693 B2
(45) Date of Patent: Dec. 10, 2013

(54) SYSTEMS, METHOD, APPARATUSES, AND COMPUTER PROGRAM PRODUCTS FOR FACILITATING PRODUCT TRANSACTIONS

(75) Inventors: Christopher Blackburn, Charlotte, NC (US); Jarrette Brathwaite, Charlotte, NC (US); James Bumgarner, Charlotte, NC (US); John M. Butler, Charlotte, NC (US); Timothy Hackett, Charlotte, NC (US); Jason Jones, Charlotte, NC (US); Matt Lucas, Charlotte, NC (US); Scott Lukse, Matthews, NC (US); Timothy K. Shea, Charlotte, NC (US)

(73) Assignee: Great Direct Concepts, LLC, Charlotte, NC (US)

( * ) Notice: Subject to any disclaimer, the term of this patent is extended or adjusted under 35 U.S.C. 154(b) by 100 days.

(21) Appl. No.: 13/143,662

(22) PCT Filed: Jan. 8, 2010

(86) PCT No.: PCT/US2010/020471
§ 371 (c)(1),
(2), (4) Date: Jul. 7, 2011

(87) PCT Pub. No.: WO2010/080979
PCT Pub. Date: Jul. 15, 2010

(65) Prior Publication Data
US 2011/0276467 A1    Nov. 10, 2011

Related U.S. Application Data
(60) Provisional application No. 61/143,650, filed on Jan. 9, 2009.

(51) Int. Cl.
*G06Q 40/00* (2012.01)
*G06Q 40/02* (2012.01)
(52) U.S. Cl.
CPC .............. *G06Q 40/025* (2013.01); *G06Q 40/00* (2013.01); *G06Q 40/02* (2013.01)
USPC ............................................... 705/38; 705/35
(58) Field of Classification Search
CPC ............................. G06Q 40/025; G06Q 40/00
USPC ........................................................ 705/38
See application file for complete search history.

(56) References Cited

U.S. PATENT DOCUMENTS 5,323,315 A * 6/1994 Highbloom ................. 705/38
5,774,883 A   6/1998 Andersen et al.
(Continued)

OTHER PUBLICATIONS

International Search Report and Written Opinion for International Application No. PCT/US2010/20471, mailed Mar. 24, 2010.

*Primary Examiner* — Kirsten Apple
*Assistant Examiner* — Joan Goodbody
(74) *Attorney, Agent, or Firm* — Alston & Bird LLP

(57) ABSTRACT

Methods, apparatuses, and computer program products are provided for facilitating financing of a product transaction. A method may include determining a maximum available back-end product for the product transaction as a function of one or more of a target payment limit or a total advance limit. The method may also include determining a maximum available back-end spread for the product transaction as a function of the target payment limit. The method may further include presenting the maximum available back-end product and the maximum available back-end spread. Corresponding apparatuses and computer program products are also provided.

32 Claims, 49 Drawing Sheets

(56) References Cited

U.S. PATENT DOCUMENTS

| | | | |
|---|---|---|---|
| 7,006,988 B2* | 2/2006 | Lin et al. | 705/26.81 |
| 7,249,322 B2* | 7/2007 | Jones et al. | 715/751 |
| 7,593,865 B2* | 9/2009 | Cirulli et al. | 705/26.61 |
| 7,599,860 B2* | 10/2009 | Bird et al. | 705/26.5 |
| 7,827,099 B1* | 11/2010 | Cotton | 705/38 |
| 2001/0011246 A1* | 8/2001 | Tammaro | 705/38 |
| 2001/0049653 A1* | 12/2001 | Sheets | 705/38 |
| 2002/0055851 A1* | 5/2002 | Jacobs et al. | 705/1 |
| 2002/0152157 A1 | 10/2002 | Stoyanov et al. | |
| 2003/0041019 A1* | 2/2003 | Vagim et al. | 705/38 |
| 2004/0078320 A1* | 4/2004 | DeFrancesco et al. | 705/38 |
| 2004/0177032 A1* | 9/2004 | Bradley et al. | 705/38 |
| 2005/0027646 A1* | 2/2005 | Hall et al. | 705/38 |
| 2005/0108028 A1* | 5/2005 | Arehart | 705/1 |
| 2005/0165673 A1 | 7/2005 | Brock | |
| 2005/0278249 A1* | 12/2005 | Jones et al. | 705/38 |
| 2007/0136162 A1* | 6/2007 | Thibodeau et al. | 705/35 |
| 2007/0136163 A1* | 6/2007 | Bell | 705/35 |
| 2007/0143195 A1* | 6/2007 | Bell et al. | 705/35 |
| 2007/0276749 A1* | 11/2007 | Vagim et al. | 705/38 |
| 2007/0288271 A1* | 12/2007 | Klinkhammer | 705/4 |
| 2008/0183616 A1* | 7/2008 | Hankey et al. | 705/38 |
| 2009/0055310 A1* | 2/2009 | Chandran et al. | 705/38 |
| 2009/0099958 A1* | 4/2009 | Choi | 705/38 |
| 2009/0132348 A1* | 5/2009 | Bria et al. | 705/10 |
| 2010/0042491 A1* | 2/2010 | Halleck et al. | 705/14.25 |

* cited by examiner

SYSTEMS, METHOD, APPARATUSES, AND COMPUTER PROGRAM PRODUCTS FOR FACILITATING PRODUCT TRANSACTIONS

CROSS-REFERENCE TO RELATED APPLICATIONS

This application claims priority to U.S. Provisional Patent Application No. 61/143,650, filed on Jan. 9, 2009, the contents of which are incorporated herein by reference.

TECHNOLOGICAL FIELD

Embodiments of the invention relate generally to systems, methods, apparatuses, and computer program products for facilitating product transactions. More particularly, embodiments of the invention provide business solutions for product dealers, with a focus on structuring of product transaction. In this regard, some embodiments of the invention relate to a desking tool and dealer management system that may be used by automotive dealerships for structuring and optimization of parameters of a sale.

BACKGROUND

Desking Tools

A desking tool is a software program that helps product dealerships (e.g., automotive dealerships) structure deals and maximize both opportunity and profitability. A customer seeking to finance a purchase of a product, such as a vehicle, may face financing restrictions. These financing restrictions may be imposed by lenders based on various factors including, for example, the customer's income, credit history and/or other factors taken into account by lenders. In this regard, lenders generally evaluate a customer's ability to pay for a vehicle and may limit payment amounts. Lenders also protect their business interest by limiting loan amounts according to the value of the collateral (the vehicle). This is achieved by limiting advance or total advance also known as LTV (loan-to-value).

Because lenders limit payment amounts, auto dealerships may structure deals "backwards." This means the dealership begins with a target payment and then determines which vehicles in their inventory can be sold to the customer within the parameters of the target payment and lender guidelines. Vehicle prices may be established as a function of a target payment and advance (amount a lender is willing to loan against a particular vehicle).

Structuring auto deals may involve establishing sales price, applicable trade allowance, and the selling price of back-end products including warranties, GAP insurance, and other ancillary products. Structuring auto deals may further take into account taxes, fees, cash down payment, payoff amounts on trades, and/or similar factors. These factors may be established with interest rates and terms that vary by vehicle and customer. Factors affecting the structure of a deal may include, but are not limited to:
  a. Customer income
  b. Customer debt and obligations
  c. DTI—debt to income ratios allowed by lenders
  d. PTI—payment to income ratios allowed by lenders
  e. Target payment—established by the lender or customer
  f. Cash down payment
  g. Trade allowance
  h. Trade equity—difference between trade allowance and payoff of trade
  i. Advance amount: amount loaned against sale price of vehicle
  j. Total advance amount: advance plus tax, tag, fees, and products such as warranty and GAP insurance, etc.
  k. Vehicle cost
  l. Taxes & fees
  m. Buy rate—base interest rate which lender is willing to extend credit
  n. Spread—optional interest added by dealer to buy rate for profit
  o. Contract rate—interest rate at which customer is contracted (equal to buy rate+spread)
  p. Term—# months of loan
  q. Number of days to $1^{st}$ payment Structuring a deal may require manipulation of these variables in mathematical equations. Dealerships may use desking tools to facilitate establishing a selling price and deal structure that optimizes front-end profit. These tools quickly run complex calculations on a dealership's entire inventory and identify the best vehicles for any customer. After calculations are run, a list of vehicles that meet the payment and advance criteria may be presented to the user, commonly sorted by front-end gross. Front-end gross is the profit earned on the sale of the vehicle itself.

However, existing desking tools do not take into account all of the profits that a dealership may earn on a transaction and accordingly, dealerships may lose available profit through use of existing desking tools.

Dealer Management Systems

Dealer Management Systems assist dealerships in structuring deals. A dealer management system comprises a bundled system created specifically for car dealerships but, which may also be adapted for other product dealers, such as boat, RV, and power sports dealers. These systems often utilize software catering to the needs of the finance, sales, parts, inventory, and administrative components of running the dealership.

Dealer management system software typically includes support for various aspects of running a dealership such as tracking vehicle inventory, tracking sales, contracting and reporting, finance and insurance calculations, menu selling systems, tracking customers (and customer follow up), accounting, managing the dealer website, and calculating employee commissions.

BRIEF SUMMARY OF SOME EXAMPLES OF THE INVENTION

Methods, apparatuses, and computer program products are herein provided for facilitating product transactions. In this regard, methods, apparatuses, and computer program products are provided that may provide several advantages to computing devices, lenders, product dealerships, and customers. Example embodiments of the invention provide for the determination and presentation of maximum available back-end product and maximum available back-end spread for a product transaction. Dealers may use the presented maximum available back-end product and maximum available back-end spread to optimize their back-end gross on a product transaction. In this regard, example embodiments of the invention further facilitate the application of available back-end spread and available back-end product by directing display of the determined maximum available back-end product and maximum available back-end spread on a user interface allowing a user to adjust one or more adjustable items of a deal structure to enable utilization of the available back-end spread and available back-end product. In addition to the aforementioned advantages, example embodiments of the invention as subsequently described provide several other advantages that will become readily apparent to one having ordinary skill in the art.

According to a first example embodiment, a method for facilitating financing of a product transaction is provided. The method of this example embodiment comprises determining a maximum available back-end product for the product transaction as a function of one or more of a target payment limit or a total advance limit. The method of this example embodiment also comprises determining a maximum available back-end spread for the product transaction as a function of the target payment limit. The method of this example embodiment further comprises presenting the maximum available back-end product and the maximum available back-end spread.

In another example embodiment, an apparatus for facilitating financing of a product transaction is provided. The apparatus of this example embodiment comprises at least one processor. The at least one processor of this example embodiment is configured to cause the apparatus to determine a maximum available back-end product for the product transaction as a function of one or more of a target payment limit or a total advance limit. The at least one processor of this example embodiment is also configured to cause the apparatus to determine a maximum available back-end spread for the product transaction as a function of the target payment limit. The at least one processor of this example embodiment is configured to further cause the apparatus to present the maximum available back-end product and the maximum available back-end spread.

In another example embodiment, a computer program product for facilitating financing of a product transaction is provided. The computer program product of this example embodiment includes at least one computer-readable storage medium having computer-readable program instructions stored therein. The program instructions of this example embodiment comprise program instructions configured to determine a maximum available back-end product for the product transaction as a function of one or more of a target payment limit or a total advance limit. The program instructions of this example embodiment also comprise program instructions configured to determine a maximum available back-end spread for the product transaction as a function of the target payment limit. The program instructions of this example embodiment further comprise program instructions configured to present the maximum available back-end product and the maximum available back-end spread.

In another example embodiment, an apparatus for facilitating financing of a product transaction is provided. The apparatus of this example embodiment comprises means for determining a maximum available back-end product for the product transaction as a function of one or more of a target payment limit or a total advance limit. The apparatus of this example embodiment also comprises means for determining a maximum available back-end spread for the product transaction as a function of the target payment limit. The apparatus of this example embodiment further comprises means for presenting the maximum available back-end product and the maximum available back-end spread.

In another example embodiment, a method for facilitating rollback of one or more of an amount financed or a payment amount for a product transaction is provided. The method of this example embodiment comprises providing a plurality of adjustable items that may be adjusted to rollback the one or more of the amount financed or the payment amount. The method of this example embodiment further comprises determining an adjustment of one or more adjustable items. The method of this example embodiment additionally comprises determining one or more of an adjusted amount financed or an adjusted payment amount based at least in part on the determined adjustment. The method of this example embodiment also comprises providing the determined one or more of the adjusted amount financed or the adjusted payment.

In another example embodiment, an apparatus for facilitating rollback of one or more of an amount financed or a payment amount for a product transaction is provided. The apparatus of this example embodiment comprises at least one processor. The at least one processor of this example embodiment is configured to cause the apparatus to provide a plurality of adjustable items that may be adjusted to rollback the one or more of the amount financed or the payment amount. The at least one processor of this example embodiment is configured to further cause the apparatus to determine an adjustment of one or more adjustable items. The at least one processor of this example embodiment is configured to additionally cause the apparatus to determine one or more of an adjusted amount financed or an adjusted payment amount based at least in part on the determined adjustment. The at least one processor of this example embodiment is configured to also cause the apparatus to provide the determined one or more of the adjusted amount financed or the adjusted payment.

In another example embodiment, a computer program product for facilitating rollback of one or more of an amount financed or a payment amount for a product transaction is provided. The computer program product of this example embodiment includes at least one computer-readable storage medium having computer-readable program instructions stored therein. The program instructions of this example embodiment comprise program instructions configured to provide a plurality of adjustable items that may be adjusted to rollback the one or more of the amount financed or the payment amount. The program instructions of this example embodiment further comprise program instructions configured to determine an adjustment of one or more adjustable items. The program instructions of this example embodiment additionally comprise program instructions configured to determine one or more of an adjusted amount financed or an adjusted payment amount based at least in part on the determined adjustment. The program instructions of this example embodiment additionally comprise program instructions configured to provide the determined one or more of the adjusted amount financed or the adjusted payment In another example embodiment, an apparatus for facilitating rollback of one or more of an amount financed or a payment amount for a product transaction is provided. The apparatus of this example embodiment comprises means for providing a plurality of adjustable items that may be adjusted to rollback the one or more of the amount financed or the payment amount. The apparatus of this example embodiment further comprises means for determining an adjustment of one or more adjustable items. The apparatus of this example embodiment additionally comprises means for determining one or more of an adjusted amount financed or an adjusted payment amount based at least in part on the determined adjustment. The apparatus of this example embodiment also comprises means for providing the determined one or more of the adjusted amount financed or the adjusted payment.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWINGS

Figure 1:
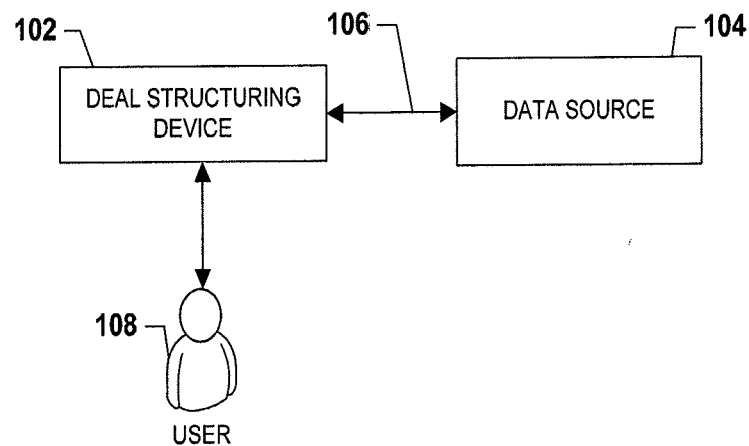
Figure 2:
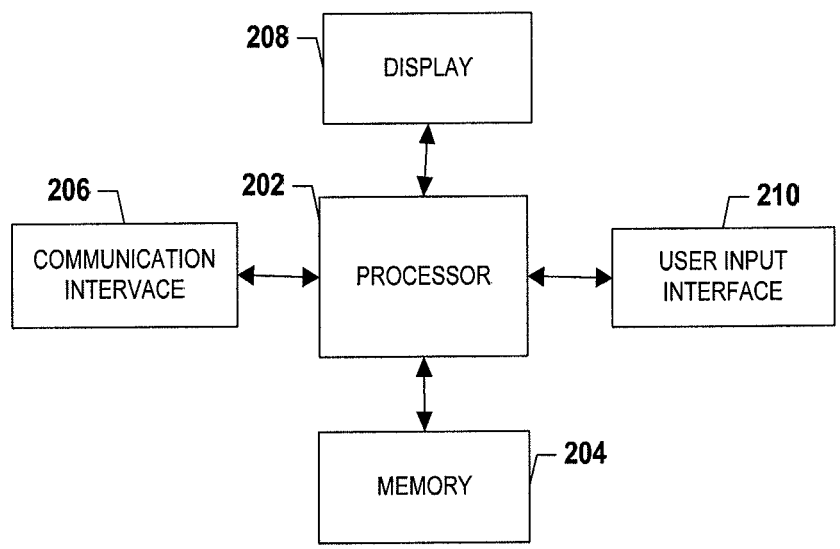
Figure 6:
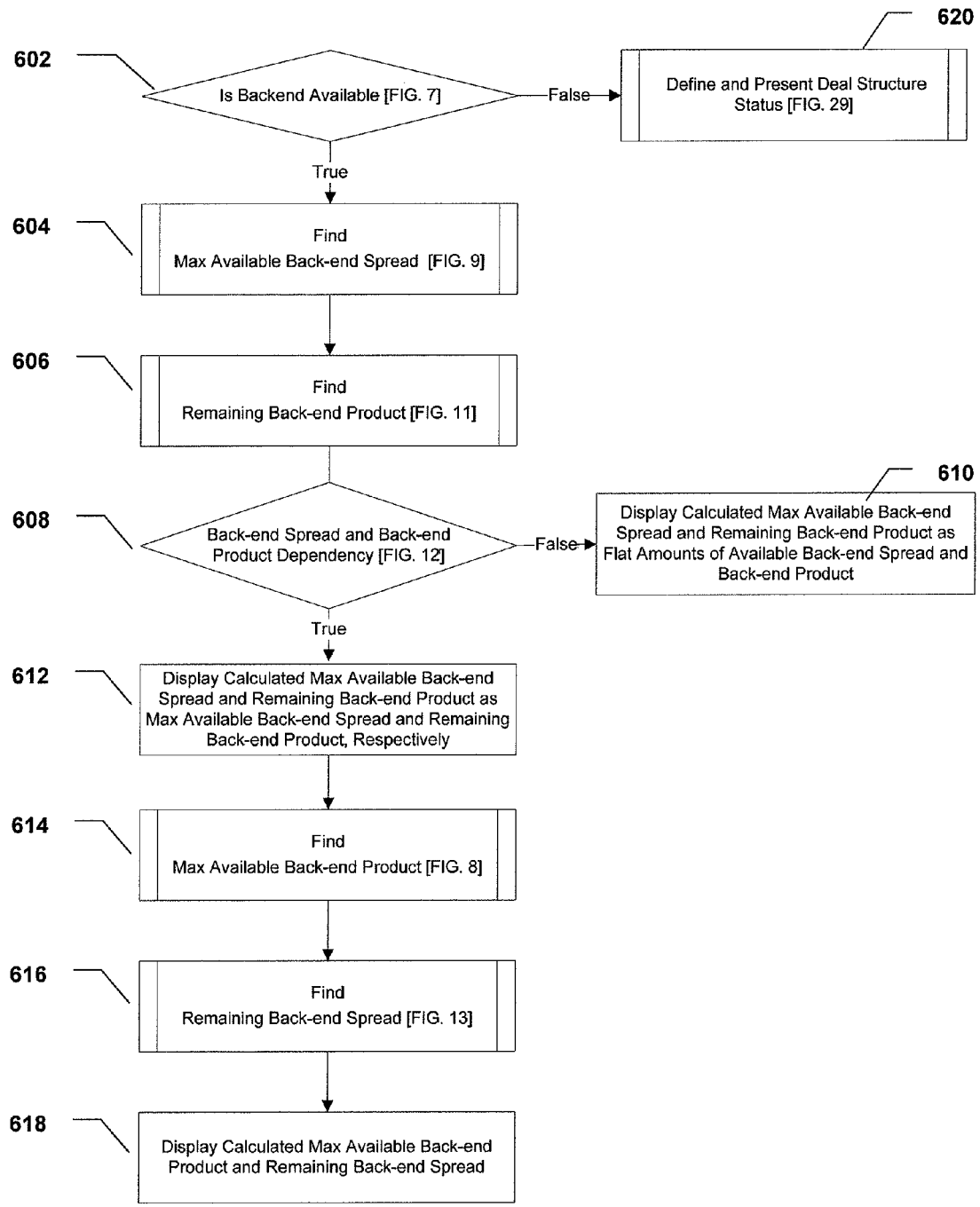
Figure 7:
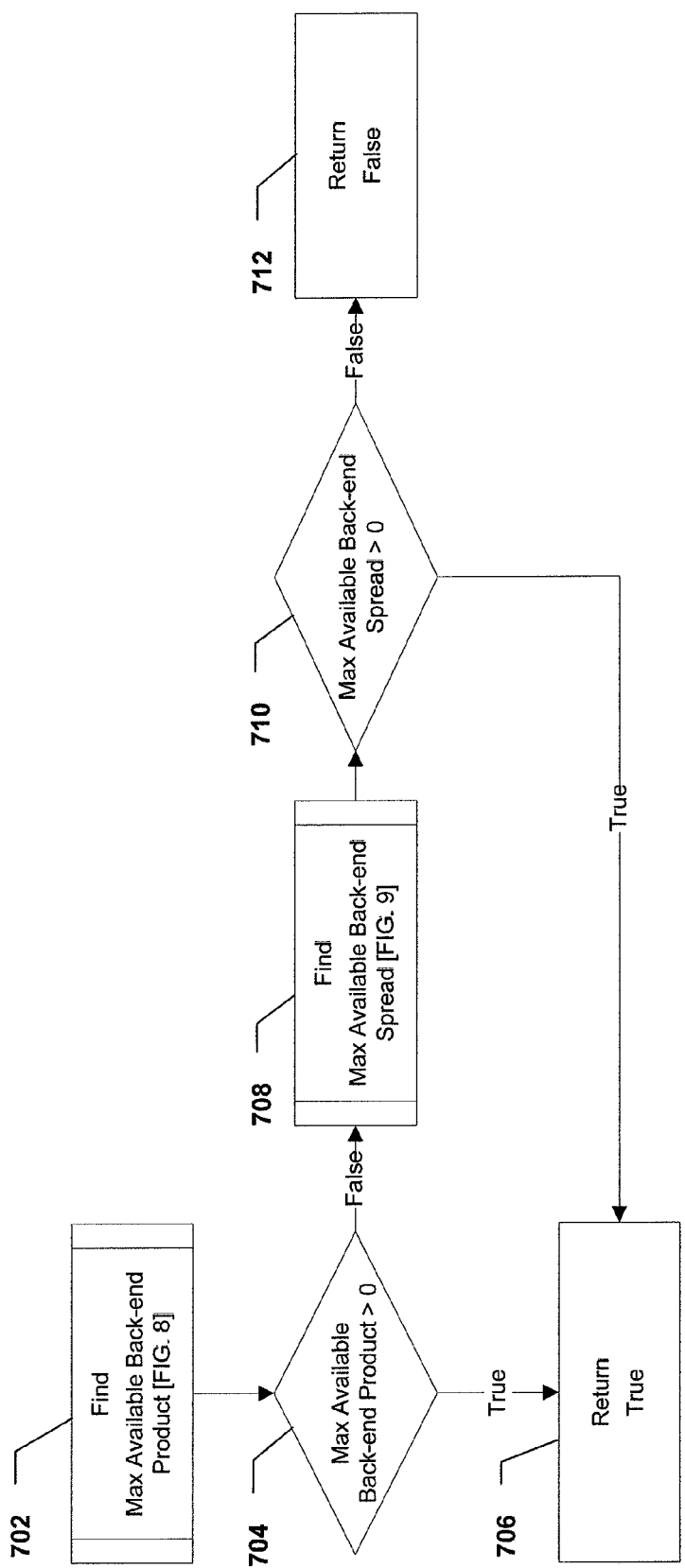
Figure 8:
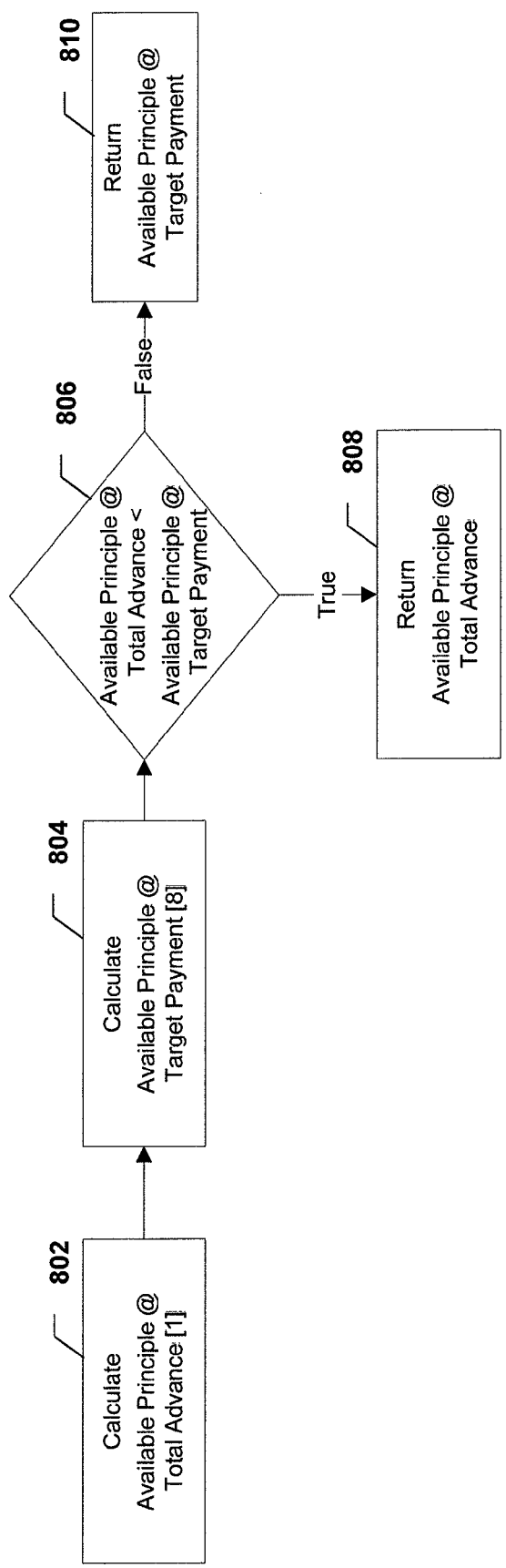
Figure 9:
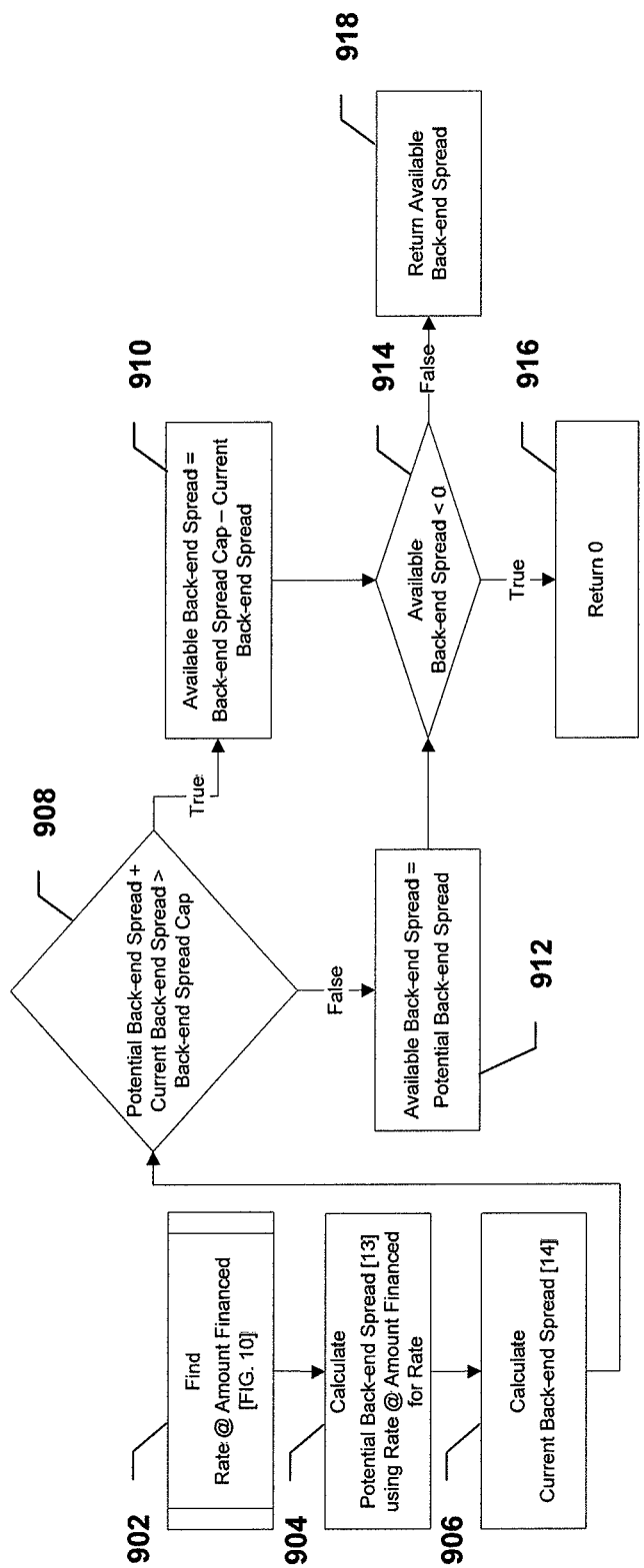
Figure 10:
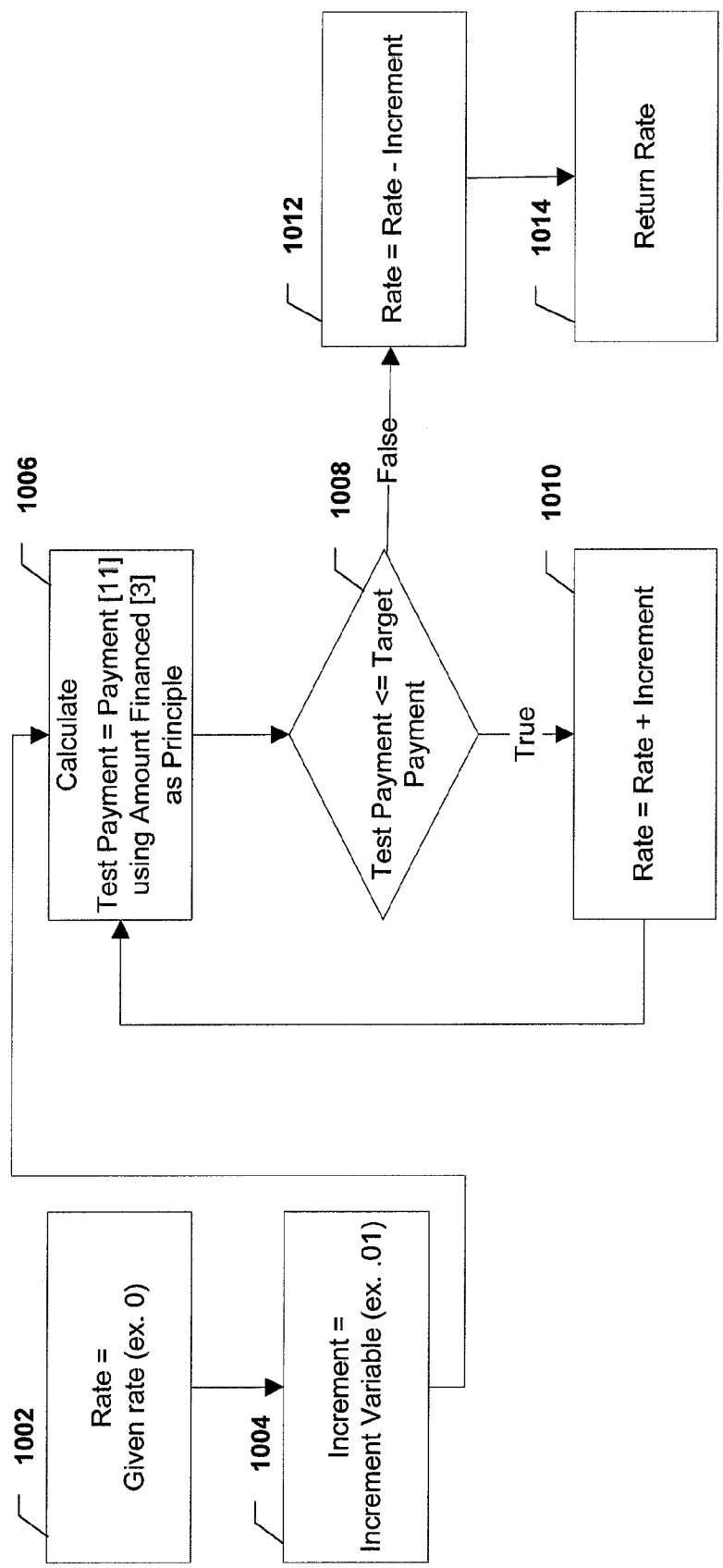
Figure 11:
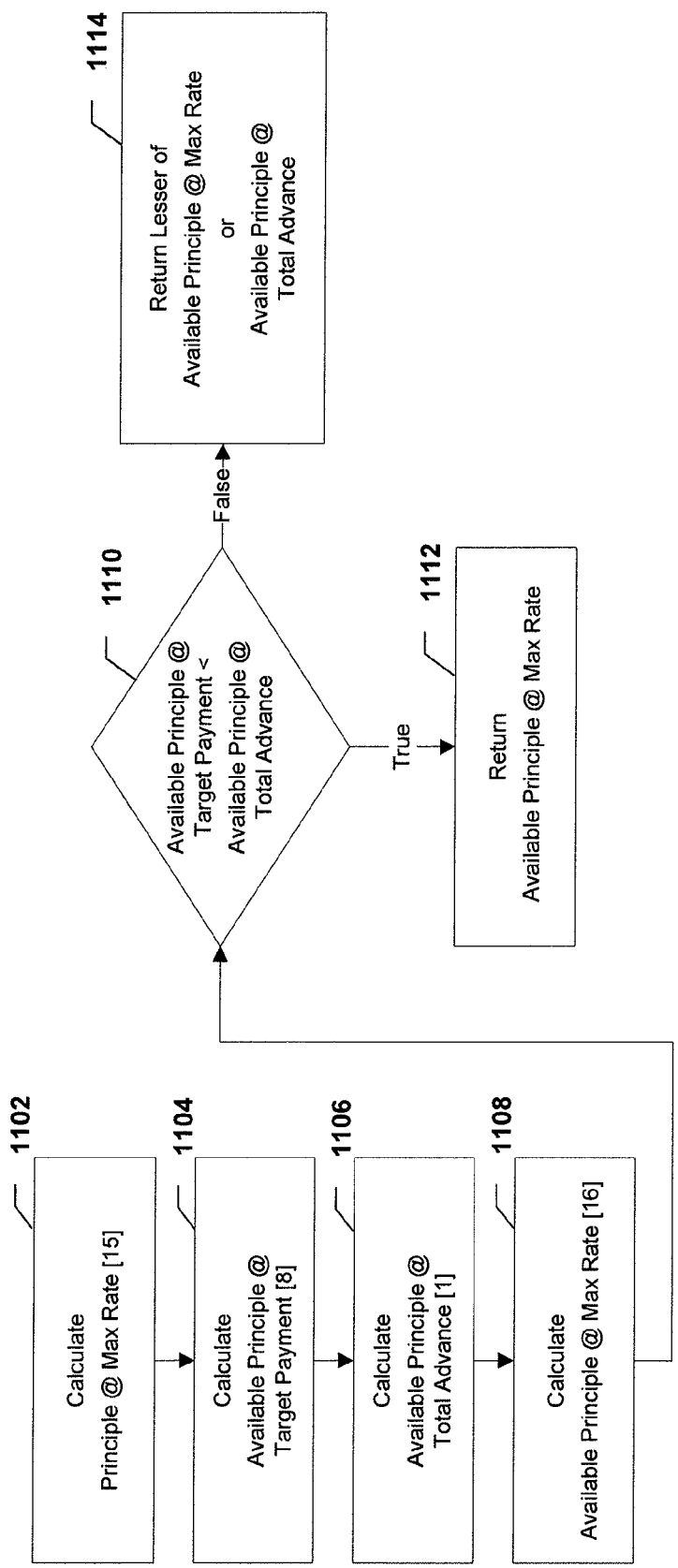
Figure 12:
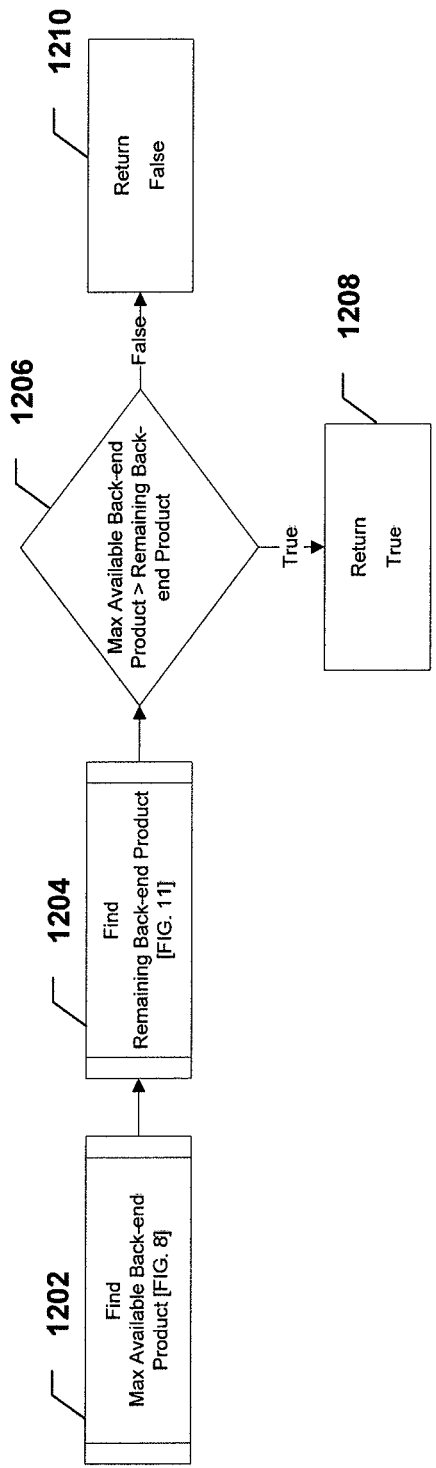
Figure 13:
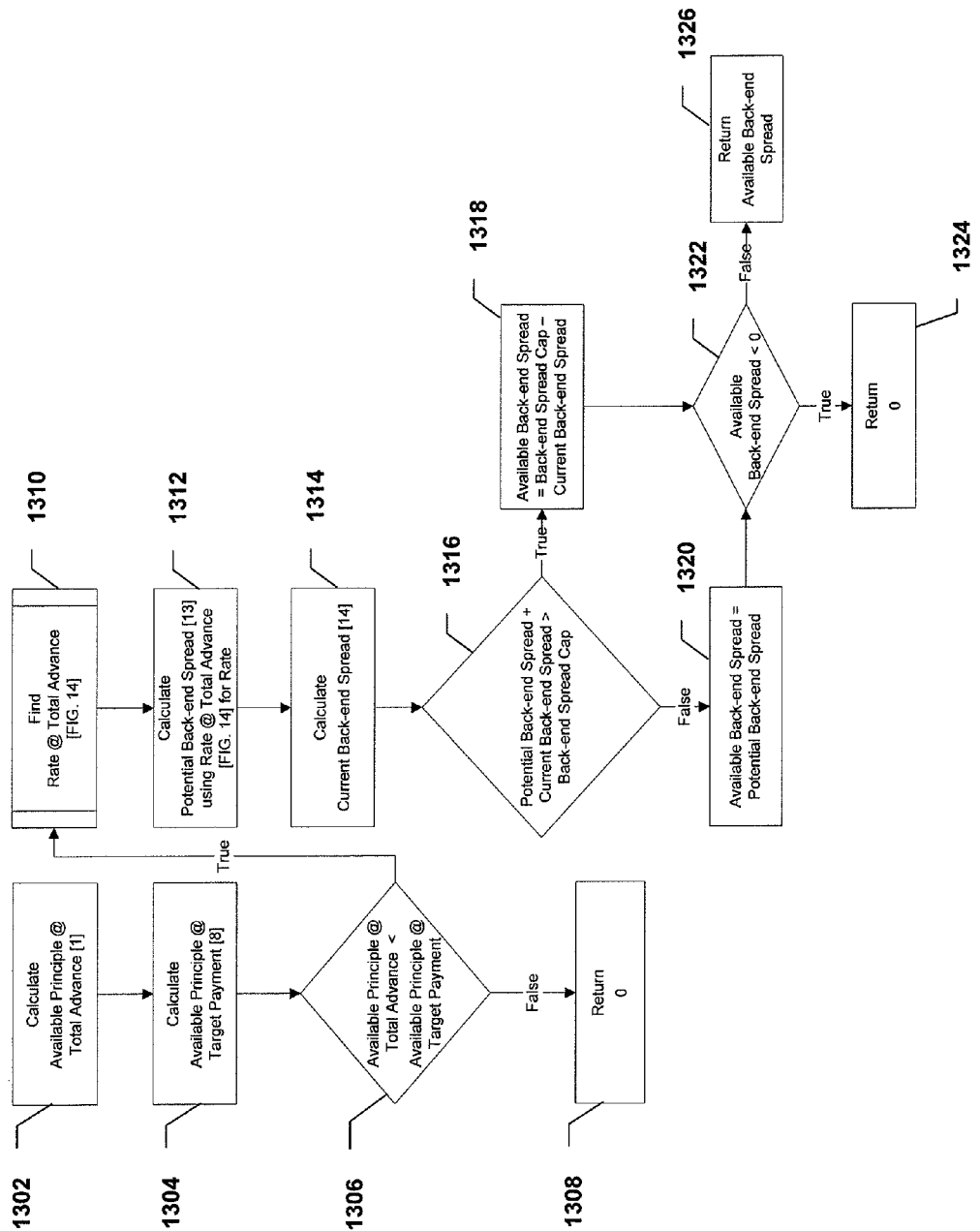
Figure 14:
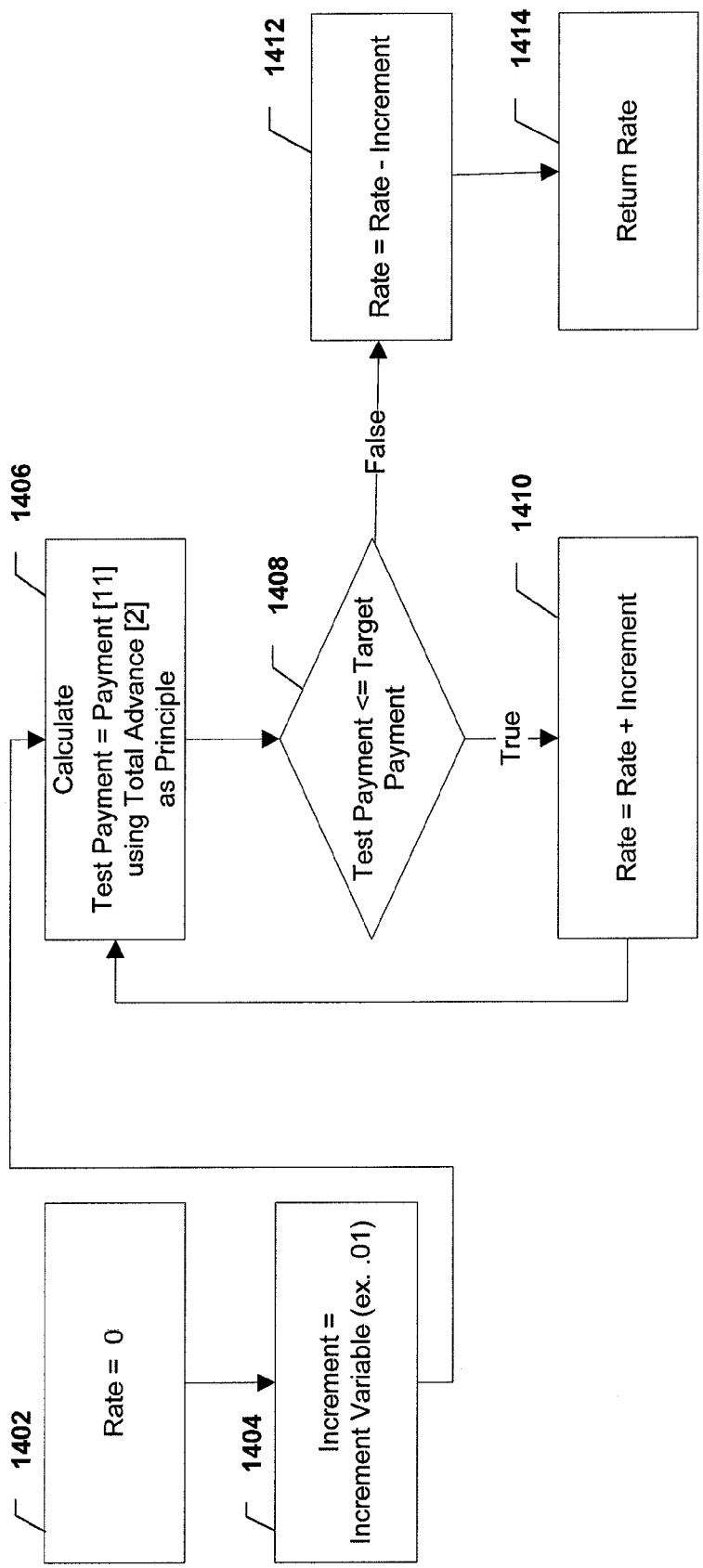
Figure 15:
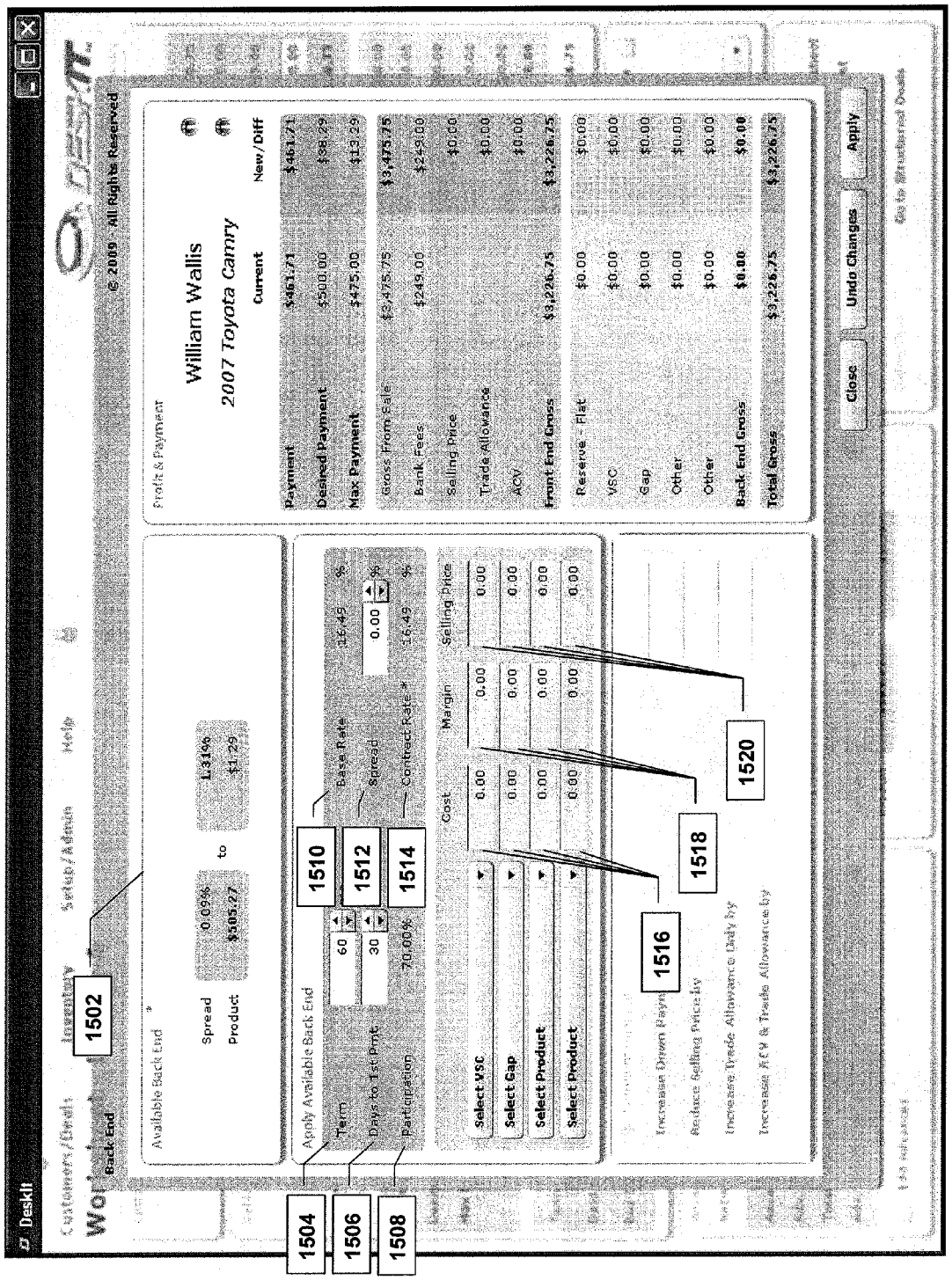
Figure 16:
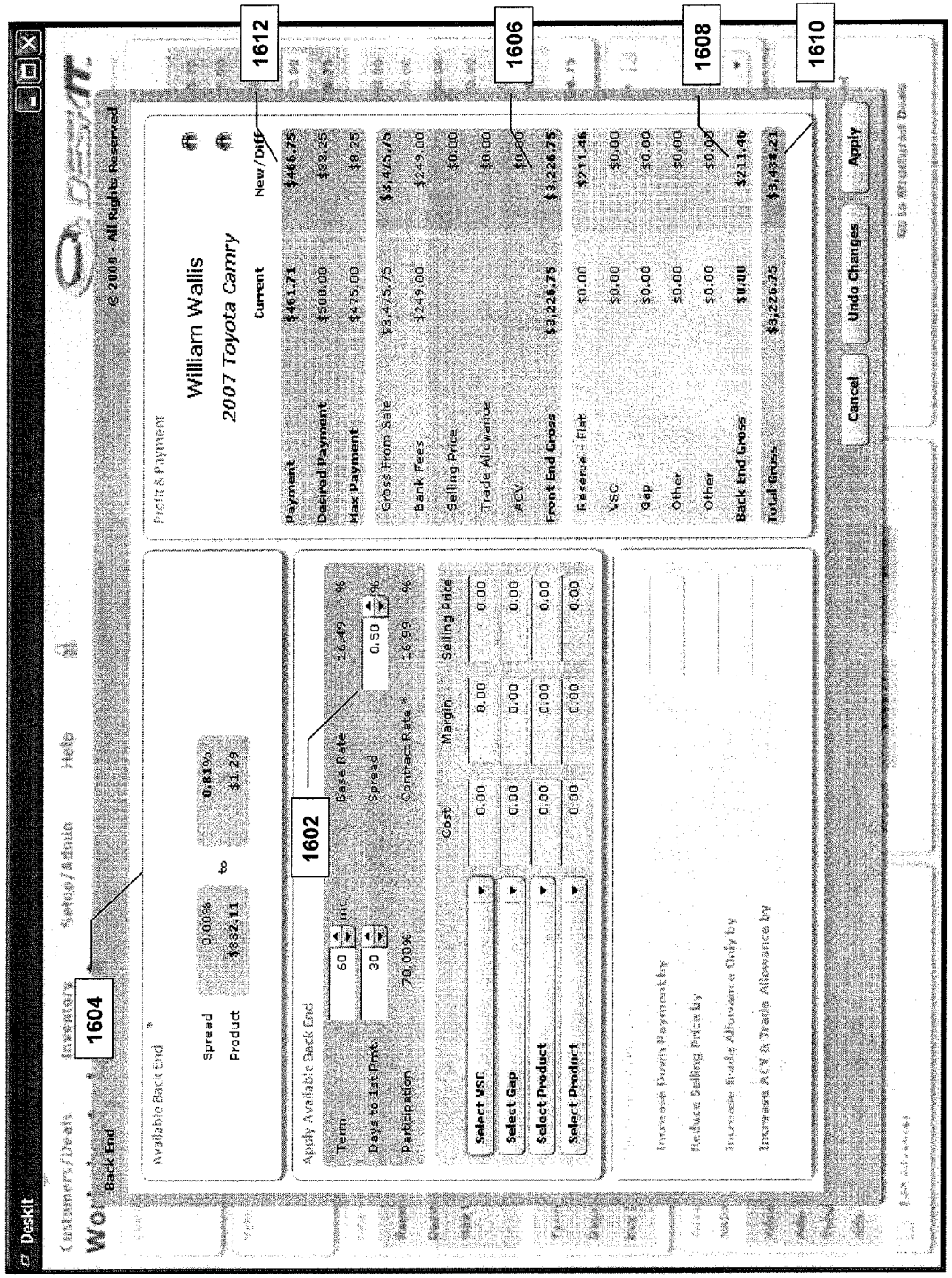
Figure 19:
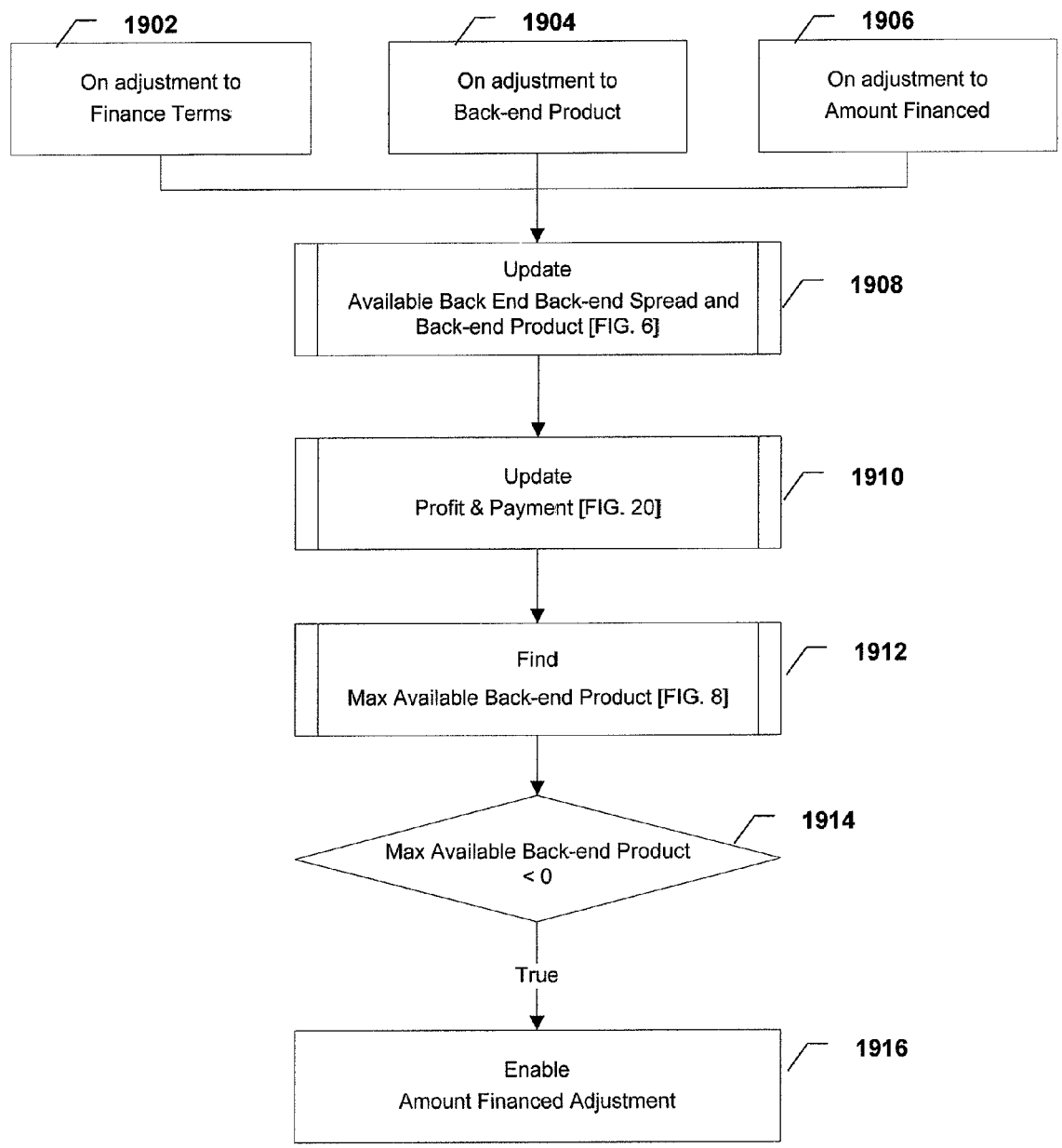
Figure 20A:
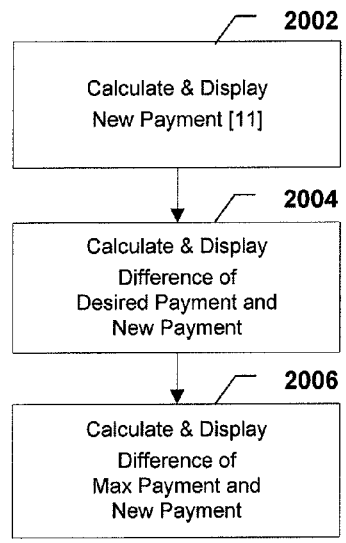
Figure 20B:
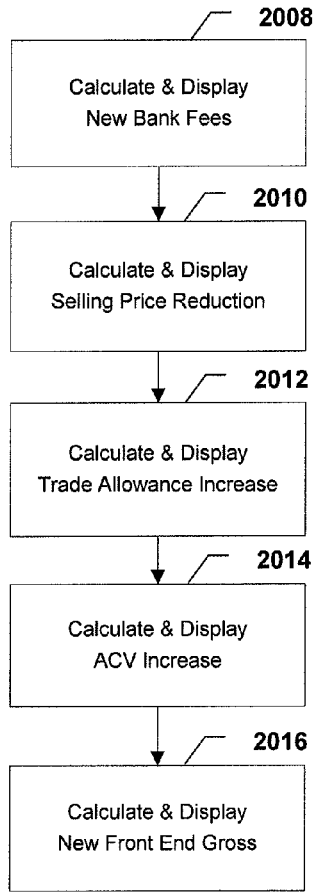
Figure 20C:
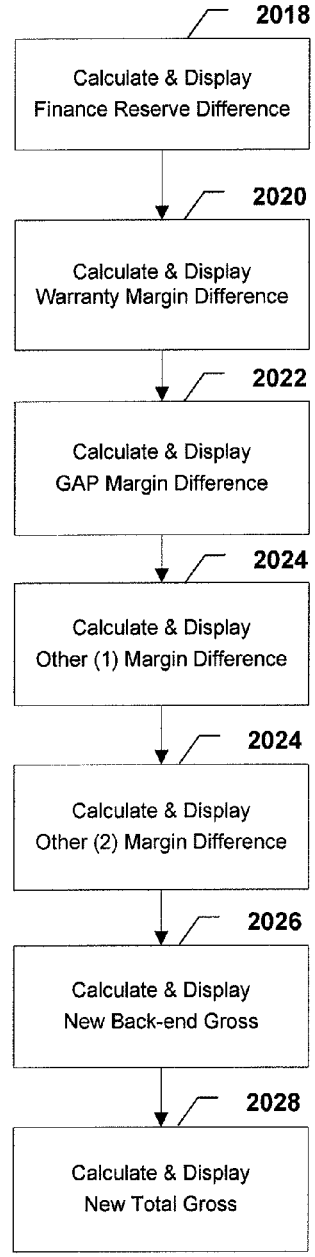
Figure 22:
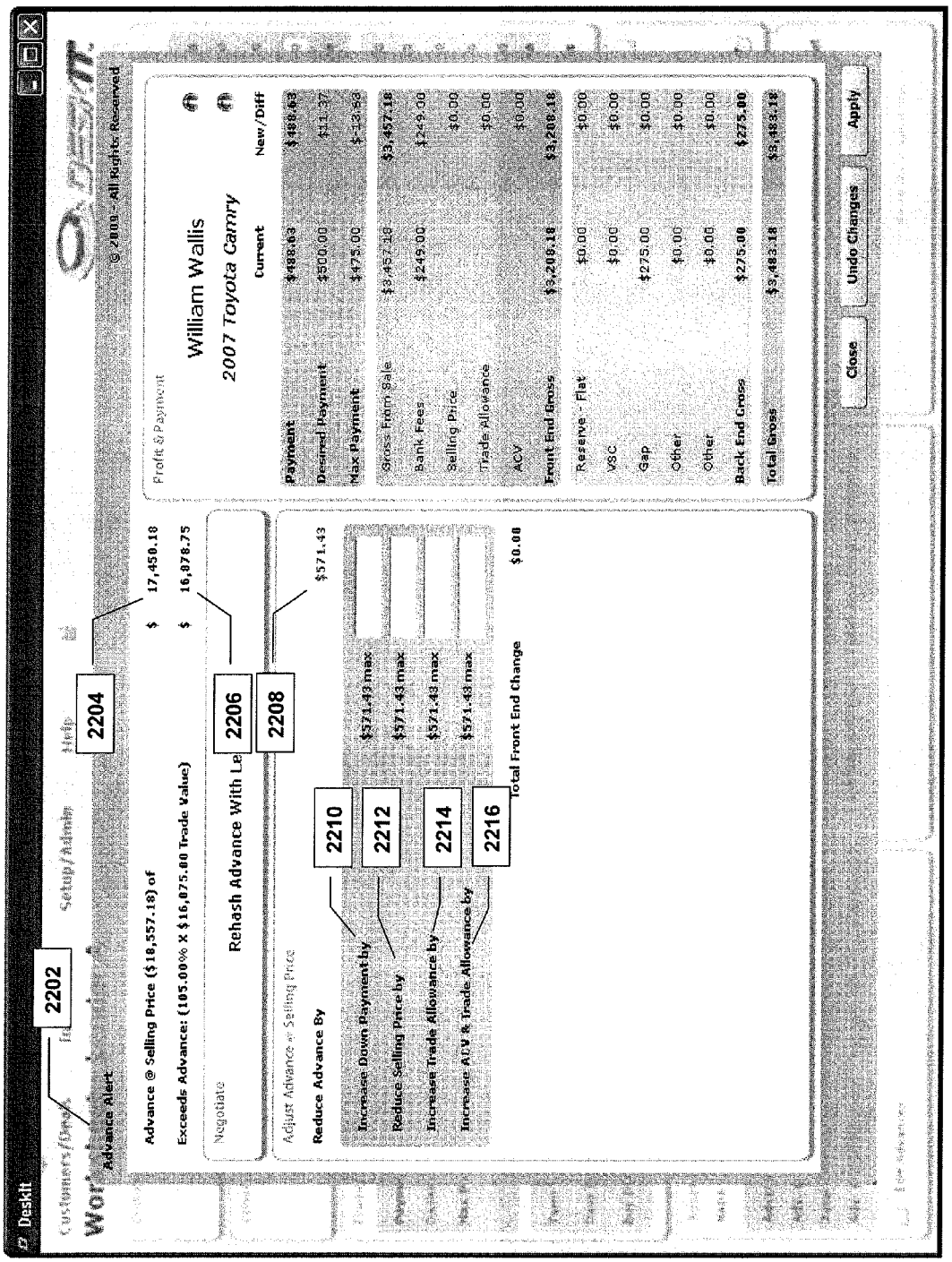
Figure 24:
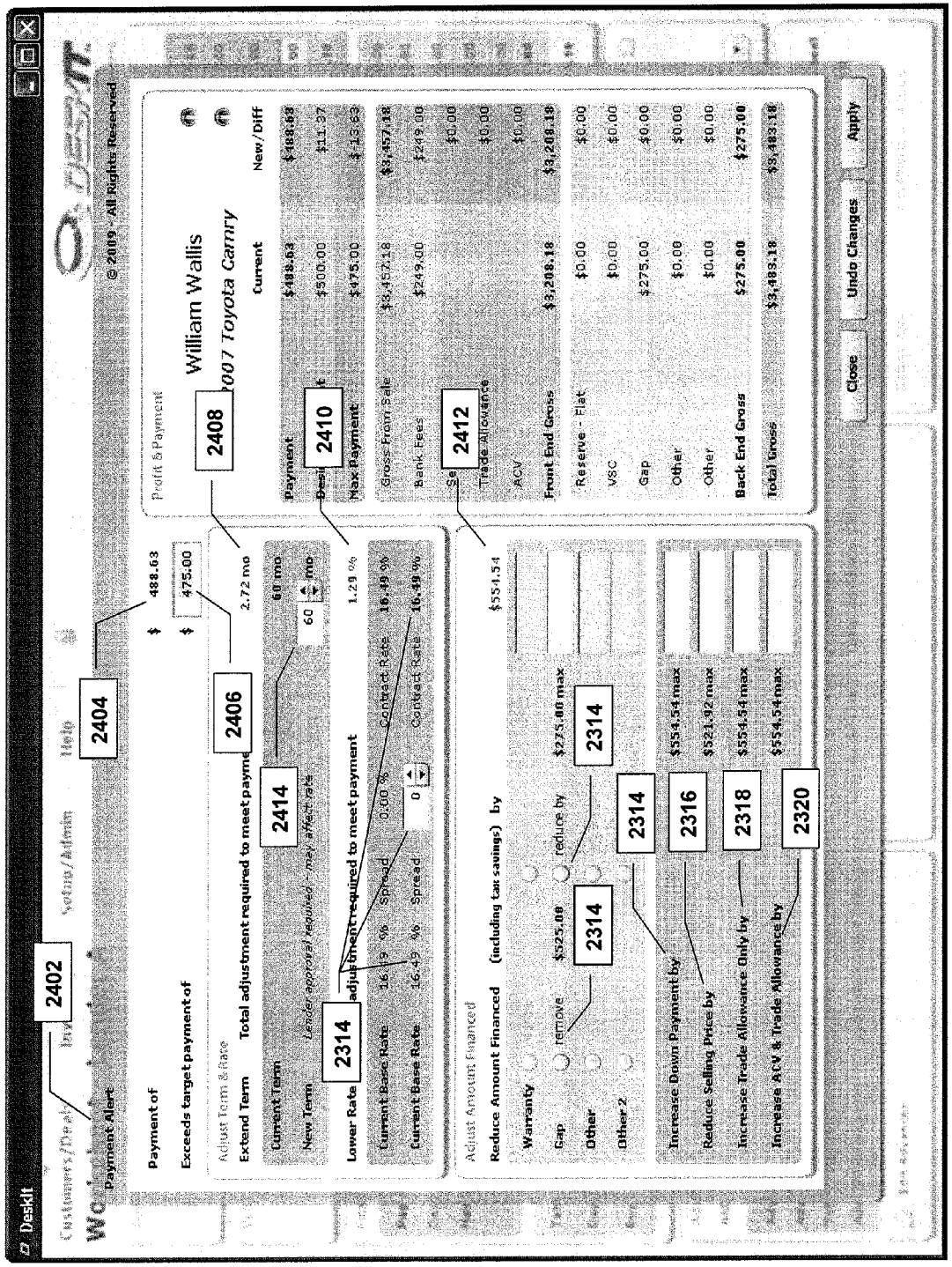
Figure 25:
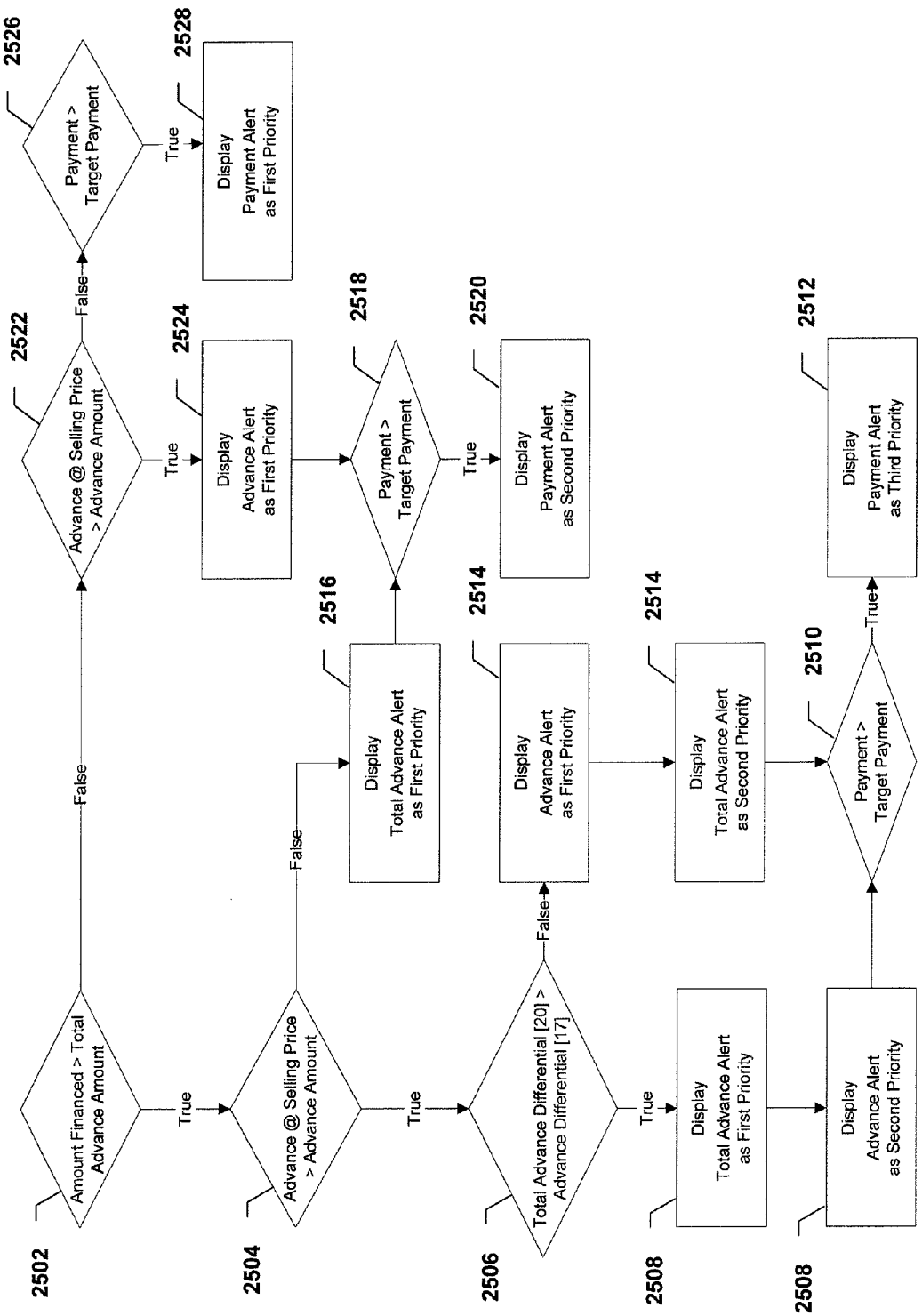
Figures 26A, 26B, 26C:
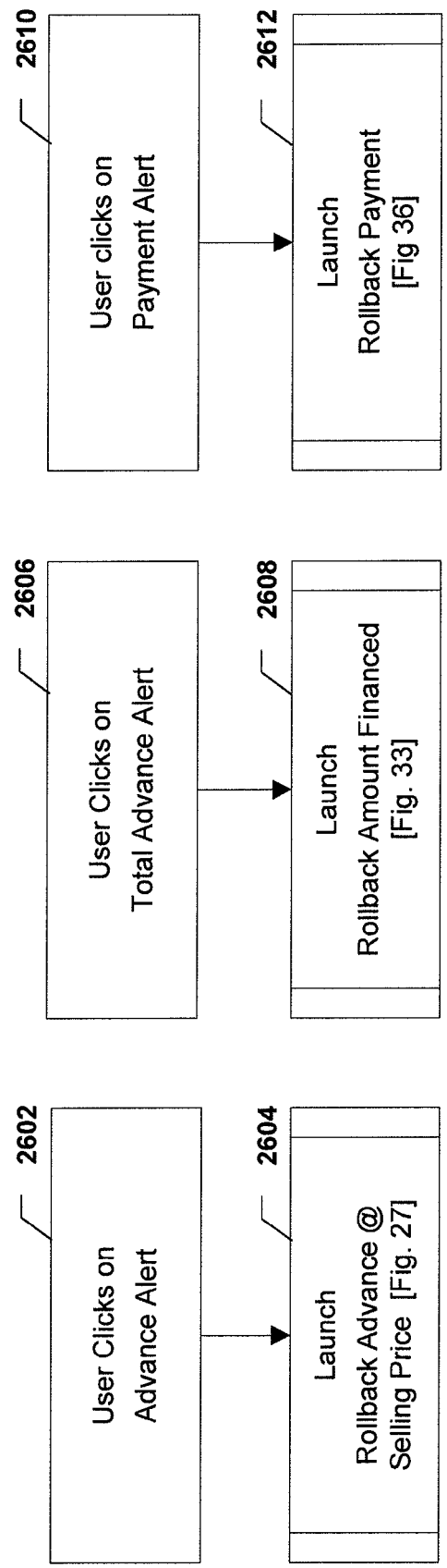
Figure 27:
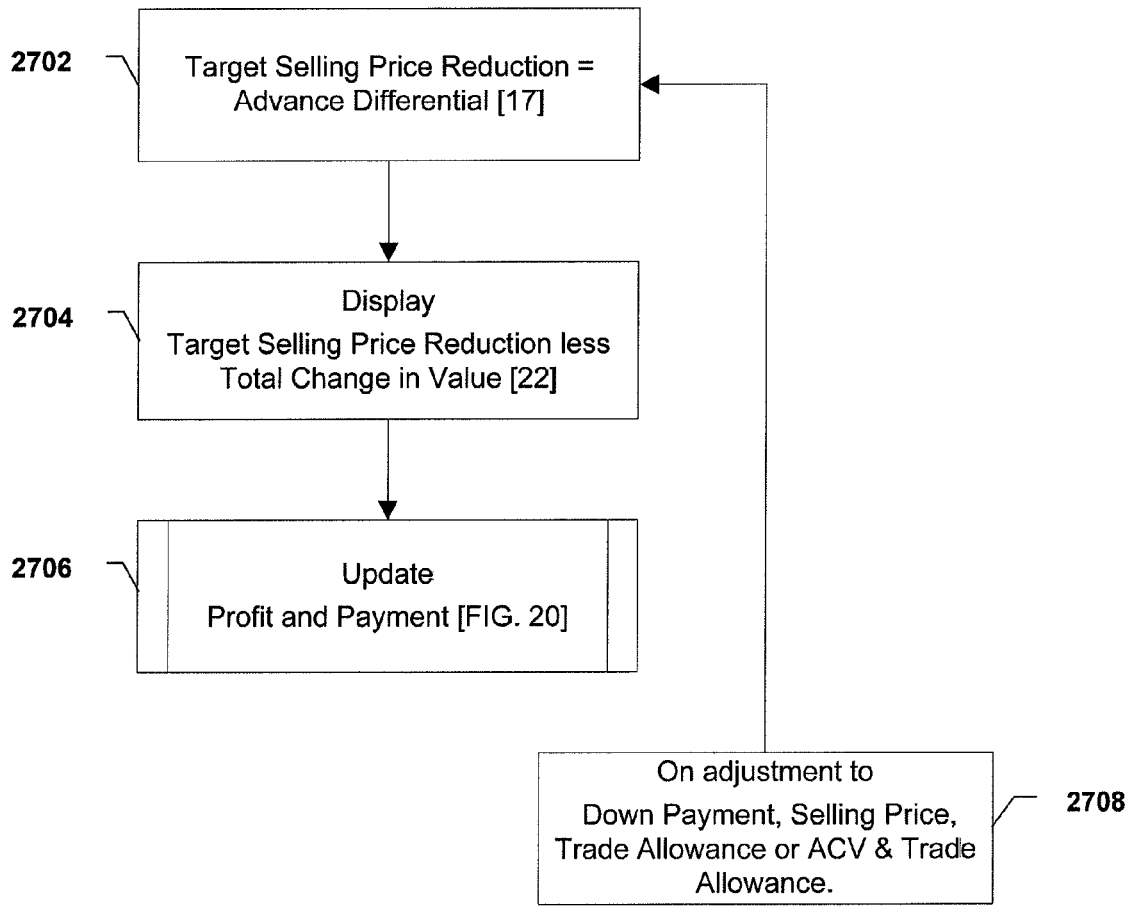
Figure 30:
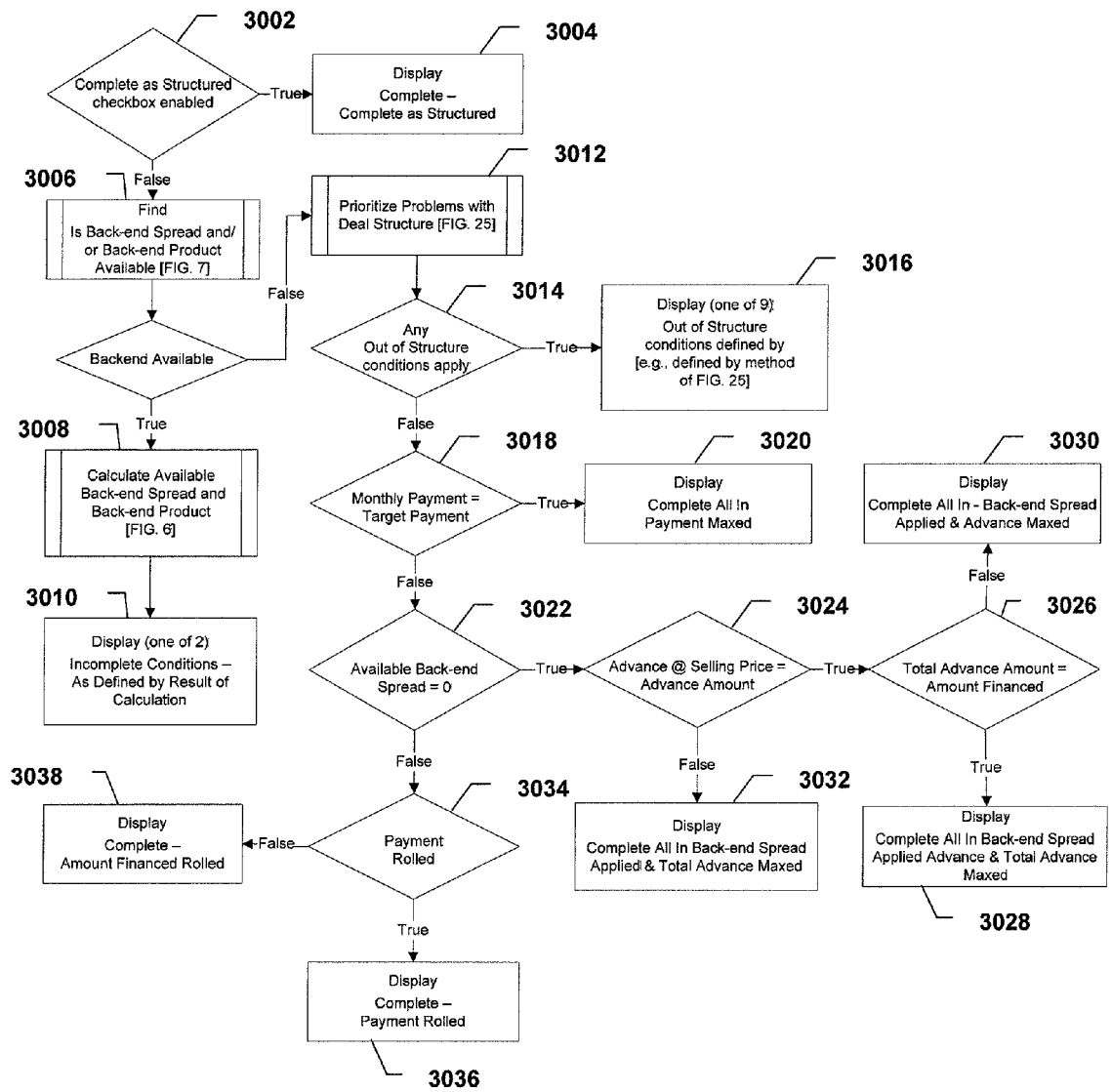
Figure 32:
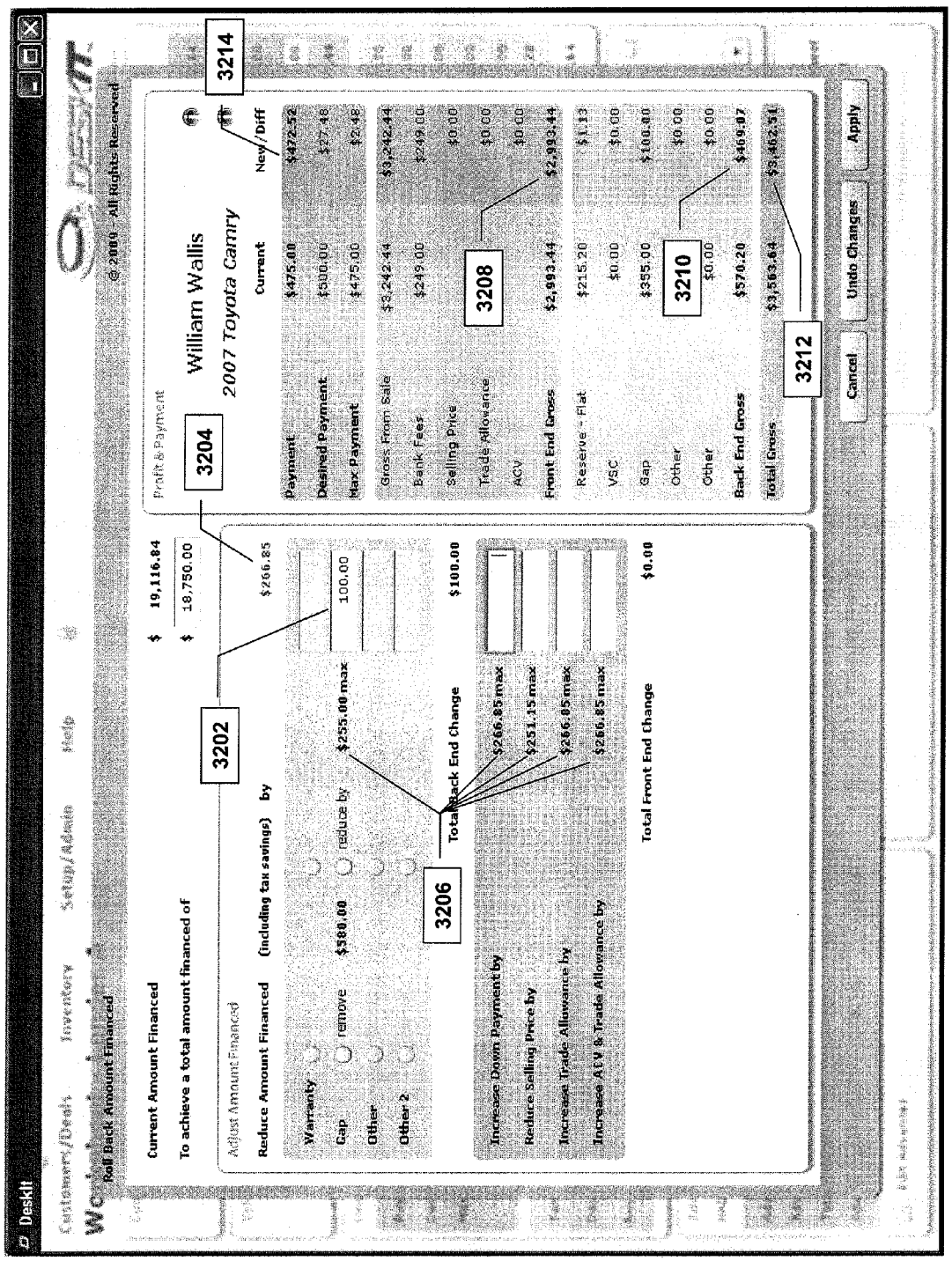
Figure 33:
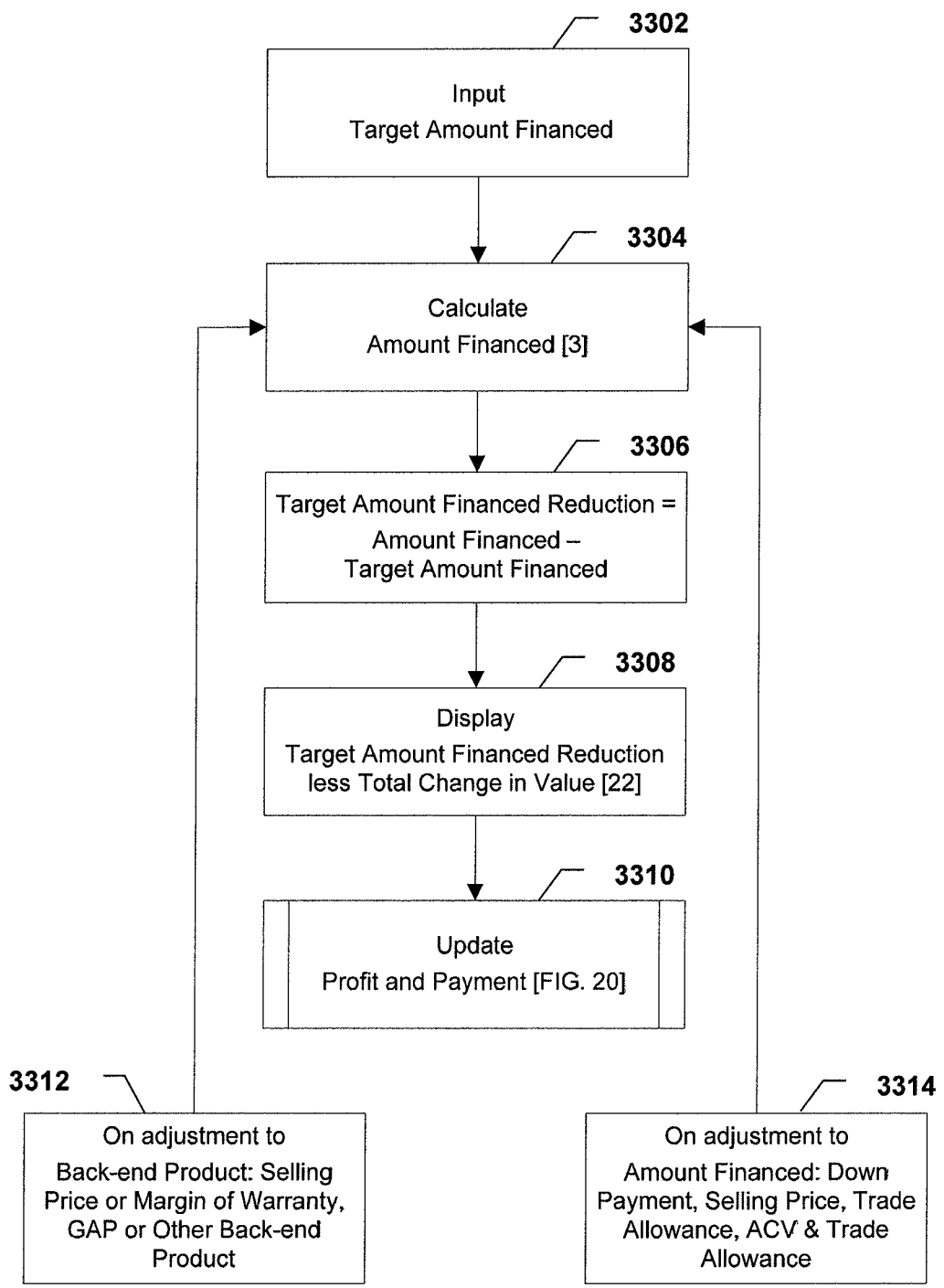
Figure 35:
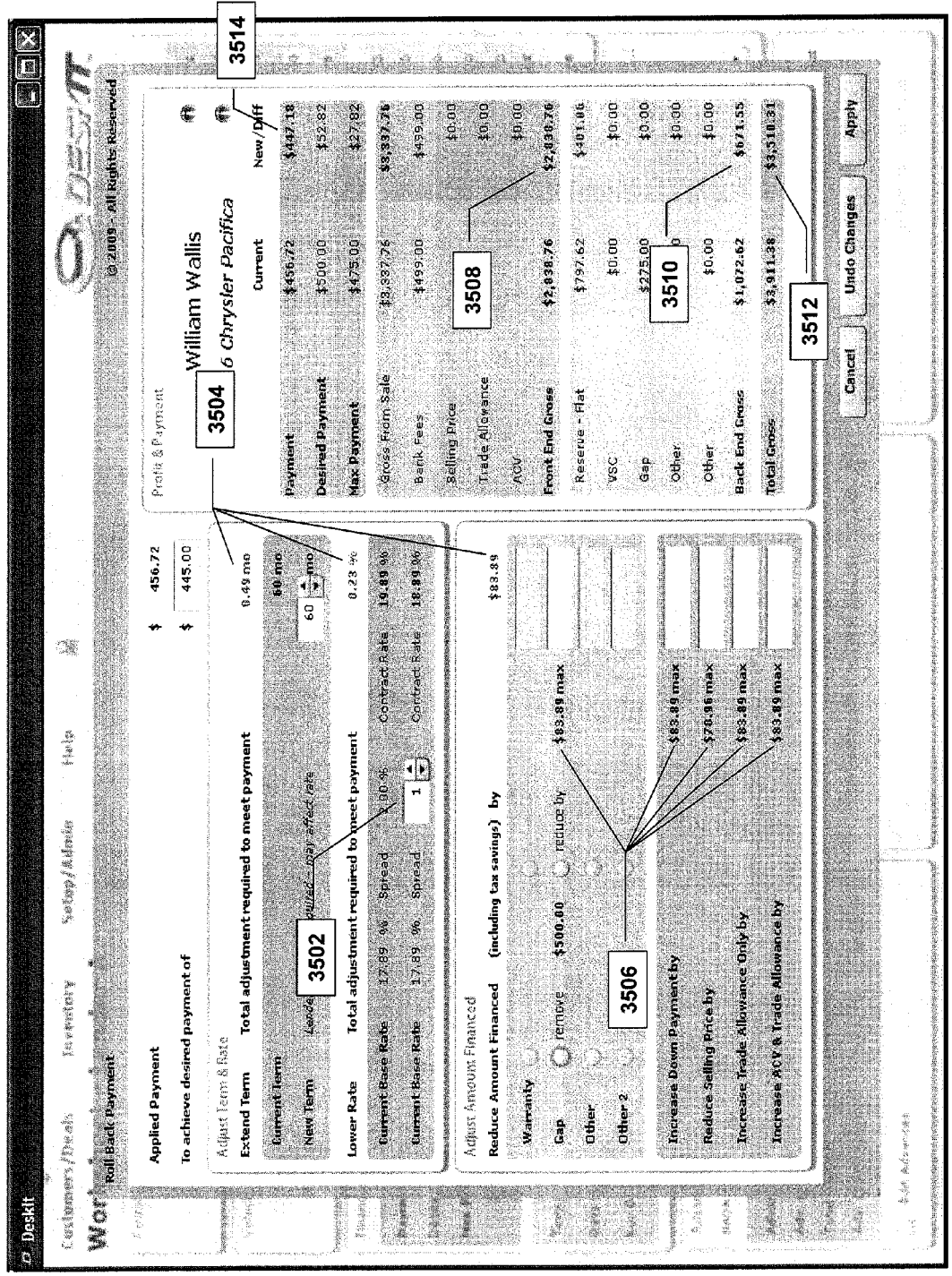
Figure 36:
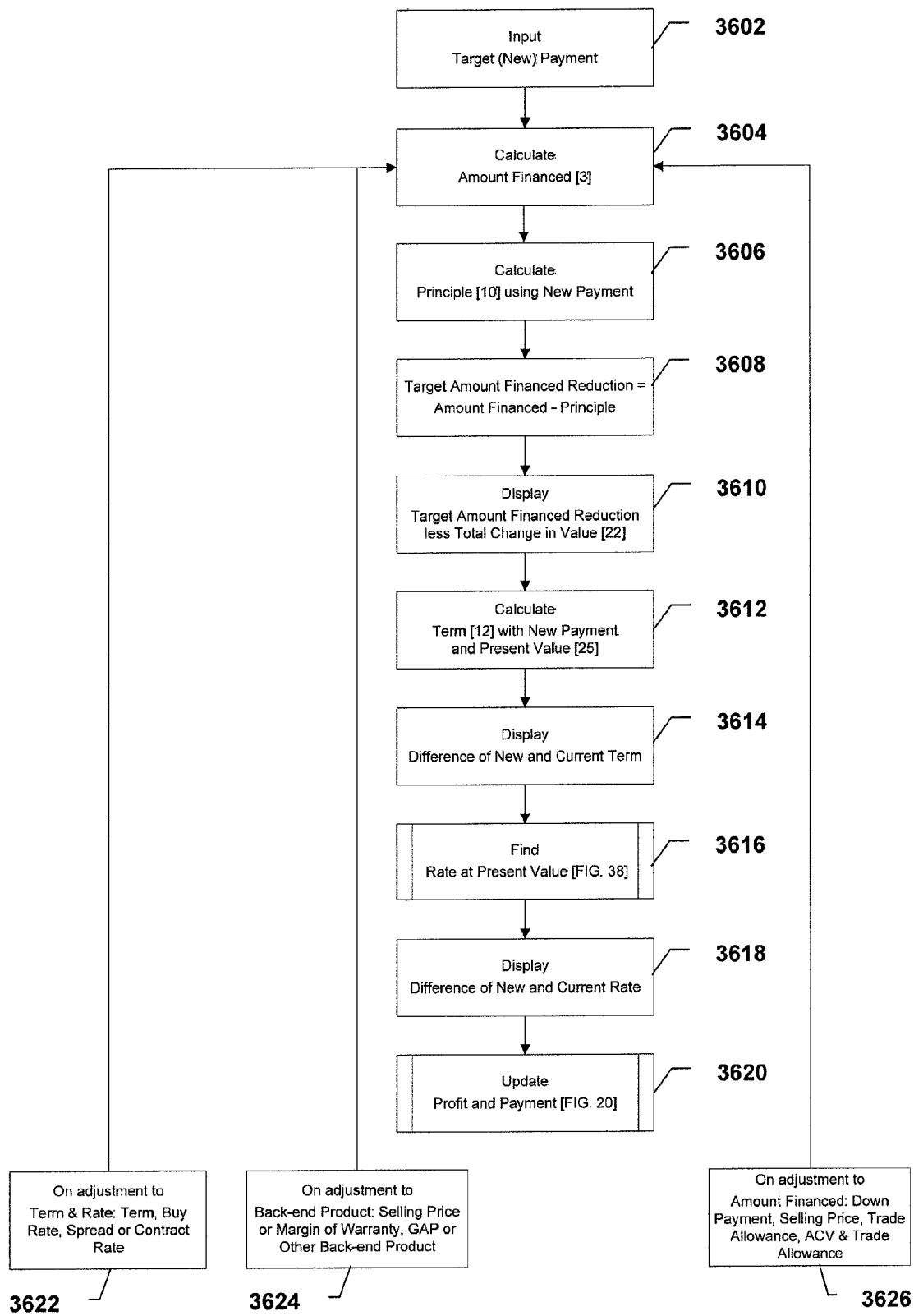
Figure 38:
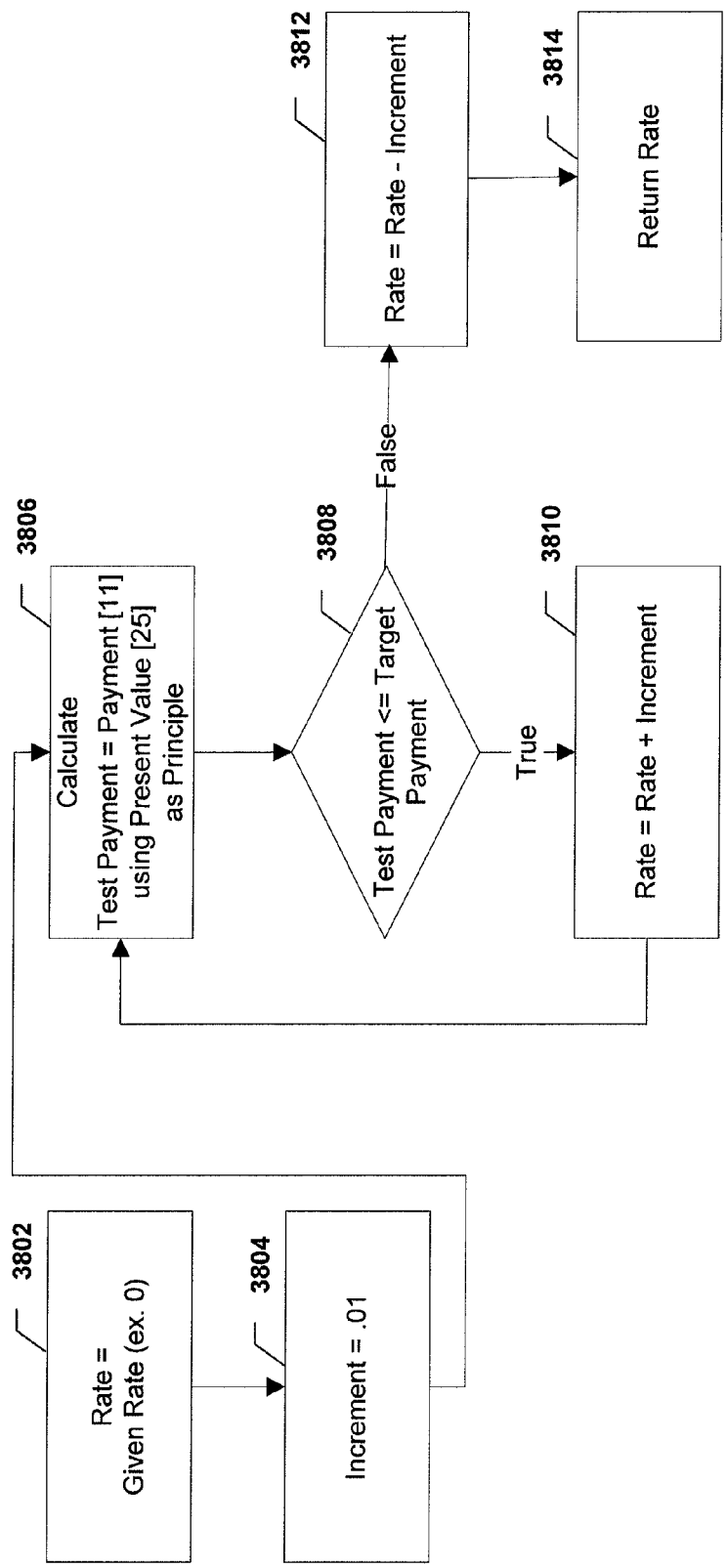
Figure 40:
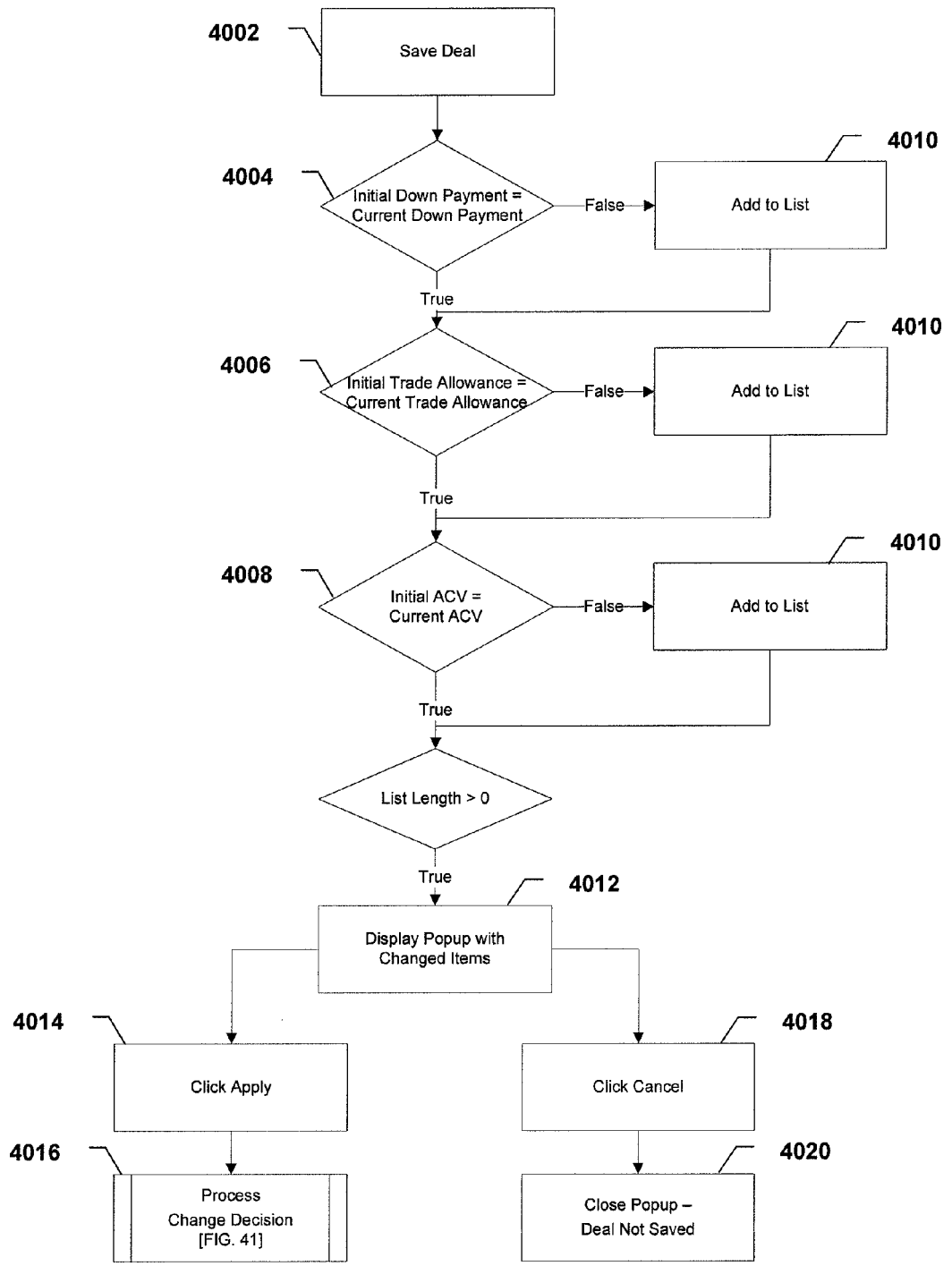
Figure 41:
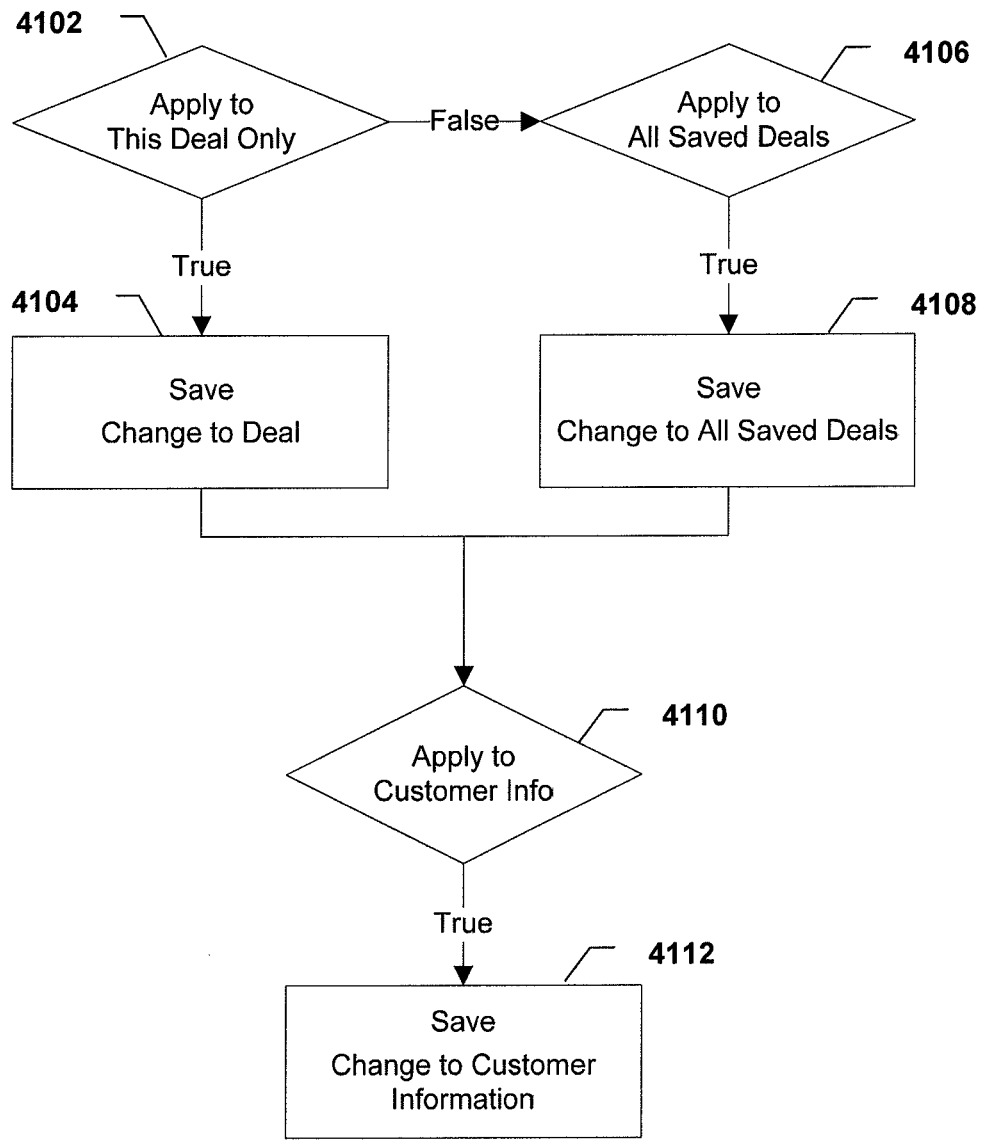
Figure 44:
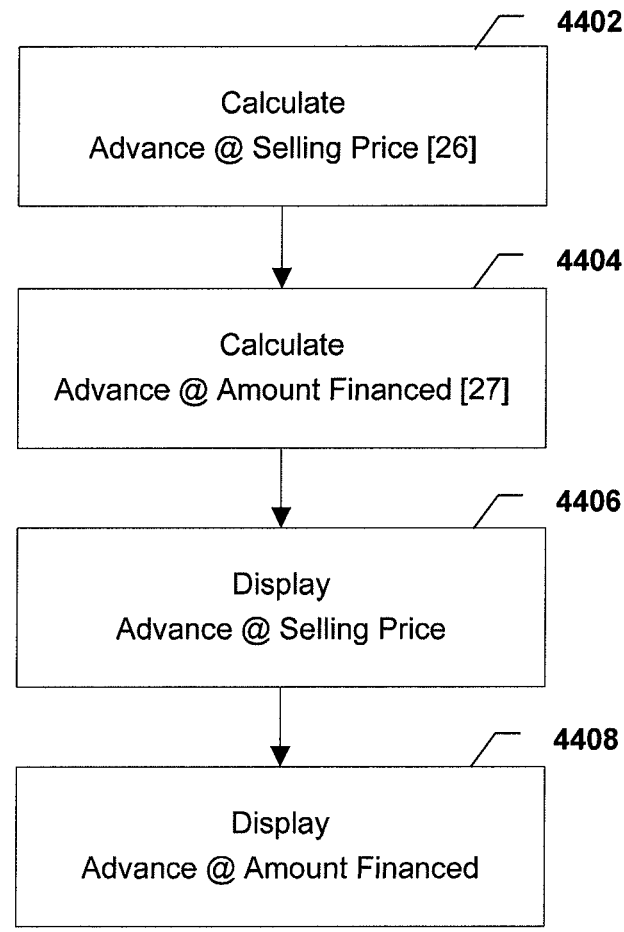
Figure 45:
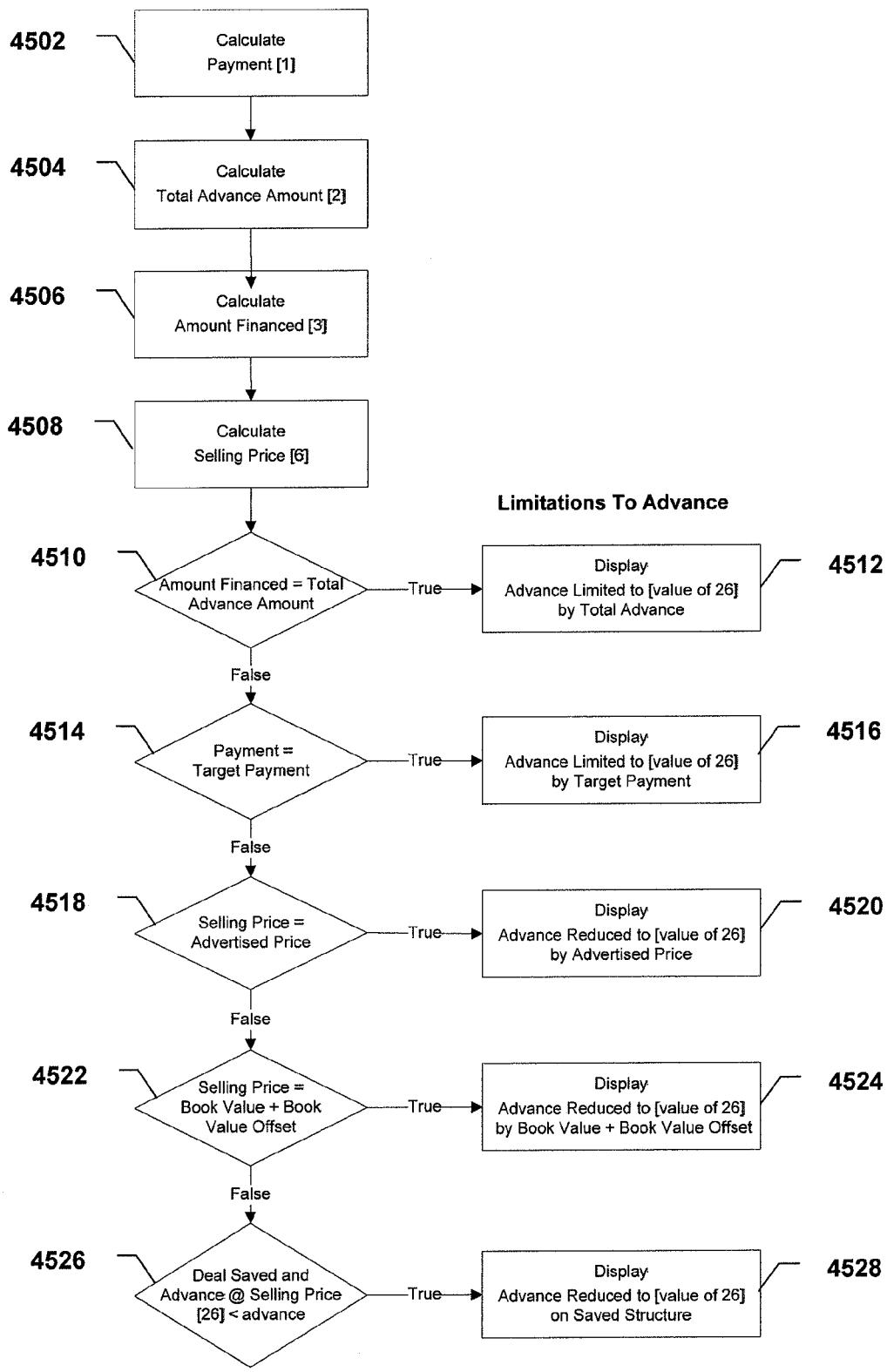
Figure 48:
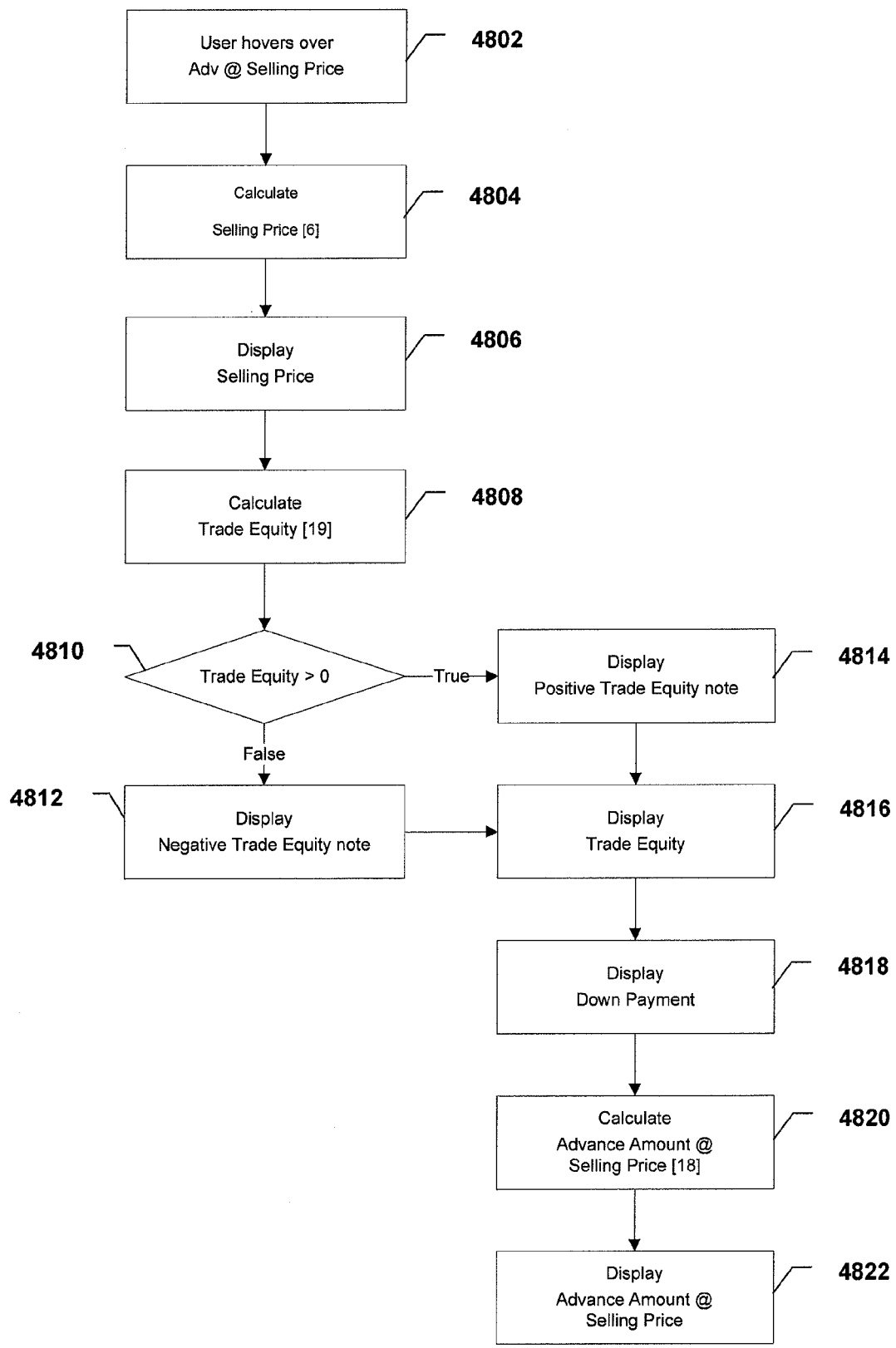
Figure 49:
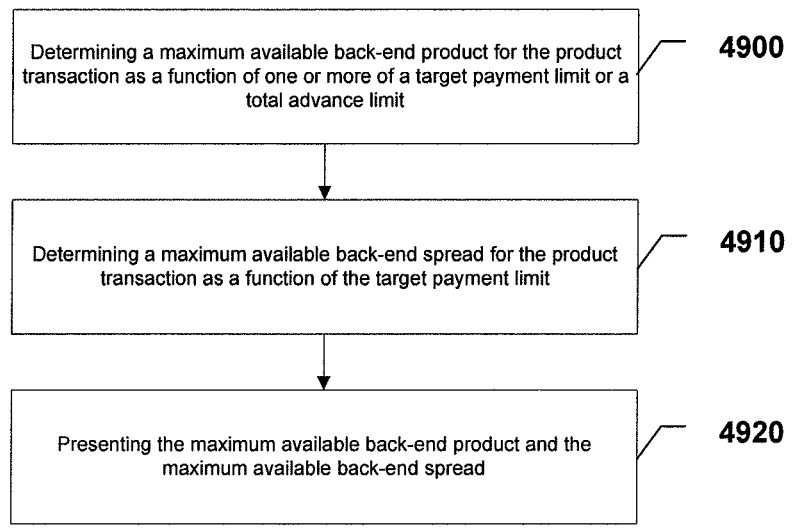
Figure 50:
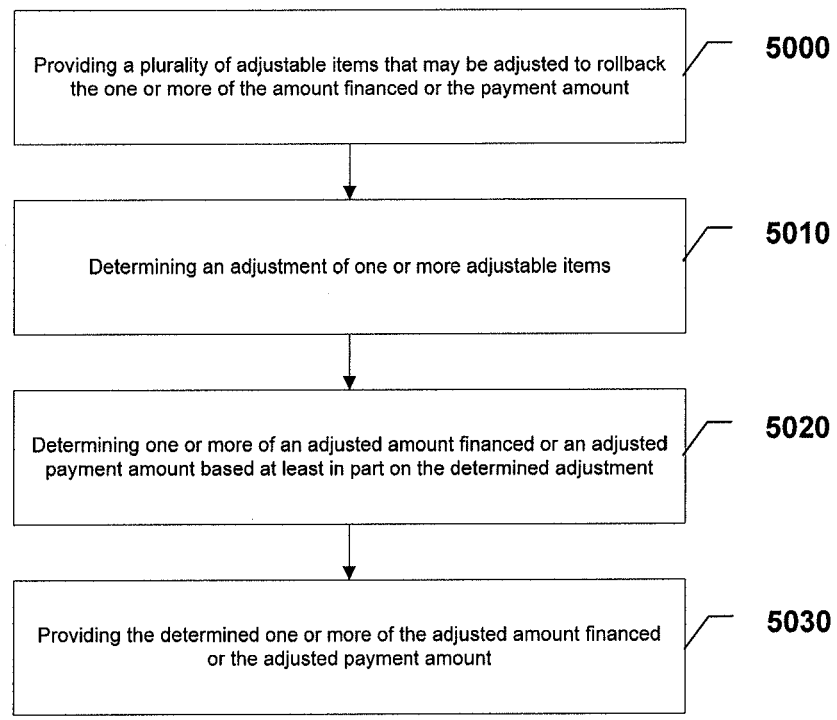

Having thus described embodiments of the invention in general terms, reference will now be made to the accompanying drawings, which are not necessarily drawn to scale, and wherein:

FIG. 1 illustrates a system for facilitating product transactions according to an example embodiment of the invention;

FIG. 2 illustrates a block diagram of an apparatus according to an example embodiment of the invention;

Figure 3:
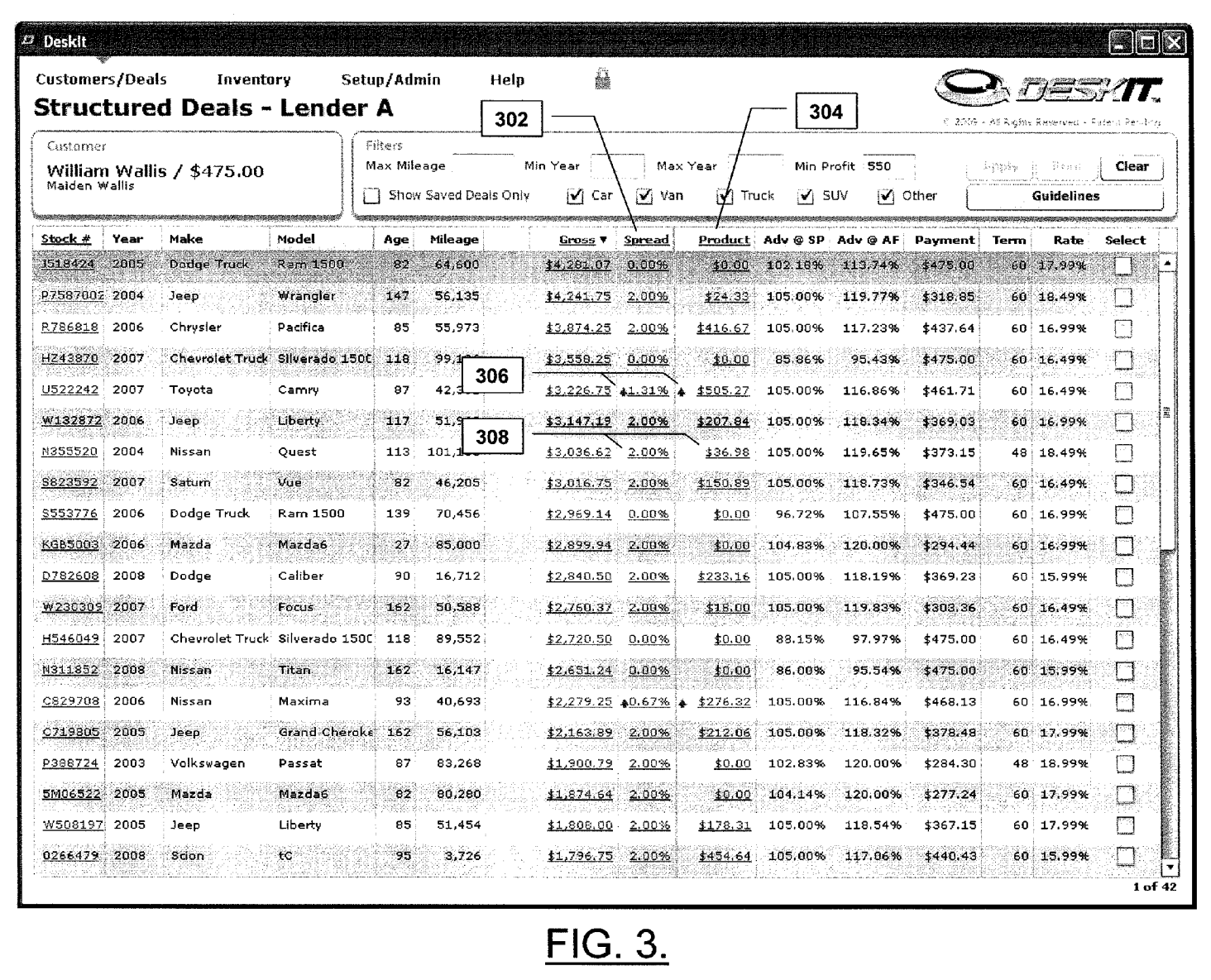

FIG. 3 illustrates a screen capture of an example user interface for calculating and presenting available back-end spread and product according to an example embodiment of the invention;

Figure 4:
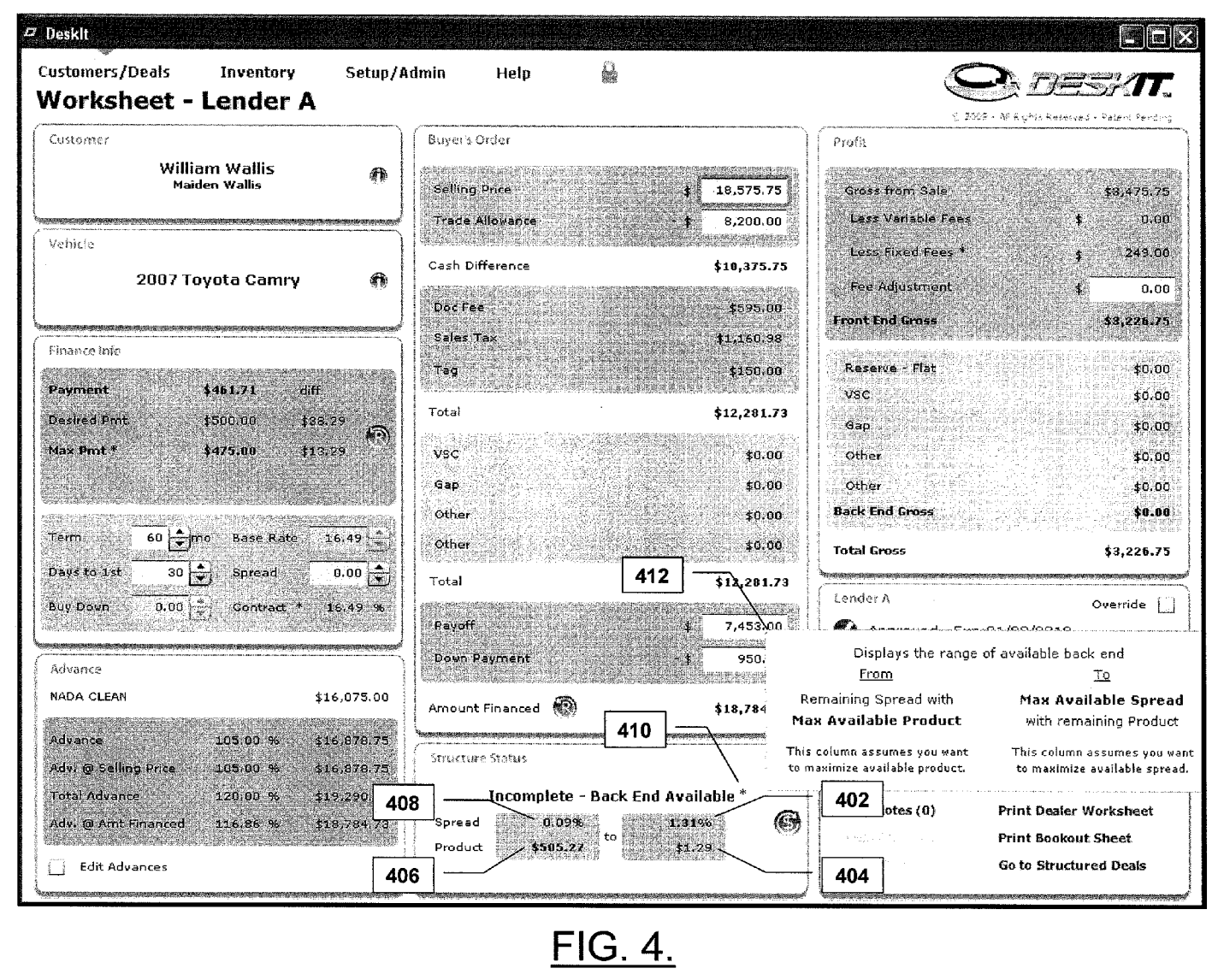

FIG. 4 illustrates a screen capture of an example user interface for calculating and presenting available back-end spread and product according to an example embodiment of the invention;

Figure 5:
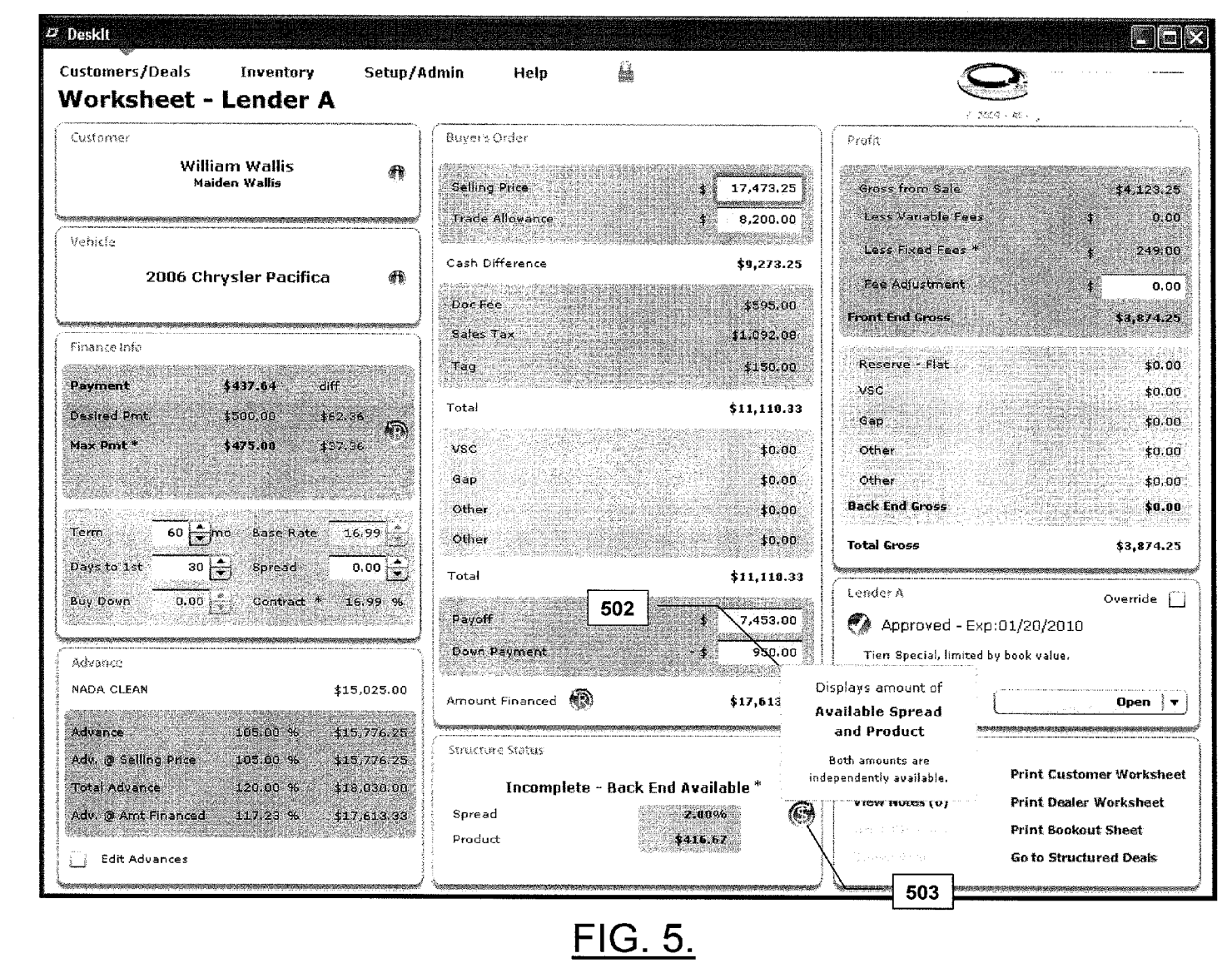

FIG. 5 illustrates a screen capture of an example user interface for calculating and presenting available back-end spread and product according to an example embodiment of the invention;

FIG. 6 illustrates a flowchart according to an example method for calculating and presenting available back-end spread and product according to an example embodiment of the invention;

FIG. 7 illustrates a flowchart according to an example method for determining whether back-end spread and/or product are available according to an example embodiment of the invention;

FIG. 8 illustrates a flowchart according to an example method for determining maximum available back-end product according to an example embodiment of the invention;

FIG. 9 illustrates a flowchart according to an example method for determining the maximum available back-end spread according to an example embodiment of the invention;

FIG. 10 illustrates a flowchart according to an example method for determining rate at amount financed according to an example embodiment of the invention;

FIG. 11 illustrates a flowchart according to an example method for determining the remaining back-end product according to an example embodiment of the invention;

FIG. 12 illustrates a flowchart according to an example method for determining whether there is a spread and product dependency according to an example embodiment of the invention;

FIG. 13 illustrates a flowchart according to an example method for determining remaining back-end spread according to an example embodiment of the invention;

FIG. 14 illustrates a flowchart according to an example method for determining rate at total advance according to an example embodiment of the invention;

FIG. 15 illustrates a screen capture of an example user interface for applying available back-end spread and product according to an example embodiment of the invention;

FIG. 16 illustrates a screen capture of an example user interface for applying available back-end spread and product according to an example embodiment of the invention;

Figure 17:
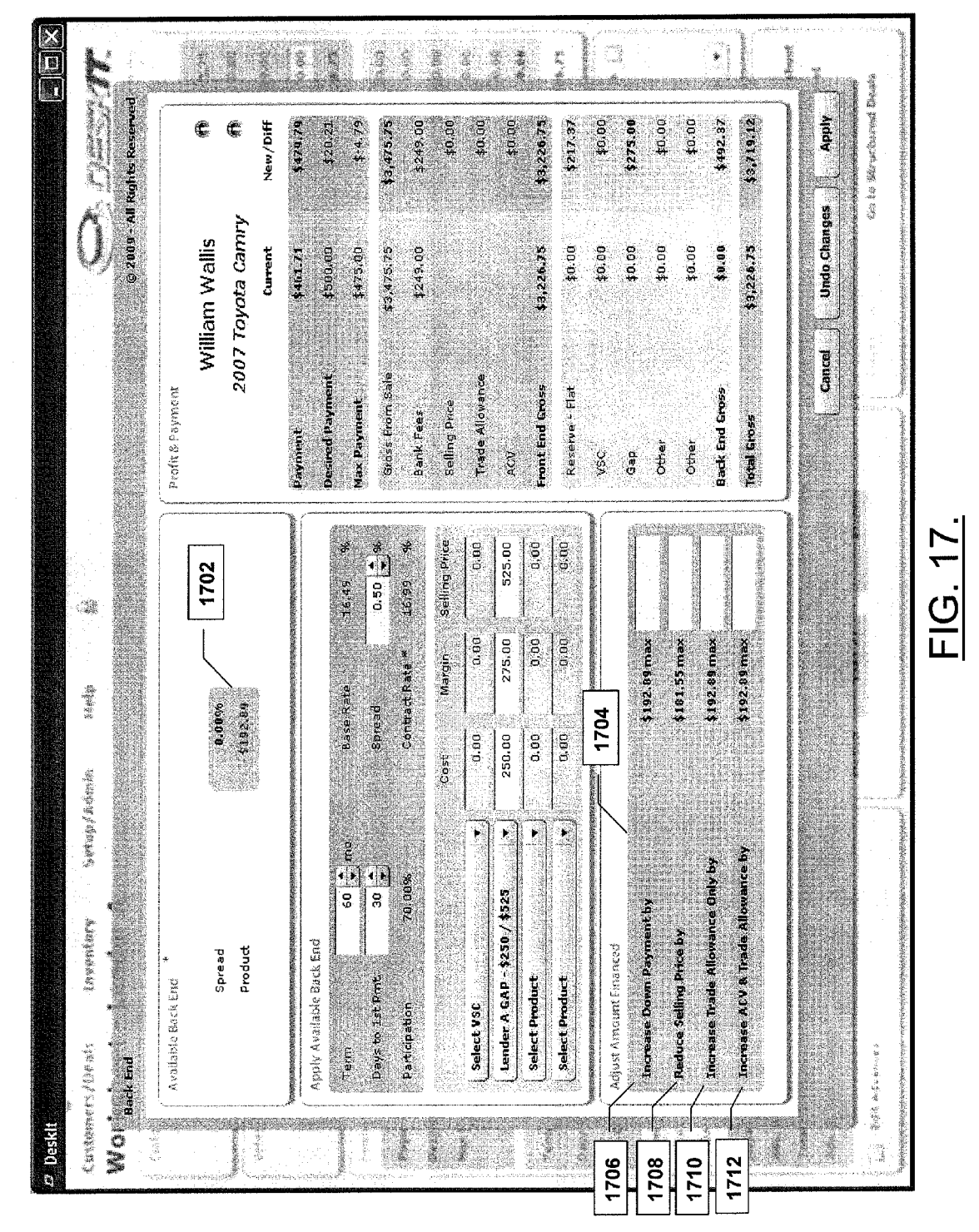

FIG. 17 illustrates a screen capture of an example user interface for applying available back-end spread and product according to an example embodiment of the invention;

Figure 18:
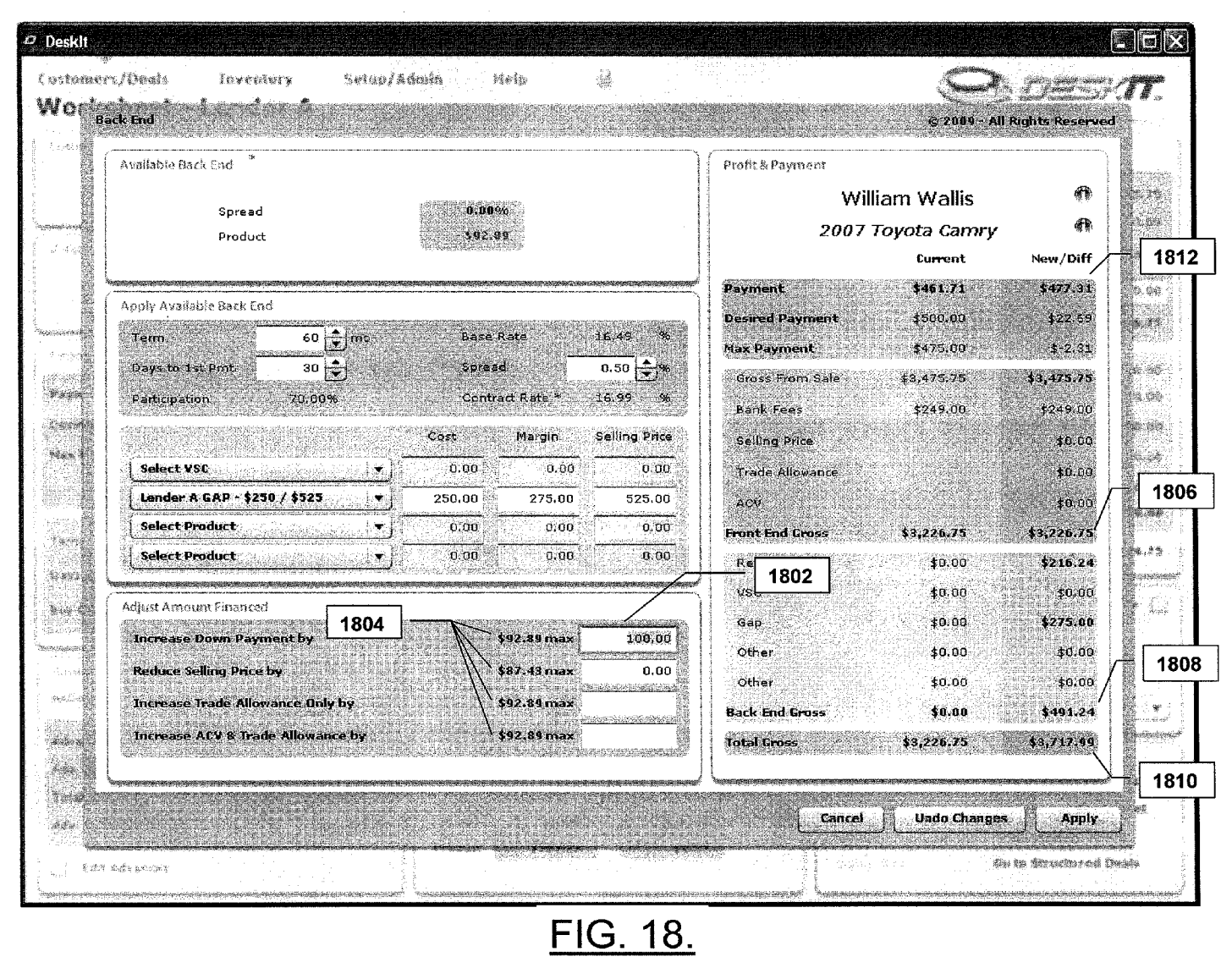

FIG. 18 illustrates a screen capture of an example user interface for applying available back-end spread and product according to an example embodiment of the invention;

FIG. 19 illustrates a flowchart according to an example method for applying available back-end spread and product according to an example embodiment of the present invention;

FIGS. 20a, 20b, and 20c illustrate a series of flowcharts according to an example method for updating profit and payment according to an example embodiment of the invention;

Figure 21:
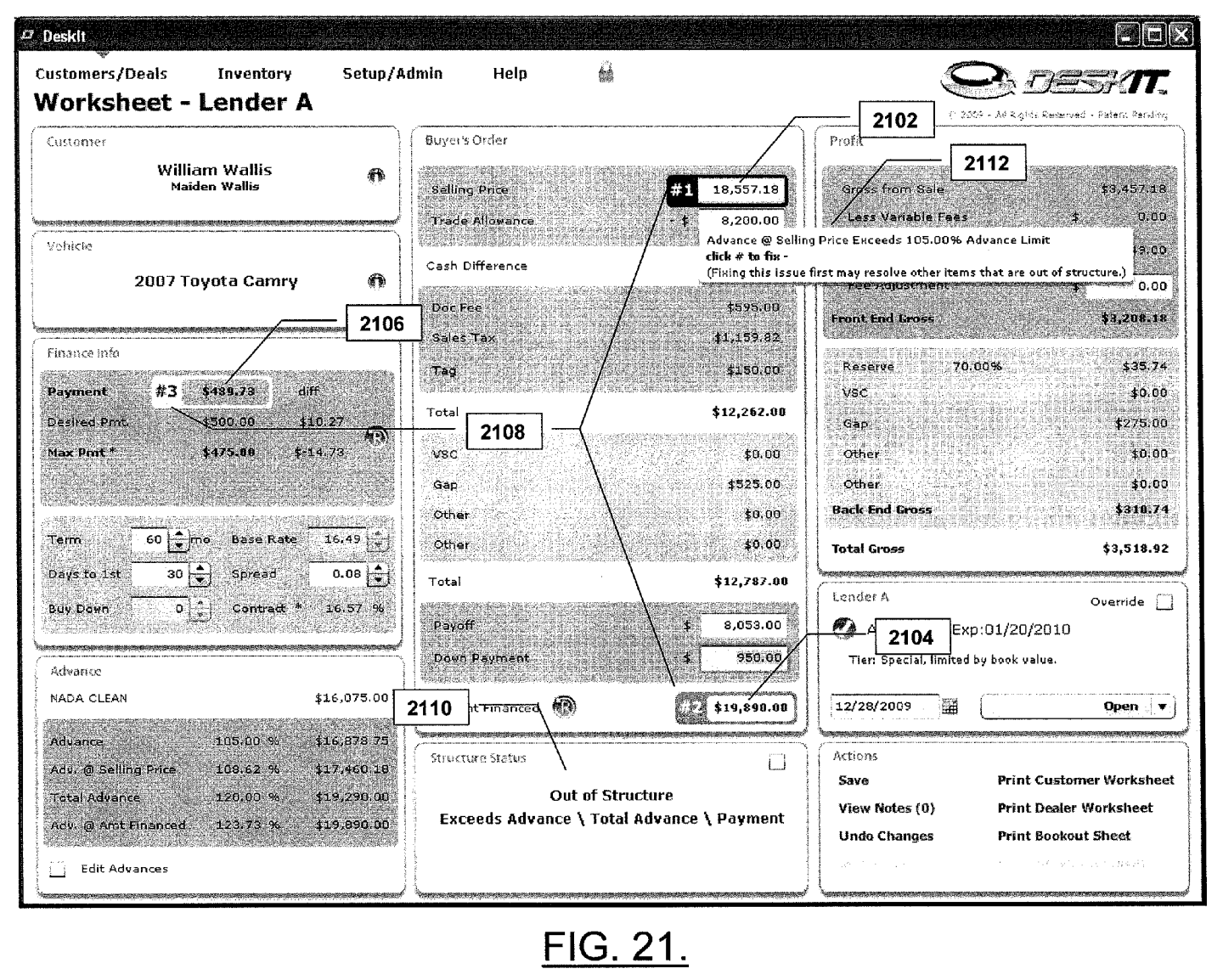

FIG. 21 illustrates a screen capture of an example user interface for prioritizing and correcting problems with advance, total advance & payment in deal structure according to an example embodiment of the invention;

FIG. 22 illustrates a screen capture of an example user interface for correcting problems with advance in deal structure according to an example embodiment of the invention;

Figure 23:
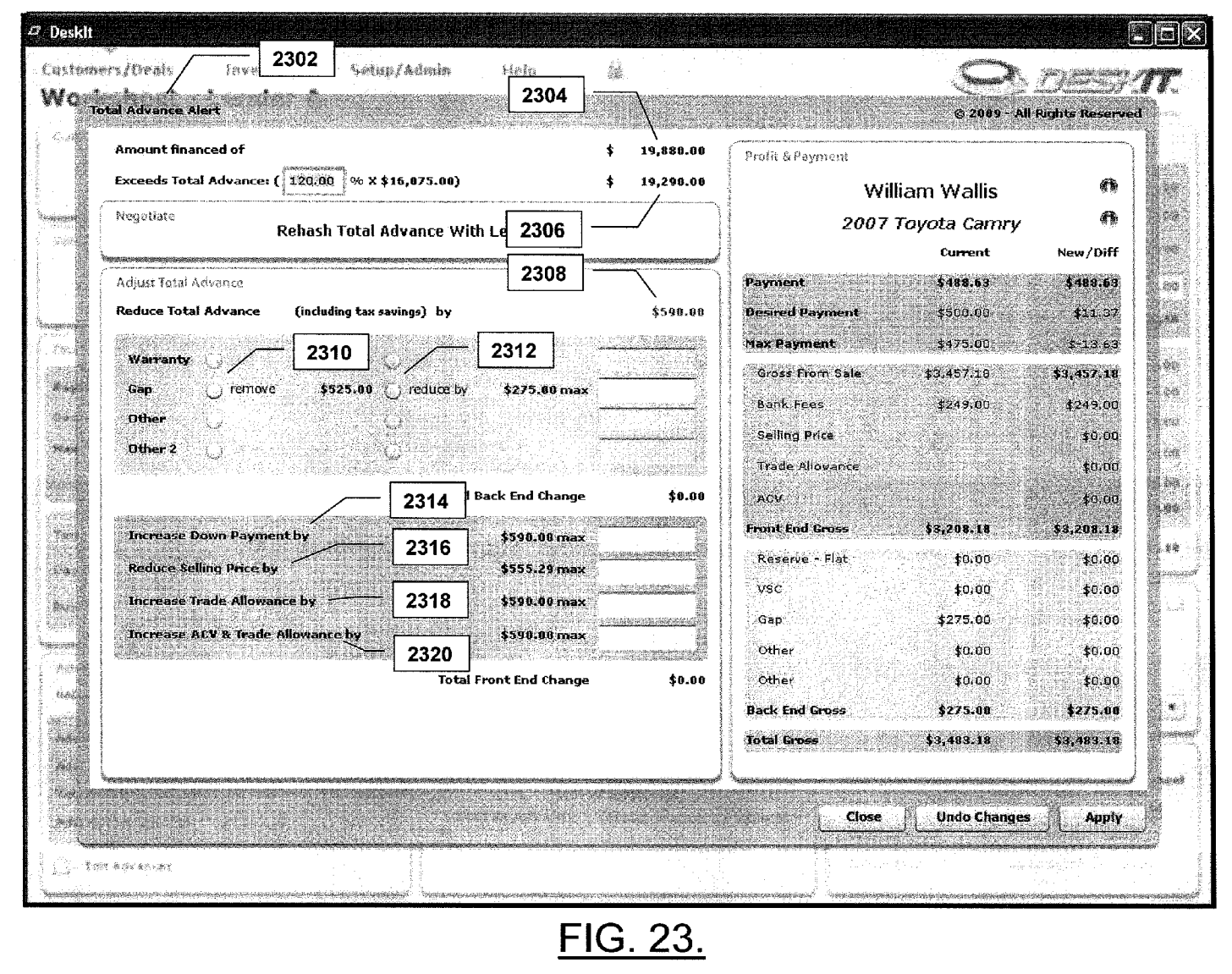

FIG. 23 illustrates a screen capture of an example user interface for correcting problems with total advance in deal structure according to an example embodiment of the invention;

FIG. 24 illustrates a screen capture of an example user interface for correcting problems with payment in deal structure according to an example embodiment of the invention;

FIG. 25 illustrates a series of flowcharts according to an example method for prioritizing and correcting problems with advance, total advance and payment in deal structure according to an example embodiment of the invention;

FIGS. 26a, 26b, and 26c illustrate a series of flowcharts according to an example method for correcting problems with advance, total advance and payment in deal structure according to an example embodiment of the invention;

FIG. 27 illustrates a flowchart according to an example method for rolling back advance at selling price according to an example embodiment of the invention;

Figure 28:
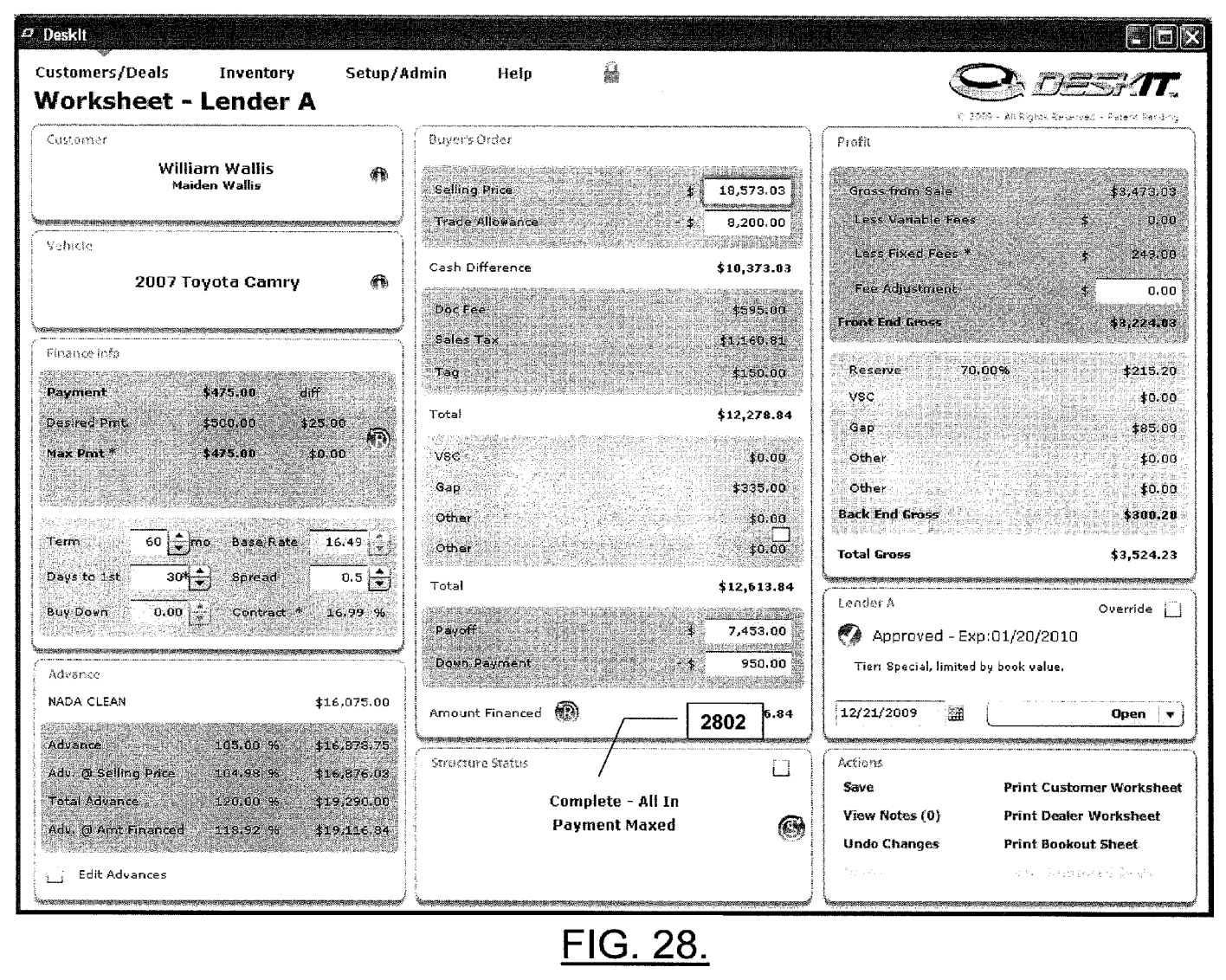
Figure 29:
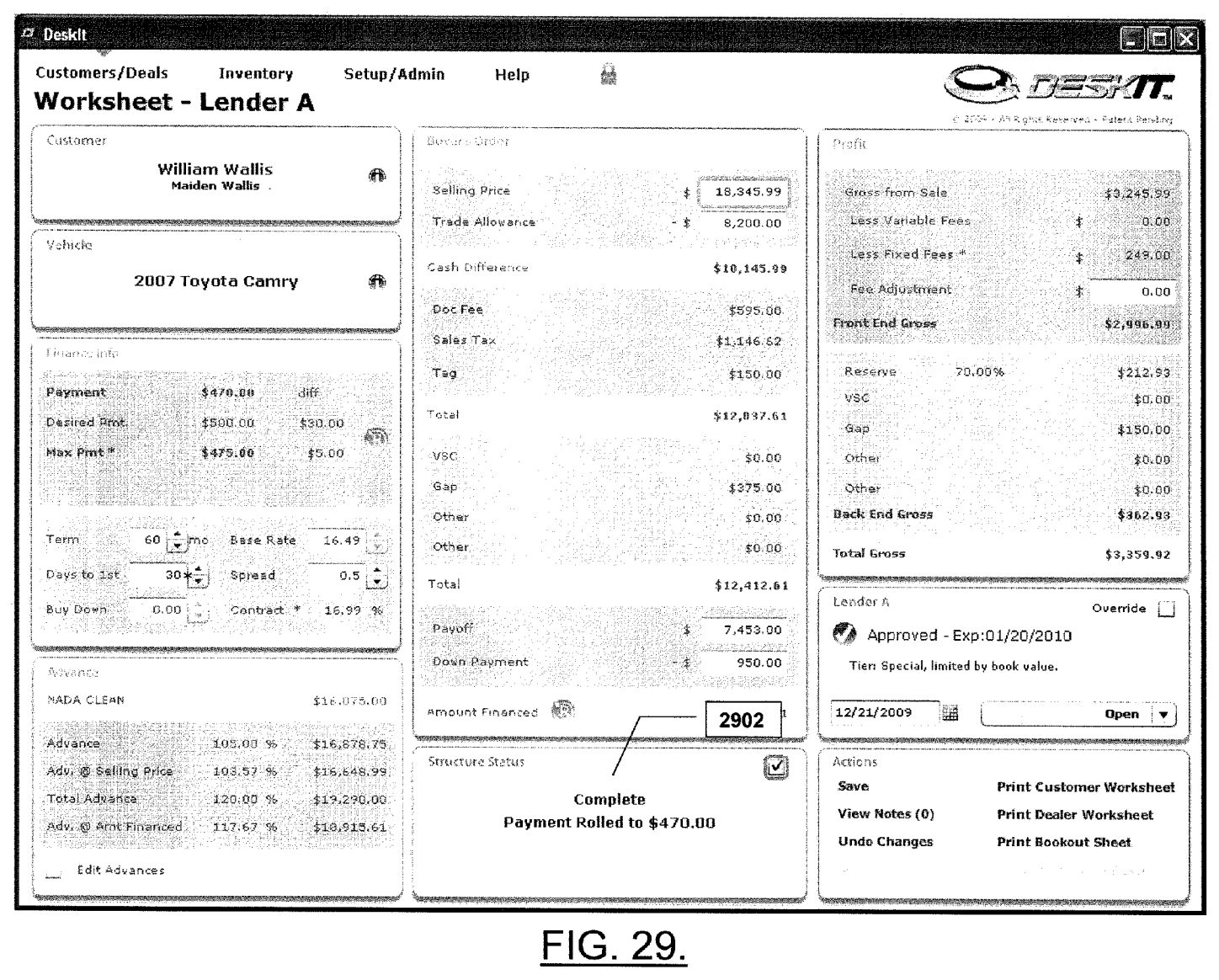

FIGS. 28-29 illustrate screen captures of an example user interface for defining and presenting a deal structure condition;

FIG. 30 illustrates a flowchart according to an example method for defining and presenting deal structure status according to an example embodiment of the invention;

Figure 31:
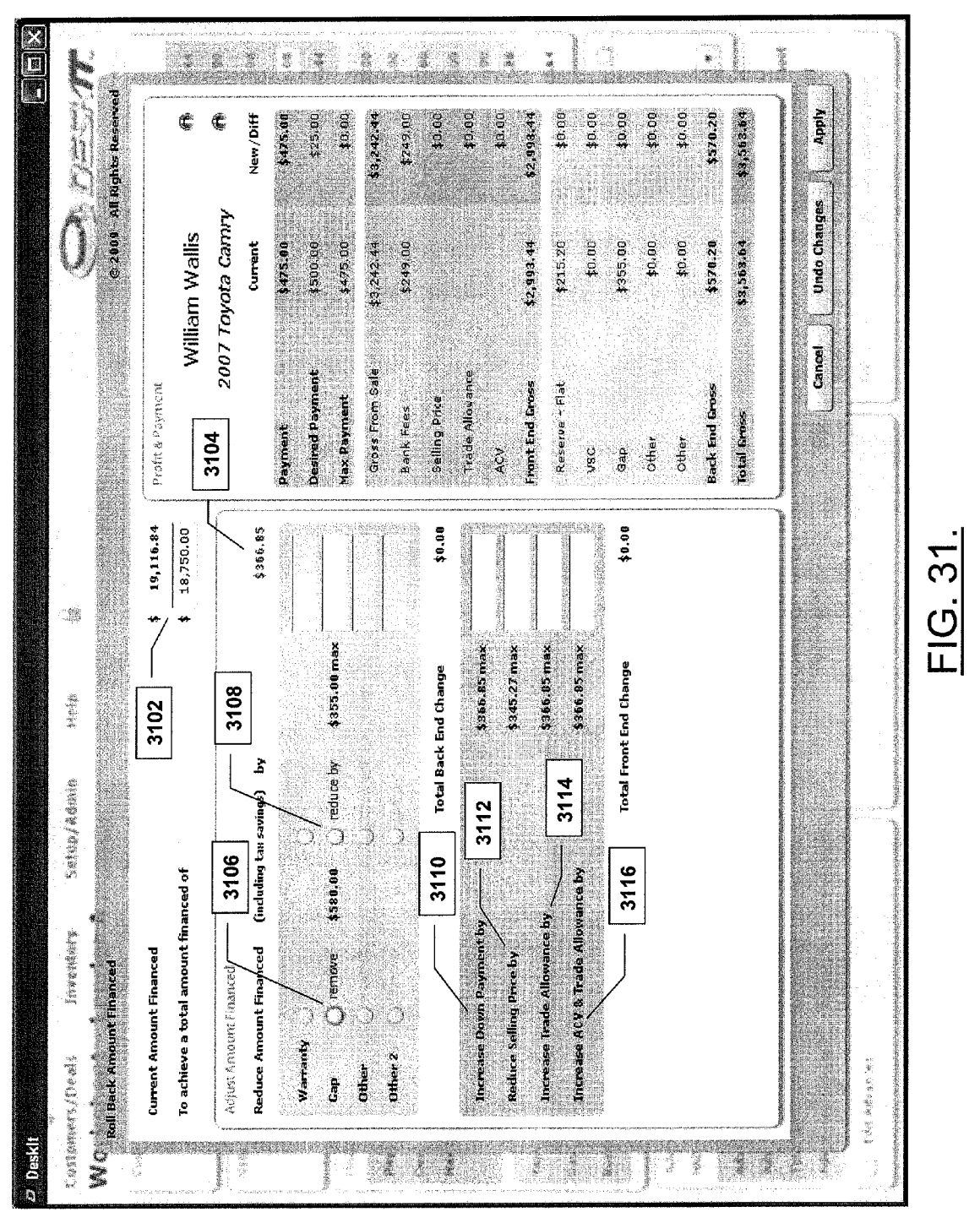

FIG. 31 illustrates a screen capture of an example user interface for rolling back an amount financed according to an example embodiment of the invention;

FIG. 32 illustrates a screen capture of an example user interface for rolling back an amount financed according to an example embodiment of the invention;

FIG. 33 illustrates a flowchart according to an example method for rolling back an amount financed according to an example embodiment of the invention;

Figure 34:
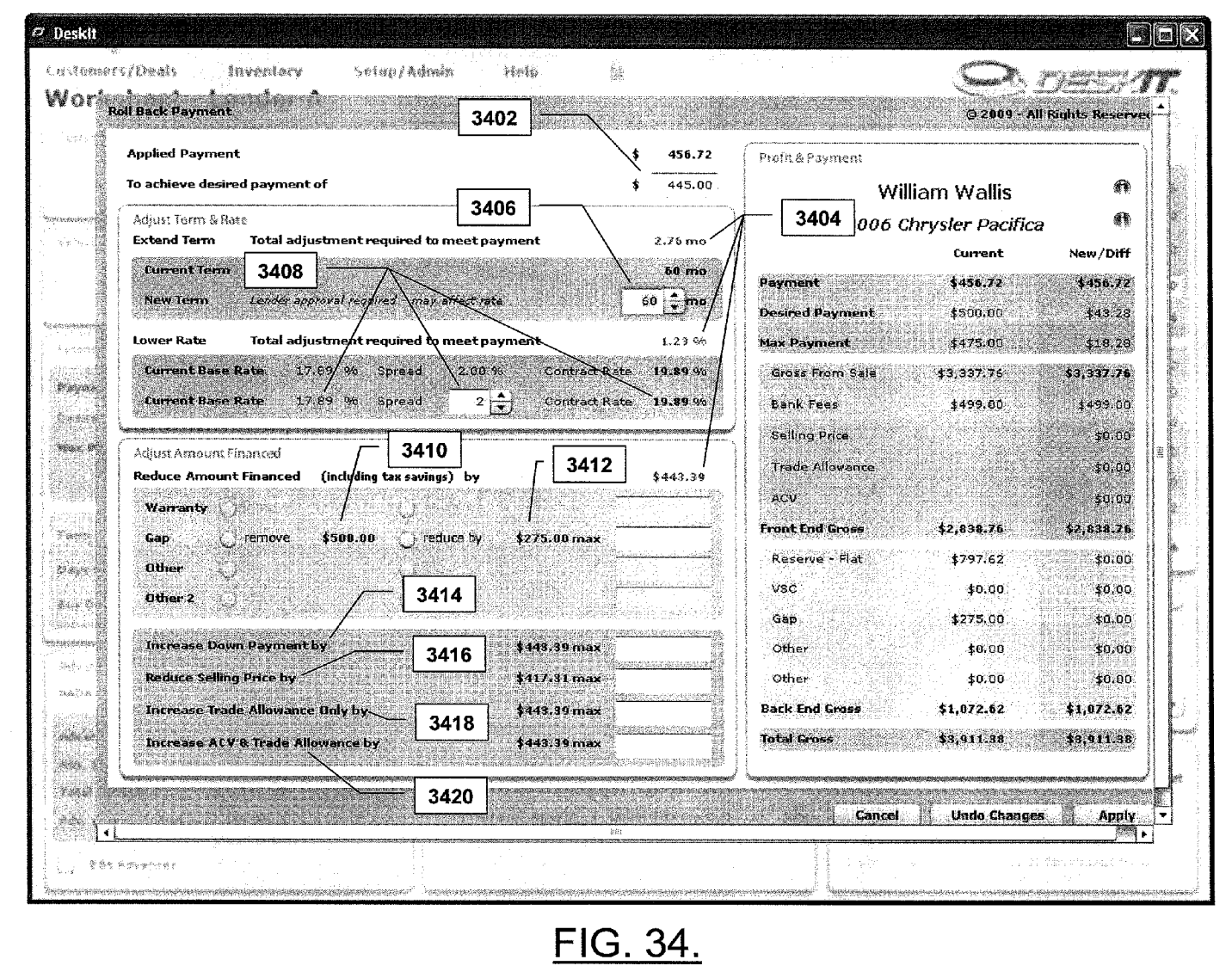

FIG. 34 illustrates a screen capture of an example user interface for rolling back a payment according to an example embodiment of the invention;

FIG. 35 illustrates a screen capture of an example user interface for rolling back a payment according to an example embodiment of the invention;

FIG. 36 illustrates a flowchart according to an example method for rolling back payment according to an example embodiment of the invention;

Figure 37:
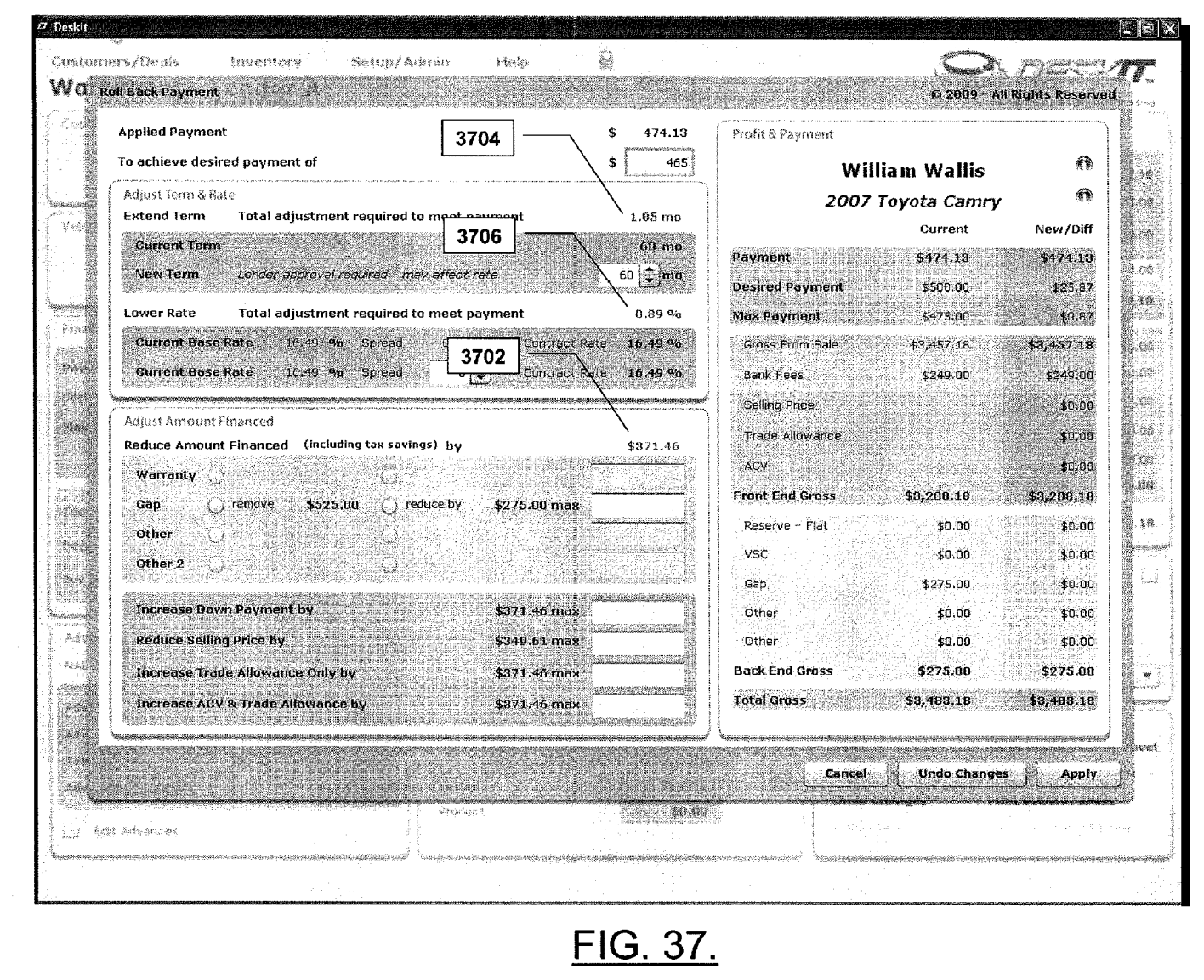

FIG. 37 illustrates a screen capture of an example user interface for rolling back a payment according to an example embodiment of the invention;

FIG. 38 illustrates a flowchart according to an example method for determining the rate at present value according to an example embodiment of the invention;

Figure 39:
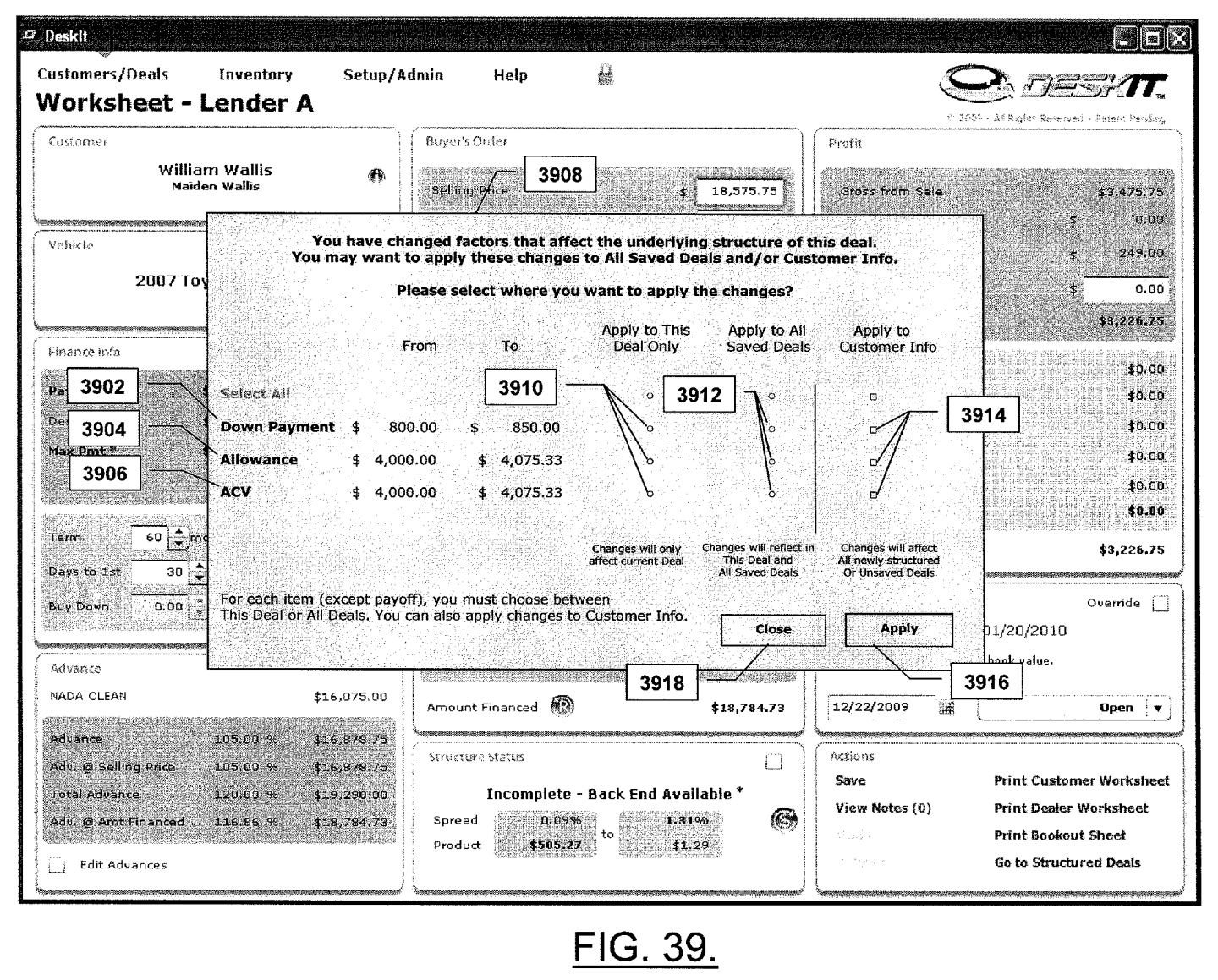

FIG. 39 illustrates a screen capture of an example user interface for applying changes to a deal structure to other saved deals according to an example embodiment of the invention;

FIG. 40 illustrates a flowchart according to an example method for applying changes to a deal structure to other deals, such as a saved deal, according to an example embodiment of the invention;

FIG. 41 illustrates a flowchart according to a process to apply changes according to an example embodiment of the invention;

Figure 42:
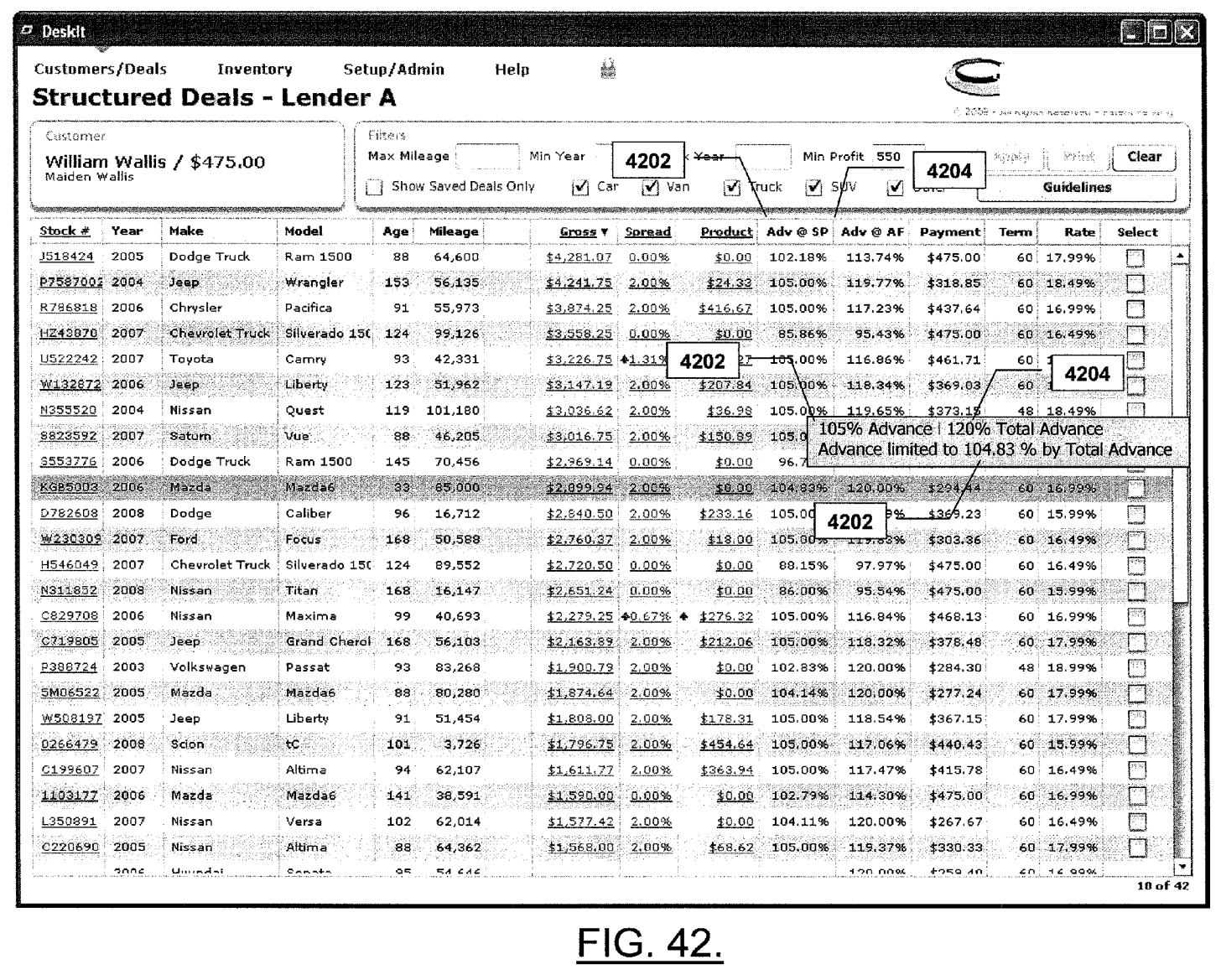
Figure 43:
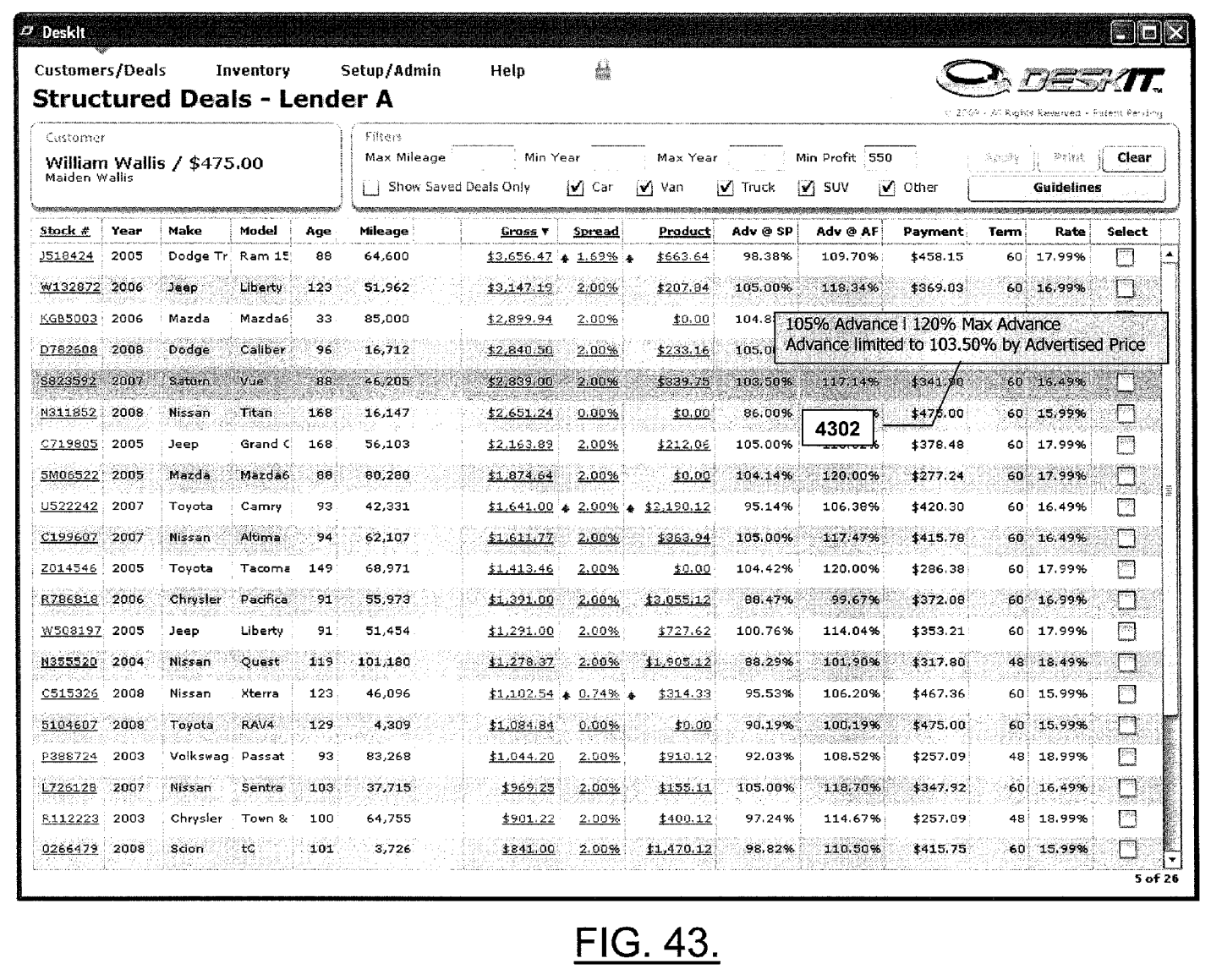

FIGS. 42-43 illustrate screen captures of an example user interface for defining and presenting advance at selling price and total advance at amount financed according to an example embodiment of the invention;

FIG. 44 illustrates a flowchart according to an example method for defining and presenting advance @ selling price and advance @ amount financed according to an example embodiment of the invention;

FIG. 45 illustrates a flowchart according to an example method for defining and presenting advance @ selling price and advance @ amount financed according to an example embodiment of the invention;

Figure 46:
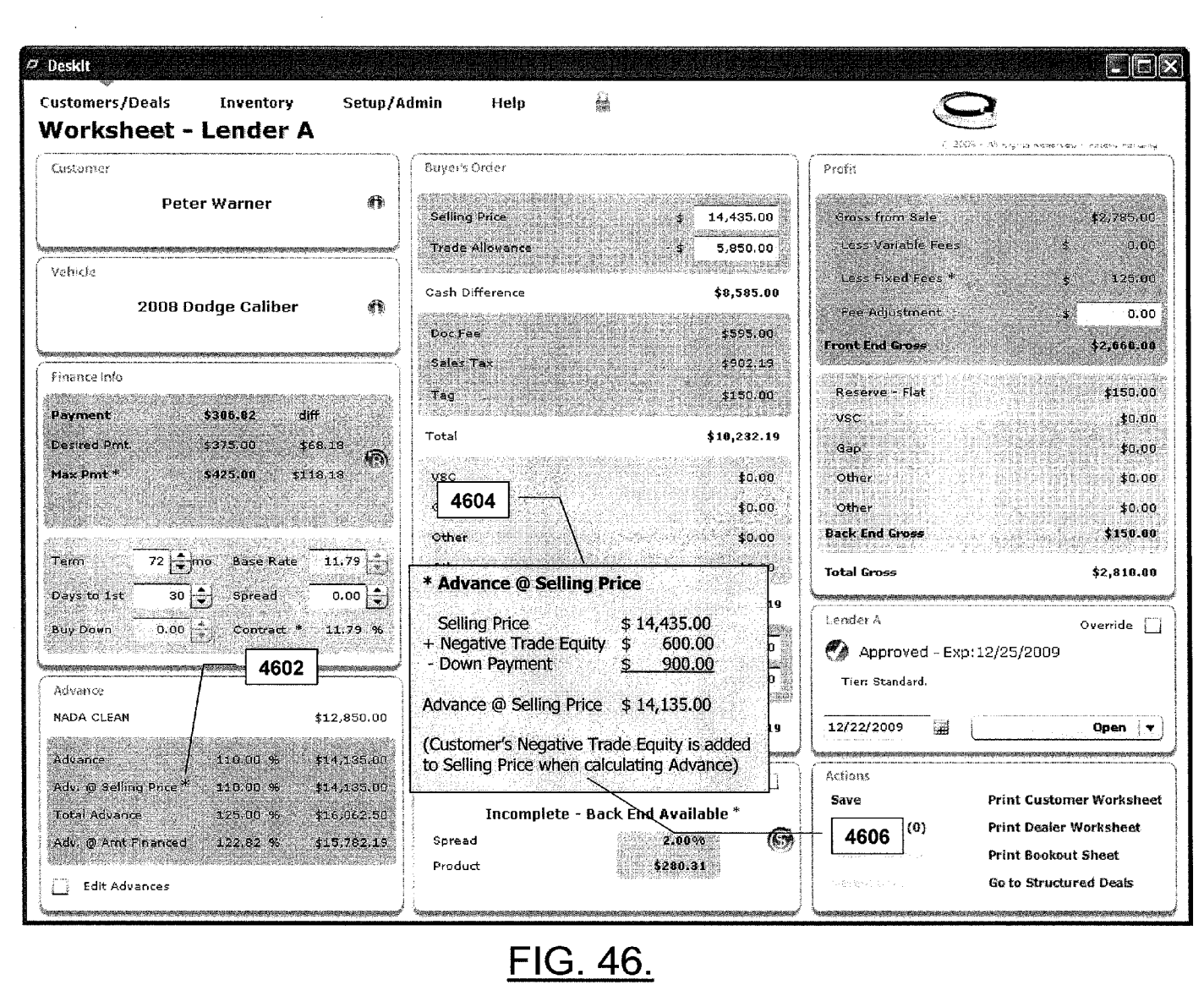
Figure 47:
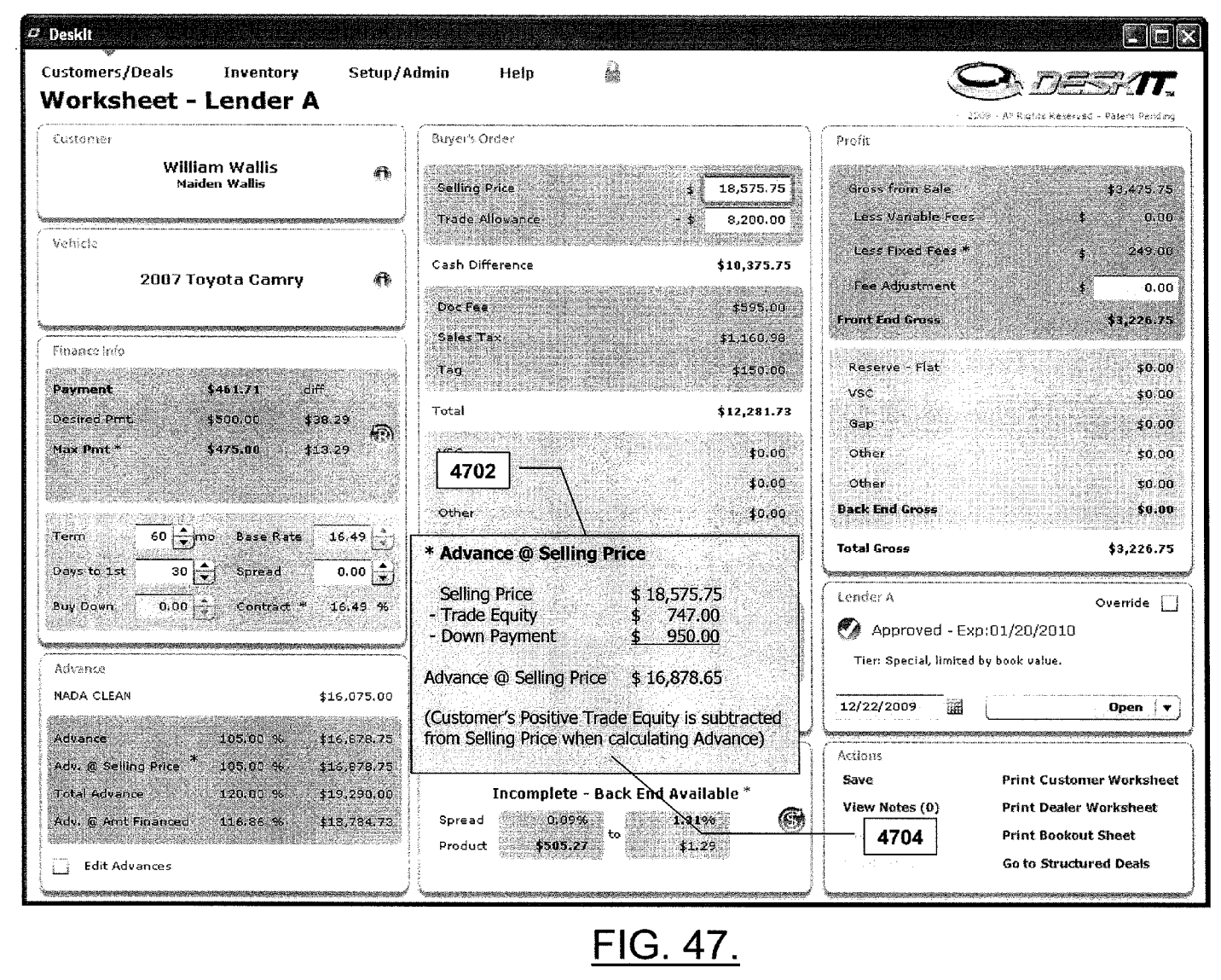

FIGS. 46 and 47 illustrate screen captures of an example user interface for defining and presenting the relationship of advance to selling price according to an example embodiment of the invention;

FIG. 48 illustrates a flowchart according to an example method for defining and presenting the relationship of advance to selling price according to an example embodiment of the invention;

FIG. 49 illustrates a flowchart according to an example method for facilitating financing of a product transaction according to an example embodiment of the invention; and FIG. 50 illustrates a flowchart according to an example method for facilitating rollback of one or more of an amount financed or a payment amount for a product transaction according to an example embodiment of the invention.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

For purposes of example, embodiments of the invention will be described in connection with the automotive industry. However, it will be appreciated that embodiments of the invention may also be applied to any product industry and/or distributorship including, for example, boat, recreational vehicle (RV), power sports, and similar industries. At least some embodiments of the invention may comprise and/or be implemented in, for example, desking tools, dealer management systems and/or other deal structuring devices.

Referring to FIG. 1, a system for facilitating product transactions according to an example embodiment of the invention is illustrated. The system of FIG. 1 may further facilitate, structuring product sales, leases, and/or other deals (e.g., vehicle sales). It will be appreciated that respective embodiments described herein and illustrated in respective figures are provided by way of example and not by way of limitation. Accordingly, example embodiments illustrated and/or described herein should not be construed to narrow the scope or spirit of the invention in any way. It will be appreciated that the scope of the invention encompasses many potential embodiments in addition to those illustrated and described herein for purposes of example. As such, while FIG. 1 illustrates one example of a configuration of a system for facilitating product transactions, numerous other configurations may also be used to implement embodiments of the present invention The system may include one or more deal structuring devices 102, data sources 104, communication links 106, and/or users 108 (one of each being shown in FIG. 1). In at least some example embodiments, the deal structuring device 102 comprises a computing device or plurality of computing devices on which example embodiments of the invention may be practiced. In this regard, the deal structuring device 102 may comprise or be embodied in one or more processing apparatuses, such as a desktop computer, laptop computer, server, mobile terminal, mobile computer, portable digital assistant (PDA), pager, mobile phone, mobile communication device, game device, digital camera/camcorder, audio/video player, television device, radio receiver, digital video recorder, positioning device, any combination thereof, and/or the like. Accordingly, a user 108 may use or otherwise access (e.g., directly or indirectly) a deal structuring device 102 to use example embodiments of the invention. A data source 104 comprises a computing device, memory device, and/or the like providing an external source of data that is provided to and/or otherwise accessible by a deal structuring device 102 over a communication link 106. A data source 104 may be implemented, for example, by a lender, by a product dealer or by a third party on behalf of a product dealer. Data provided by and/or accessible from a data source 104 may include, for example, product (e.g., vehicle) values, inventory data, lender pricing and/or structure guidelines and/or the like.

The communication link 106 may generally include means for a deal structuring device 102 to directly and/or indirectly communicate with a data source 104. In this regard, a communication link 106 may comprise a direct communication link (e.g., an uplink or downlink) that may be wired, wireless, or some combination thereof. Additionally or alternatively, a communication link 106 may comprise one or more networks (not shown). The network(s) can comprise any of a number of different combinations of one or more different types of networks. For example, the network(s) can include one or more data networks, such as one or more wireline or wireless local area networks (LANs), wide area networks (WAN) (e.g., the Internet) or the like; and may include one or more wireline and/or wireless voice networks.

Referring now to FIG. 2, a block diagram of an apparatus that may be configured to operate as a deal structuring device 102, data source 104, and/or to otherwise implement one or more example embodiments of the invention is shown. As shown, the apparatus generally includes various means for performing one or more functions in accordance with example embodiments of the present invention, including those more particularly shown and described herein. It should be understood, however, that one or more of the entities may include alternative means for performing one or more like functions, without departing from the spirit and scope of embodiments of the present invention. More particularly, for example, as shown in FIG. 2, the apparatus may include a processor 202 connected to a memory 204.

The processor 202 may be embodied as various means including, for example, a microprocessor, a coprocessor, a controller, or various other processing elements including integrated circuits such as, for example, an ASIC (application specific integrated circuit) or FPGA (field programmable gate array). Although illustrated in FIG. 2 as a single processor, the processor may comprise a plurality of processors, which may operate cooperatively to execute one or more functions in accordance with example embodiments of the present invention. In embodiments wherein the processor comprises a plurality of processors, the plurality of processors may be embodied on a single computing device or may be distributed across a plurality of computing devices, which may be in communication with each other and/or under common control.

The memory 204 may comprise volatile and/or non-volatile memory. The non-volatile memory may comprise embedded and/or may be removable non-volatile memory. The memory typically stores content, data or the like. For example, the memory may store content transmitted from, and/or received by, the apparatus. Also for example, the memory typically stores software applications, instructions or the like for the processor to perform functions associated with operation of the apparatus in accordance with example embodiments of the present invention. Although illustrated in FIG. 2 as a single memory, the memory 204 may comprise a plurality of memories. The plurality of memories may be embodied on a single computing device or may be distributed across a plurality of computing devices, which may collectively comprise and/or be accessible to the apparatus illustrated in FIG. 2.

Although described herein as being implemented as a computer program product(s) comprising a computer readable medium(s) (e.g., the memory 204) storing computer-readable program instructions (e.g., software), it should be understood that any one or more of the functions described herein may alternatively be implemented in firmware or hardware, without departing from the spirit and scope of embodiments of the present invention. Generally, then, an apparatus according to example embodiments of the present invention may include one or more logic elements for performing various functions. As will be appreciated, the logic elements may be embodied in any of a number of different manners. In this regard, the logic elements performing the respective functions may be embodied in an integrated circuit assembly including one or more integrated circuits integral or otherwise in communication with a respective apparatus or more particularly, for example, a processor 202 of the respective apparatus.

In addition to the memory 204, the processor 202 may also be in communication with and/or control operation of at least one interface or other means for displaying, transmitting and/or receiving data, content or the like. In this regard, the interface(s) may include at least one communication interface 206 or other means for transmitting and/or receiving data, content or the like, as well as at least one user interface that may include a display 208 and/or a user input interface 210. The user input interface 210, in turn, may comprise any of a number of devices allowing the apparatus to receive data from a user, such as a keypad, a touch display, a joystick or other input device. It should be understood that not all apparatuses comprise all the elements illustrated.

Calculating and Presenting Available Back-End Spread and Product

Desking tools typically enable dealerships to discover the vehicles that provide the highest front-end gross profit for the dealer. However, front-end gross only accounts for a portion of the profit a dealership can earn on a transaction. Back-end gross is the profit earned by a dealership on interest rate spread and the sale of back-end products (warranties, GAP insurance, and other products). The limitations of payment and total advance may restrict the amount of back-end spread and product that can be added to a deal. Discovering and presenting the amount of available back-end may be a complex process.

As indicated, the limiting factors of payment and total advance may restrict back-end differently. Payment may limit both interest rate spread and product. Total advance may limit only product. Next, in some structures there may be a dependency between the variables of spread and product. A dependency means that taking either back-end spread or back-end product to its maximum allowable limit lowers the otherwise maximum allowable limit for the other variable. The breakpoint at which that occurs varies from structure to structure. The breakpoints also differ based upon the variable being maximized. In other structures, there is no dependency between spread and product. In these structures, the maximum allowable limits of back-end spread and back-end product can be realized independently without affecting the maximum limit of the other. Adding to these difficulties are the dealership's changing desires to interpret and apply back-end. Sometimes dealerships want to interpret the data to realize maximum back-end spread. Other times they want to realize maximum back-end product.

Currently, dealerships use a process of trial and error to discover available back-end. Through multiple iterations they may discover an amount of back-end spread and back-end product that fits within the limits of payment and total advance. This trial and error process takes time, may not be precise and often leaves dealerships with unrealized profit or contracts being sent to lenders out-of-structure. Out-of-structure deals exceed the limit allowed by payment, advance or total advance. After receiving an out-of-structure deal, lenders send the loan package back to the dealership to have the structure corrected and the customer re-contracted.

Thus, as described, existing desking tools and dealer management systems do not offer a solution that defines the available back-end spread and back-end product. One example aspect of the invention may address this problem by providing a system that may quickly present the precise limits of back-end spread and back-end product available underneath the limits of payment and total advance.

This example aspect of the invention may accordingly simplify the difficulty involved with presenting back-end. In this regard, at least some embodiments of the invention may determine if a dependency between back-end spread and back-end product exists. If a dependency does exist, back-end spread and back-end product may be presented to users in a range. The range may allow users to interpret the data from two perspectives. Example embodiments of the invention may define and present Maximum Available Back-End Spread with Remaining Back-End product and Maximum Available Back-End Product with Remaining Back-End Spread. The presentation may further show users the exact breakpoints where maximizing back-end spread and/or back-end product begin to affect one another. If a dependency does not exist, back-end spread and back-end product may be presented as flat amounts.

FIG. 3 illustrates a screen capture of an example user interface for calculating and presenting available back-end spread and product according to an example embodiment of the invention. It will be appreciated that the screen capture illustrated in FIG. 3 as well as the example screen captures illustrated in other figures are provided by way of example and not by way of limitation. Accordingly, example embodiments of the invention may implement user interfaces other than those illustrated in and described with respect to the figures. For example, other embodiments of the invention may implement user interfaces having a different selection and arrangement of data. As another example, other embodiments of the invention may implement user interfaces providing for varying methods of user interaction with data.

Returning to FIG. 3, example embodiments of the invention may calculate and present the amounts (e.g., precise amounts or approximate amounts) of maximum available back-end spread 302 and maximum back-end product 304 to users at the same time that front-end gross is displayed (FIG. 3). Accordingly, users may identify additional opportunity for back-end gross profit enabling them to make better business decisions.

The initial presentation of the amount of available back-end spread or product may show the user whether a range or flat amount is available (FIG. 3). An arrow (↑) or other indication 306 may be used to depict those structures that are presented as a range. Users may be shown the maximum available back-end spread and maximum available back-end product. Those structures presented as flat amounts of back-end spread and back-end product may be presented without an arrow and/or with some other symbol indicative 308 of a flat amount of back-end spread and back-end product. By selecting a link in the columns for Gross, Adv @ SP or Adv @ AF, a user can select an individual deal.

FIG. 4 illustrates a screen capture of an example user interface for calculating and presenting available back-end spread and product according to an example embodiment of the invention. Example embodiments of the invention may allow users to find more detail about the limits of a range when selecting an individual deal. With maximum available back-end spread 402, remaining back-end product 404 may be presented. With maximum available back-end product 406, remaining back-end spread 408 may be presented. When a user positions a cursor over or otherwise selects the asterisk 410 in the structure box, a descriptive window 412 may be displayed, which may define what's being presented to users. FIG. 5 illustrates a screen capture of an example user interface for calculating and presenting available back-end spread and product according to an example embodiment of the invention. Example embodiments of the invention may allow users to access a similar descriptive window 502 provided for structures with flat amounts indicating maximum of available back-end spread and back-end product. An icon 503 may also be provided, which when clicked allows users access to a new window to apply back-end spread and product.

FIG. 6 illustrates a flowchart according to an example method for calculating and presenting available back-end spread and product according to an example embodiment of the invention. The method may comprise running a test to determine whether Back-end Spread and/or Product are available (see, e.g., FIG. 7), at operation 602. If the test determines that there is availability of back-end spread and/or back-end product, operation 604 may comprise calculating, the maximum available back-end spread (see, e.g., FIG. 9). Operation 606 may comprise calculating the remaining back-end product (see, e.g., FIG. 11). The method may then comprise running a test to determine if there is a Spread and Product Dependency (see, e.g., FIG. 12), at operation 608. If the test determines that a dependency does not exist, the calculated values for maximum available back-end spread and remaining back-end product may be displayed as flat amounts, at operation 610. If the test determines that a dependency does exist a range may be presented. Operation 612 may comprise presenting the two amounts calculated for maximum available back-end spread and remaining back-end product as maximum available back-end spread and remaining back-end product, respectively. Operations 614 and 616 may comprise calculating the maximum available back-end product (see, e.g., FIG. 8) and remaining back-end spread (see, e.g., FIG. 13), respectively. The calculated maximum available back-end product and remaining back-end spread may be displayed, at operation 618. If, however, it is determined at operation 602 that back-end is not available, the method may comprise Defining and Presenting Deal Structure Status, at operation 620 (see, e.g., FIG. 29).

FIG. 7 illustrates a flowchart according to an example method for determining whether Back-End Spread and/or Product are available according to an example embodiment of the invention. Maximum available back-end product (see, e.g., FIG. 8) may be determined, at Operation 702. A test may be run to see if maximum available back-end product is greater than zero (0), at Operation 704. If maximum available back-end product is greater than zero (0), (e.g., if true), a result of true may be returned to indicate that there is available back-end product, at Operation 706. If maximum available back-end product is less than or equal to zero (0), (e.g., if false, indicating that there is no available back-end product), maximum available back-end spread (see, e.g., FIG. 9) may be found at Operation 708. A test may be run to see if maximum available back-end spread is greater than zero (0) at Operation 710. If maximum available back-end spread is greater than zero (0), (e.g., if true), a result of true may be returned to indicate that there is available back-end spread, at Operation 706. If maximum available back-end spread is less than or equal to zero (0), (e.g., if false, indicating there is no available back-end spread), a result of false may be returned at Operation 712.

FIG. 8 illustrates a flowchart according to an example method for calculating or otherwise determining maximum available back-end product according to an example embodiment of the invention. Maximum available back-end product may comprise the amount of principle that can be added to the current principle, within the limits of total advance and/or target payment, given the current interest rate and term. To determine the amount, operation 802 may comprise calculating the Available Principle @ Total Advance using equation [1] as described below:

$$\text{Available Principle@Total Advance} = \text{Total Advance Amount} - \text{Amount Financed} \quad [1],$$

where:

$$\text{Total Advance Amount} = \text{book value} * (\text{total advance}/100) \quad [2]$$

$$\text{Amount Financed} = \text{Cash Difference} + \text{payoff amount} - \text{down payment} + \text{Sales Tax} + \text{doc fee} + \text{tag fee} + \text{warranty selling price} + \text{gap selling price} + \text{other product(s) total} \quad [3]$$

$$\text{Cash Difference} = \text{Selling Price} - \text{Trade Allowance} \quad [4]$$

$$\text{Sales Tax} = (\text{tax rate}/100) * \text{taxable amount} \quad [5]$$

$$\text{Selling Price} = \text{Advance Amount} + \text{down payment} + \text{trade allowance} - \text{payoff amount} \quad [6]$$

$$\text{Advance Amount} = \text{book value} * (\text{advance}/100) \quad [7]$$

Operation 804 may comprise calculating the Available Principle @ Target Payment using equation [8] as described below:

$$\text{Available Principle@Target Payment} = \text{Max Principle} - \text{Amount Financed} \quad [8],$$

where:

Max Principle=Principle at target payment and contract rate [9]

Principle=payment/((1+days/30*(rate/1200))/(((1−1/((1+rate/1200)^term))/(rate/1200))*(rate/1200+1))) [10]

Payment=principle*((1+days/30*(rate/1200))/(((1−1/((1+rate/1200)^term))/(rate/1200))*(rate/1200+1))) [11]

Term=−1*(log(1−rate*Present Value/payment))/(log(1+rate)) [12]

Operation 806 may comprise comparing Available Principle @ Total Advance and Available Principle @ Target Payment to determine which is the smaller value, and the smaller value may be returned as maximum available back-end product (e.g., operation 808 or operation 810).

FIG. 9 illustrates a flowchart according to an example method for calculating or otherwise determining the maximum available back-end spread according to an example embodiment of the invention. Maximum available back-end spread may comprise the amount of interest rate spread that can be added to the current interest rate, within the limits of target payment and spread caps, given the current principle and term. The method may comprise determining Rate at Amount Financed (see, e.g., FIG. 10), at operation 902. Operation 904 may comprise calculating the Potential Spread using Rate @ Amount Financed (see, e.g., FIG. 10) as rate. The Potential Spread may be calculated using the equation:

Potential Spread=rate−contract rate [13]

Operation 906 may comprise calculating Current Spread [14] using the equation:

Current Spread=contract rate−buy rate [14]

Operation 908 may comprise running a test to determine whether the sum of Potential Spread and Current Spread exceeds the spread cap(s). The spread caps may be defined by applicable law, such as, for example Car Buyers Bill of Rights law. If the sum of Potential Spread and Current Spread exceeds the spread cap(s) (e.g., if true), Available Back-End Spread may be defined as Spread Cap minus Current Spread, at operation 910. If the sum of Potential Spread and Current Spread does not exceed the spread cap(s) (e.g., if false), Available Back-End Spread may be set equal to Potential Spread, at operation 912. A test may then be run to determine if Available Back-End Spread is less than zero (0), at operation 914. If true, Available Back-End Spread may be defined as zero (0), at operation 916. If false, Available Back-End Spread may be defined as equal to the calculated value, at operation 918.

FIG. 10 illustrates a flowchart according to an example method for calculating or otherwise determining Rate at Amount Financed according to an example embodiment of the invention. The method may use the payment [11] equation introduced above and shown again below to find what the rate would be assuming the Amount Financed as the principle, using the current term and target payment.

Payment=Amount Financed*((1+days/30*(rate/1200))/(((1−1/((1+rate/1200)^term))/(rate/1200))*(rate/1200+1)))

An iterative calculation may be run to find the rate. The calculation may utilize a given interest rate 1002 and increment variable 1004. Operation 1006 may comprise calculating a test payment with the initial rate, term and/or Amount Financed [3] as principle. The test payment may then be compared to the target payment, at operation 1008. If the test payment is less than or equal to the target payment, the calculation of operation 1006 may be iteratively re-run using a rate value increased by the increment variable at each iteration, at operation 1010 until the limit of target payment is exceeded.

When it is determined at operation 1008 that the test payment is greater than the target payment (e.g., the target payment is exceeded), interest rate may be reduced by the increment variable, at operation 1012. Operation 1014 may comprise returning the resulting rate as Rate @ Amount Financed.

FIG. 11 illustrates a flowchart according to an example method to calculate or otherwise determine the remaining back-end product according to an example embodiment of the invention. Remaining back-end product may comprise the amount of principle that can be added to the current principle, within the limits of total advance and/or target payment, given an interest rate equal to the current rate plus maximum available back-end spread (see, e.g., FIG. 9) and the current term. In order to facilitate determination of the remaining back-end product, four amounts may be calculated. Operation 1102 may comprise calculating the Principle @ Max Rate using the equation:

Principle@Max Rate=Principle [10] calculated using target payment and(contract rate+Available Back-End Spread@Amount Financed) [15]

Operation 1104 may comprise calculating the Available Principle @ Target Payment using equation [8]. Operation 1106 may comprise calculating the available Principle @ Total Advance using equation [1]. Operation 1108 may comprise calculating the Available Principle @ Max Rate using the equation:

Available Principle@Max Rate=Principle@Max Rate−amount financed [16]

Once all four amounts have been calculated, a test may be run to determine if Available Principle @ Target Payment is less than Available Principle @ Total Advance, at operation 1110. If true, Available Principle @ Max Rate may be returned as remaining back-end product, at operation 1112. If false, the lesser of Available Principle @ Max Rate and Available Principle @ Total Advance may be returned as remaining back-end product, at operation 1114.

FIG. 12 illustrates a flowchart according to an example method for determining whether there is a Back-end Spread and Back-End Product Dependency according to an example embodiment of the invention. A dependency may be found when taking one of the variables of back-end spread or back-end product to its maximum allowable limit lowers the otherwise maximum allowable limit for the other variable. Finding this dependency may comprise a critical decision point when determining how to present back-end spread and back-end product.

If no dependency between back-end spread and back-end product exists, back-end spread and back-end product may be presented as independent or flat amounts. Users may be able to apply each amount at its maximum level without affecting the availability of the other. If dependency does exist, back-end spread and back-end product may be presented in a range. One end of the range may maximize back-end spread and the other end of the range may maximize back-end product. A range may allow users to see the dependency between back-end spread and back-end product.

The method may include finding maximum available back-end product, at operation 1202 (see, e.g., FIG. 8) and remaining back-end product, at operation 1204 (see, e.g., FIG. 11). A test may then be run to determine if maximum available back-end product is greater than remaining back-end product, at operation 1206. If true, a dependency may be determined to exist, at operation 1208. If false, a dependency may be determined to not exist, at operation 1210.

FIG. 13 illustrates a flowchart according to an example method for calculating or otherwise determining remaining back-end spread according to an example embodiment of the invention. Remaining back-end spread may comprise the amount of interest rate spread that can be added to the current interest rate, within the limits of target payment and spread caps, given a principle amount equal to the current principle plus maximum available back-end product (FIG. 8) and the current term. The method may comprise calculating Available Principle @ Total Advance using equation [1], at operation 1302. Operation 1304 may comprise calculating Available Principle @ Target Payment using equation [8]. A test may then be run to determine if Available Principle @ Total Advance is less than Available Principle @ Target Payment, at operation 1306. If false, remaining back-end spread may be returned as zero, at operation 1308.

If true (e.g., Available Principle @ Total Advance is less than Available Principle @ Target Payment), Rate @ Total Advance may be found, at operation 1310 (see, e.g., FIG. 14). Rate @ Total Advance may then be used to solve for Potential Spread using equation [13], at operation 1312. Operation 1314 may comprise calculating Current Spread using equation [14]. Operation 1316 may comprise running a test to determine if the combination of Potential Spread and Current Spread is greater than the spread cap. The spread cap may be defined by applicable law, such as, for example, Car Buyers Bill of Rights law. If true, Available Back-End Spread may be set equal to Spread Cap minus Current Spread, at operation 1318. If false, Available Back-End Spread may be set equal to Potential Spread, at operation 1320.

A further test may be run to determine if Available Back-End Spread is less than zero (0), at operation 1322. If true, remaining back-end spread may be set equal to zero (0), at operation 1324. If false, Available Back-End Spread may be set equal to Available Back-End Spread, at operation 1326.

FIG. 14 illustrates a flowchart according to an example method for calculating or otherwise determining Rate at Total Advance according to an example embodiment of the invention. This algorithm may use the equation for Payment [11] introduced earlier and shown below to find what the interest rate would be assuming Total Advance (equation [2]) as principle.

$$\text{Payment} = \text{Total Advance} * ((1+\text{days}/30*(\text{rate}/1200))/ (((1-1/((1+\text{rate}/1200)^{\text{term}}))/(\text{rate}/1200))*(\text{rate}/1200+1)))$$

An iterative calculation may be run to find the rate. The method may begin with a given interest rate 1402 and increment variable 1404. A test payment may then be calculated with the initial rate, term and/or Total Advance (equation [2]) as principle, at operation 1406. The test payment may then be compared to the target payment, at operation 1408. If the test payment is less than or equal to the target payment, the calculation may be iteratively re-run by increasing the rate by the increment variable at operation 1410 until target payment is determined to be exceeded at operation 1408.

At the point that target payment is greater than the test payment, interest rate may be reduced by the increment variable at operation 1412. Operation 1414 may comprise returning the rate calculated in operation 1412 as Rate @ Total Advance.

Applying Available Back-End Spread and Product

When applying back-end spread and back-end product, it is necessary for individuals to do so under the limiting factors of payment and total advance. Variables affecting application of back-end spread and/or back-end product include, for example, term, interest buy rate, interest rate spread, interest contract rate, cost of back-end products, margin of back-end products, selling price of back-end products, and/or the like.

Because the precise limits of back-end spread and product have not previously been defined, dealerships have previously used a process of trial and error to apply back-end. Through multiple iterations, they may discover an amount of back-end spread and back-end product that fits underneath the limits of payment and total advance. Complicating the process is the fact that adjustments can be made to numerous front-end variables which affect available back-end. This trial and error process takes time and may leave dealerships with unrealized profit or contracts being sent to lenders out-of-structure.

Having calculated and presented available back-end spread and back-end product, example embodiments of the invention also provide for quick application and precise calculation of the available range or amount of back-end spread and back-end product to an individual deal structure. FIG. 15 illustrates a screen capture of an example user interface for applying available back-end spread and back-end product according to an example embodiment of the invention. Example embodiments of the invention may allow users to click or otherwise select the icon 503 (FIG. 5) in the Structure Status box. A new window, such as that illustrated in FIG. 15 may then be presented which allows users to build out the back-end of a deal.

A box at the top of the new window again presents available back-end spread and/or back-end product in a range or as flat amounts 1502. Users are able to see and build out a deal by adjusting variables that affect back-end which may include: term 1504, days to $1^{st}$ payment 1506, participation 1508, base rate 1510, spread 1512, contract rate 1514 and the cost 1516, margin 1518 and selling price 1520 of back-end products such as VSC (Vehicle Service Contracts), GAP Insurance or other back-end products.

FIG. 16 illustrates a screen capture of an example user interface for applying available back-end spread and back-end product according to an example embodiment of the invention. At least some embodiments of the invention may allow users to see the effect (e.g., instantly) of any single change 1602, or a combination of changes, upon the remaining available range or amount of available back-end spread and/or back-end product 1604 and the effect of the changes upon front-end gross 1606, back-end gross 1608, total gross 1610 and payment 1612.

FIG. 17 illustrates a screen capture of an example user interface for applying available back-end spread and back-end product according to an example embodiment of the invention. If in the process of applying back-end spread and back-end product a deal is structured that exceeds total advance or payment 1702, a window (Adjust Amount Financed) 1704 may be displayed that allows the user to additionally adjust the front-end of the deal to bring the deal back into structure. At least some embodiments of the invention may allow users to instantly and simultaneously see front-end variables that can be adjusted and the precise required adjustment of each to bring the total advance and/or payment in structure. The front-end variables may include increasing the down payment 1706, reducing the selling price 1708, increasing trade allowance 1710, increasing actual cash value (ACV) and trade allowance 1712, and/or the like.

FIG. 18 illustrates a screen capture of an example user interface for applying available back-end spread and product according to an example embodiment of the invention. An example embodiment of the invention may allow users to instantly and simultaneously see the effect of any single change 1802, or a combination of changes, upon the remaining required change to each front-end variable 1804 and the effect of the changes upon front-end gross 1806, back-end gross 1808, total gross 1810 and payment 1812.

The ability to manipulate each the individual components of the deal structure while instantly showing the remaining adjustments required and the effect of the adjustments on front-end gross, back-end gross, total gross, and payment may provide significant benefit to dealerships. In addition to saving time, embodiments of the invention may help dealerships properly structure deals and optimize profitability. In this regard, example embodiments of the invention may benefit users by helping them quickly realize available back-end gross and may ensure deals sent to lenders are in structure.

FIG. 19 illustrates a flowchart according to an example method for applying Available Back-End Spread and Back-End Product according to an example embodiment of the present invention. The method may be triggered or otherwise implemented in response to a user making a change to finance terms 1902 (e.g., term, days to $1^{st}$ payment, buy rate, spread or contract rate), product 1904 (e.g., cost, margin or selling price) or amount financed 1906 (e.g., down payment, selling price, trade allowance or ACV and trade allowance).

In response to determination of an adjustment of a variable (e.g., operation 1902, 1904, and/or 1906), the new user selected variable may be used to determine the new amount of Available Back-End Spread and Back-End Product, at operation 1908 (see, e.g., FIG. 6). Profit and Payment may also be updated for the user, at operation 1910 (see, e.g., FIG. 20). Operation 1912 may comprise determining the maximum available back-end product (see, e.g., FIG. 8). A test may then be run to see if maximum available back-end product is exceeded, which may be indicated when the determined maximum available back-end product is less than zero (0), at operation 1914. If the maximum available back-end product is less than zero (0), an Amount Financed Adjustment user interface may be enabled and presented to the user to allow the user to bring the deal back into structure, at operation 1916.

FIG. 20 illustrates a series of flowcharts according to an example method for updating Profit and Payment according to an example embodiment of the invention. The method of FIG. 20a may be used to update payment. Operation 2001 may comprise calculating the new Payment amount using equation [11] and displaying the new payment. Operation 2002 may comprise calculating a difference between the new payment and the desired payment and displaying the difference. Operation 2004 may comprise calculating and displaying the difference between max payment and new payment. The method of FIG. 20b may be used to calculate and display bank fees (operation 2006), selling price reduction (operation 2008), change in trade allowance (operation 2010), change in ACV (operation 2012) and change to front-end gross (operation 2014). The method of FIG. 20c may be used to calculate and display the change in finance reserve (operation 2016), warranty margin (operation 2018), GAP margin (operation 2020), other product margin (operation 2022), back-end gross (operation 2024) and total gross (operation 2026).

Prioritizing and Correcting Problems with Advance, Total Advance & Payment in Deal Structure From time to time deals become out-of-structure. This problem is common and costs dealership staff time re-structuring deals. Dealerships also fail to recognize deals being out-of-structure and may send contracts to lenders that are out-of-structure. Lenders incur a real cost of human labor as these deals are evaluated and sent back to dealerships to have the structure corrected and deals re-contracted. Dealerships incur customer service cost as customers have to come back to the dealership to resign paperwork.

Many factors may cause a deal to be out-of-structure, including, for example, improper initial structuring and changes to price of the vehicle or back-end products, trade allowance, payoff, down payment, term, contract rate, number of days to first payment or wholesale book value. A change to any or all of these factors may cause payment, advance or total advance, or a combination of these to be exceeded, resulting in a deal being out-of-structure. Recognizing that a deal is out-of-structure and knowing which factors need to be adjusted and the optimum order of making those adjustments may be a complex matter.

The complexity may be influenced by the number and combination of factors that bring advance, total advance and payment back into structure. Advance may only be corrected by making adjustments to down payment, selling price, trade allowance and/or ACV. Total advance may be corrected by those factors and a reduction to the selling price or removal of back-end products. Payment may be corrected by all of the preceding factors and adjustments to term, buy rate or spread.

When advance, total advance and payment are exceeded in combination, it is possible to make adjustments that unnecessarily reduce profit. Because problems with structure can have a cascading effect, it is important to correct structural issues by the variables that best preserve profit. Having a prioritized method of correcting problems with a deal structure provides significant business value to users.

Accordingly, example embodiments of the invention provide for Prioritization and Correction of Problems with Advance, Total Advance & Payment in Deal Structure. On adjustment, embodiments of the invention may show (e.g., instantly) users the remaining adjustment required and the effect of the changes upon front-end gross, back-end gross, total gross, and payment.

FIG. 21 illustrates a screen capture of an example user interface for prioritizing and correcting problems with advance, total advance & payment in deal structure according to an example embodiment of the invention. At least some embodiments of the invention may indicate to users whether advance 2102, total advance 2104 or payment 2106, or any combination of the three, becomes out-of-structure by alerting users with a prioritized numbering system 2108. The indications may be numbered with a numbering system so as to both alert users about out-of-structure issues and establish the optimum order for resolving them so profit is preserved. In the embodiment illustrated in FIG. 21, the Structure Status box 2110 also defines and prioritizes problems with Advance, Total Advance and Payment.

When a user positions a cursor over or otherwise selects one of the prioritized numbers, such as, for example, the prioritized number beside advance 2102, a descriptive window 2112 may be displayed that defines the out-of-structure condition along with instructions to correct structure problems. Additional, descriptive windows may address issues with Total Advance and Payment (not shown).

FIG. 22 illustrates a screen capture of an example user interface for correcting problems with advance in deal structure according to an example embodiment of the invention. If a user clicks on any of the presented prioritized numbers, an additional window may open that allows for easy resolution of out-of-structure issues. When solving issues with advance, users may be presented with an "Advance Alert" window 2202. As illustrated in FIG. 22, the current Advance at Selling Price 2204, Advance limit 2206 and/or required Advance reduction 2208 may be presented to users. To simplify resolving advance issues, an example embodiment may present only those items which resolve advance as adjustable items. In this regard, some example embodiments may determine those items which may be adjusted to affect a determined advance issue(s) and present only those determined adjustable items. Such adjustable items may include, for example, increasing down payment 2210, reducing selling price 2212, increasing trade allowance 2214, increasing ACV and trade allowance 2216, and/or the like. The method used to allow users to fix advance is further described below in the section entitled "Rolling Back an Amount Financed."

FIG. 23 illustrates a screen capture of an example user interface for correcting problems with total advance in deal structure according to an example embodiment of the invention. When solving issues with total advance, users may be presented with a "Total Advance Alert" window 2302. The current Amount Financed 2304, Total Advance limit 2306 and/or required Total Amount Financed reduction 2308 may be presented to users. To simplify resolving total advance, an example embodiment may present only those items which resolve total advance as adjustable items. In this regard, some example embodiments may determine those items which may be adjusted to affect a determined advance issue(s) and present only those determined adjustable items. Such adjustable items may include, for example, removing 2310 or reducing the margin 2312 of a back-end product(s), increasing down payment 2314, reducing selling price 2316, increasing trade allowance 2318 and increasing ACV and trade allowance 2320. The method used to allow users to fix advance is further described below in the section entitled "Rolling Back an Amount Financed."

FIG. 24 illustrates a screen capture of an example user interface for correcting problems with payment in deal structure according to an example embodiment of the invention. When solving issues with payment, users may be presented with a "Payment Alert" window 2402. The current payment 2404, target (or max) payment 2406, required reduction to term 2408, rate 2410 and/or amount financed 2412 may be presented to users. To simplify resolving payment issues, only those items which resolve payment may be presented as adjustable items. In this regard, example embodiments may determine those items which may be adjusted to affect a determined advance issue(s) and present only those determined adjustable items. Such adjustable items may include, for example, extending term 2414, reducing base (buy) rate, spread or contract rate 2416, removing 2418 or reducing the margin 2420 of a back-end product(s) increasing down payment 2422, reducing selling price 2424, increasing trade allowance 2426, increasing ACV and trade allowance 2428, and/or the like. The method used to allow users to fix payment is further described below in the section entitled "Rolling Back Payment."

FIG. 25 illustrates a flowchart according to an example method for Prioritizing and Correcting Problems with Advance, Total Advance, and Payment in Deal Structure according to an example embodiment of the invention. The method may comprise prioritizing any potential problems. When a user edits a deal structure, the method may determine whether advance total advance, payment, or some combination thereof been exceeded.

Operation 2502 may comprise running a test to determine if the Amount Financed is greater than the Total Advance Amount. If the Amount Financed is determined to be greater than the Total Advance Amount (e.g., if "true") a test may be run to see if Advance @ Selling Price is greater than Advance Amount in operation 2504. If Advance @ Selling Price is determined to be greater than Advance Amount (e.g., if "true") two new amounts may be calculated using use five additional equations found below.

Advance Amount Differential=Advance Amount@Selling Price−Advance Amount [17]

Advance Amount@Selling Price=selling price+Trade Equity−down payment [18]

Trade Equity=trade allowance−payoff amount [19]

Total Advance Amount Differential=Amount Financed−Total Advance Amount−Total Product [20]

Total Product=warranty selling price+GAP selling price+Other 1 selling price+Other 2 selling price [21]

Operation 2506 may comprise running a test to determine if Total Advance Differential is greater than Advance Differential. If it is determined that Total Advance Differential is greater than Advance Differential (e.g., if "true"), first priority may be given to total advance in operation, when found in combination with advance 2508.

Operation 2510 may comprise running a test to determine if Payment is greater than Target Payment. If it is determined that Payment is greater than Target Payment (e.g., if "true"), third priority may be given to payment in operation 2512, when found in combination with total advance and advance as displayed in operation 2508.

In operation 2506, if it is determined that Total Advance Differential is less than or equal to Advance Differential (e.g., if "false"), first priority may be given to advance when it is found in combination with total advance in operation 2514.

Operation 2510 may comprise running a test to determine if Payment is greater than Target Payment. If it is determined that Payment is greater than Target Payment (e.g., if "true"), third priority may be given to payment in operation 2512, when found in combination with advance and total advance as displayed in operation 2514.

In operation 2504, if it is determined that Advance @ Selling Price is less than or equal to Advance Amount (e.g., if "false") first priority may be given to advance in operation 2516. Operation 2518 may comprise running a test to determine if Payment is greater than Target Payment. If it is determined that Payment is greater than Target Payment (e.g., if "true"), second priority may be given to payment in operation 2520, when found in combination with advance as displayed in operation 2516.

If it is determined in operation 2502 that the Amount Financed is less than or equal to the Total Advance Amount (e.g., if "false"), a test may be run to determine if Advance @ Selling Price is greater than Advance Amount, at operation 2522. If Advance @ Selling Price is determined to be greater than Advance Amount (e.g., if true), first priority may be given to advance in operation 2524.

Operation 2518 may comprise running a test to determine if Payment is greater than Target Payment. If it is determined that Payment is greater than Target Payment (e.g., if "true"), second priority may be given to payment in operation 2520, when found in combination with advance as displayed in operation 2524.

In operation 2522, if Advance @ Selling Price is less than or equal to Advance Amount (e.g., if "false"), a test may be run to determine if Payment is greater than Target Payment in operation 2526. If it is determined that Payment is greater than Target Payment (e.g., if "true"), first priority may be given to payment in operation 2528.

FIGS. 26a, 26b, and 26c illustrate a series of flowcharts according to an example method for Correcting Problems with Advance, Total Advance, and Payment in Deal Structure according to an example embodiment of the invention. In this regard, after priority has been established, the method may utilize the following paired user interfaces and methods. With reference to FIG. 26a, operation 2602 may comprise determining a user selection of an Advance Alert, such as via the user interface illustrated in FIG. 22. In response to determining the user selection, operation 2604 may comprise launching a method to Rollback Advance @ Selling Price, such as the illustrated and described with respect to FIG. 27. Referring now to FIG. 26b, operation 2606 may comprise determining a user selection of a Total Advance Alert, such as via the user interface illustrated in FIG. 23. In response to determining the user selection, operation 2608 may comprise launching a method to Rollback Amount Financed, such as the method illustrated and described with respect to FIG. 33. Referring now to FIG. 26c, operation 2610 may comprise determining a user selection of a Payment Alert, such as via the user interface illustrated in FIG. 24. In response to determining the user selection, operation 2612 may comprise launching a method to Rollback Payment, such as the method illustrated and described with respect to FIG. 36.

FIG. 27 illustrates a flowchart according to an example method for rolling back Advance at Selling Price according to an example embodiment of the invention. The method may comprise setting the Target Selling Reduction equal to Advance Differential, at operation 2702. The Advance Differential may be calculated according to equation [17]. Operation 2704 may comprise displaying the Target Selling Price Reduction determined in operation 2702 minus the Total Change in Value, which may be calculated using equation [22]. If the value determined in operation 2704 is negative, the value may be displayed with an indication of the negative value, such as, for example, by displaying the value in red text. Profit and Payment may also be updated (see, e.g., FIG. 20) and displayed, at operation 2706. On adjustment to down payment, selling price, trade allowance and/or ACV & trade allowance, Advance Differential may be recalculated, at operation 2708. When the user finds the number to be zero (0), the process may be complete.

Defining and Presenting Status of a Deal Structure

Many factors may affect the structure of a deal. To discover the status of a deal structure, one must check the current deal structure against the limits of payment, advance and total advance to determine if the deal is under, at or over those limits. Failure to understand the status of deal structure may result in deals not being optimized, deals being out-of-structure, and poor business decisions. Knowing the status of a deal structure may provide significant business value to users. Understanding the status of a deal structure takes time and can be difficult to understand.

Factors involved in defining the status of a deal structure may include, for example, back-end spread or back-end product, target payment, advance and/or total advance. Each of these may exist in a state of being available, maximized or exceeded. Payment, advance or total advance may be exceeded individually or in combination with each other. In addition to these factors, deals may become completed by payment or amount financed being rolled or by user choice.

Example embodiments of the invention may define and present deal structure conditions that may quickly enable users to know what, if anything, needs to be done next to complete a deal or bring it into structure.

In accordance with at least some embodiments of the invention, there may be three primary structure statuses: complete, incomplete and out-of-structure. Complete may include seven conditions. Incomplete may include two conditions. Out-of-structure may include nine conditions. The definition of out-of-structure conditions, where applicable, may include priority of correction as may be determined according to the method illustrated in FIG. 25. Below are the 18 conditions that may be defined and presented by embodiments of the invention:

01) Structure Status—Incomplete—Range of Back-end Available
02) Structure Status—Incomplete—Amount of Back-end Available
03) Structure Status—Out-of-structure—Exceeds Payment
04) Structure Status—Out-of-structure—Exceeds Advance
05) Structure Status—Out-of-structure—Exceeds Advance\Payment
06) Structure Status—Out-of-structure—Exceeds Advance\Total Advance
07) Structure Status—Out-of-structure—Exceeds Advance\Total Advance\Payment
08) Structure Status—Out-of-structure—Exceeds Total Advance
09) Structure Status—Out-of-structure—Exceeds Total Advance\Payment
10) Structure Status—Out-of-structure—Exceeds Total Advance\Advance
11) Structure Status—Out-of-structure—Exceeds Total Advance\Advance\Payment
12) Structure Status—Complete—All In—Payment Maxed
13) Structure Status—Complete—All In—Spread Applied & Advance Maxed
14) Structure Status—Complete—All In—Spread Applied & Total Advance Maxed
15) Structure Status—Complete—All In—Spread Applied & Advance & Total Advance Maxed
16) Structure Status—Complete—Payment Rolled to $ XXX.XX
17) Structure Status—Complete—Amount Financed Rolled to $ XX,XXX.XX
18) Structure Status—Complete—Complete As Structured FIG. 28 illustrates a screen capture of an example user interface for defining and presenting condition #12—"Structure Status—Complete—All In—Payment Maxed" 2802 according to an example embodiment of the invention.

FIG. 29 illustrates a screen capture of an example user interface for defining and presenting condition #16—"Structure Status—Complete—Payment Rolled" 2902 according to an example embodiment of the invention.

FIG. 30 illustrates a flowchart according to an example method for defining and presenting deal structure status according to an example embodiment of the invention. The method may provide three primary deal statuses: complete, incomplete and out-of-structure. Complete may have seven conditions. Incomplete may have two conditions. Out-of-structure may have nine conditions. See, e.g., the 18 example conditions listed above.

The method may begin by testing to determine if the user has enabled a checkbox or otherwise made a selection marking the deal "Complete as Structured," at operation 3002. If it is determined that the user has marked the deal "Complete as Structured" (e.g., "true"), the first complete structure may be found, at operation 3004. If it is determined that the user has not marked the deal "Complete as Structured" (e.g., "false"), a second test may be run to determine whether Back-end is Available, at operation 3006 (see, e.g., FIG. 7). If back-end is determined to be available, the method may comprise calculating available back-end spread and back-end product (operation 3008 (see, e.g., FIG. 6)) to determine which of the two (2) incomplete conditions apply (operation 3010). If back-end is determined to not be available (e.g. false), the method may comprise prioritizing problems with the deal structure (operation 3012 (see, e.g., FIG. 25)). Operation 3014 may comprise determining whether any of the out-of-structure conditions that may be determined or otherwise defined by the method of FIG. 25 apply. If any do apply, the structure may be defined by one of the nine (09) Out-of-structure conditions, which may be displayed at 3016 (see, e.g., FIG. 25).

When it is determined that no out-of-structure conditions apply in operation 3014, operation 3018 may comprise running a test on the payment (e.g., monthly payment) to determine whether the payment equals a target payment. When the payment is determined to equal the target payment, operation 3020 may comprise determining that the deal structure is "Complete All In Payment Maxed," which may be displayed to the user. On the other hand, if it is determined that payment does not equal the target payment, operation 3022 may comprise determining whether the available back-end spread equals zero (0).

If the available back-end spread is determined to be equal to zero, operation 3024 may comprise determining whether the Advance @ Selling Price equals the Advance Amount. If the Advance @ Selling Price is determined to equal the advance amount, operation 3026 may comprise determining whether the Total Advance Amount equals the Amount Financed. When the total advance amount equals the amount financed, operation 3028 may comprise defining the structure as "Complete All In Spread Applied Advance & Total Advance Maxed," which may be displayed. When total advance amount does not equal the amount financed, operation 3030 may comprise defining the structure as "Complete All In—Spread Applied & Advance Maxed," which may be displayed. When it is determined in operation 3024, that advance @ selling price is determined to not be equal to the advance amount, operation 3032 may comprise defining the structure as "Complete All In Spread Applied & Total Advance Maxed," which may be displayed to the user.

When it is determined in operation 3022 that available back-end spread does not equal zero (0), operation 3034 may comprise determining whether the payment has been rolled. If the payment has been rolled, operation 3036 may comprise defining the structure as "Complete—Payment Rolled," which may be displayed to the user. When it is determined in operation 3034 that payment has not been rolled, operation 3038 may comprise defining the structure as "Complete—Amount Financed Rolled," which may be displayed to the user.

Rolling Back an Amount Financed

At times, dealership staff may discover that a deal is over advanced or learn from the lender that they need to reduce the amount financed. Existing desking tools and dealer management systems may perform a function known as "rolling back" an amount financed. In this regard, mathematical equations may be used to discover the change to an individual variable (such as selling price or down payment) that is needed to achieve a given reduction in amount financed. However these existing solutions only allow users to solve or "roll" a single variable at a time. To make a change or solve for a second variable, one may need to begin the process over by selecting the new variable they wish to solve for.

Desking tools and dealer management systems which provide for rolling only one variable at a time may limit the user's ability to structure deals. There are a number of factors, each of which may have a different effect upon gross profit, that may be adjusted which also result in reducing an amount financed. They may include, for example, reducing selling price of the vehicle, reducing the selling price of back-end products (as allowed by State law), eliminating back-end products from the transaction, increasing down payment, increasing trade allowance, increasing actual cash value of trade, and/or the like.

FIG. 31 illustrates a screen capture of an example user interface for rolling back an amount financed according to an example embodiment of the invention. Embodiments of the invention may allow users to quickly roll back an amount financed by entering a target amount 3102, instantly seeing the required adjustment to the amount financed 3104 and simultaneously seeing the required adjustment, and allowing adjustment, to each applicable variable including: removing a back-end product 3106, reducing the price of a back-end product 3108, increasing down payment 3110, reducing selling price 3112, increasing trade allowance 3114, increasing the actual cash value (ACV) and trade allowance 3116.

FIG. 32 illustrates a screen capture of an example user interface for rolling back an amount financed according to an example embodiment of the invention. At least some embodiments of the invention may allow users to see (e.g., instantly) the effect of any single change 3202, or a combination of changes, upon the remaining required adjustment 3204 and each of the other variables and may display remaining adjustment required on each variable 3206 and the effect of the changes upon front-end gross 3208, back-end gross 3210, total gross 3212 and payment 3214.

The ability to manipulate each the individual components of the deal structure while instantly showing the remaining adjustments required and the effect of the adjustments on front-end gross, back-end gross, total gross, and payment may provide significant benefit to dealerships. In addition to saving time, example embodiments of the invention may help dealerships properly structure deals and optimize profitability.

FIG. 33 illustrates a flowchart according to an example method for Rolling Back an Amount Financed according to an example embodiment of the invention.

The method may comprise determining a Target Amount Financed, at operation 3302. This determination may be based upon a target amount financed value entered by the user, such as in response to a solicitation. After that value is determined, the method may comprise calculating the current Amount Financed using equation [3], at operation 3304. Operation 3306 may comprise subtracting Target Amount Financed from Amount Financed to determine the Target Amount Financed Reduction. The method may further comprise calculating and displaying the Target Amount Financed Reduction minus Total Change in Value, at operation 3308. When this value is negative, an indication may be provided to the user to indicate that the value is negative. For example, the value may be displayed in red text. See, e.g., FIG. 31. Equations [22]-[24] as set forth below may be used to calculate the Total Change in Value.

$$\text{Total Change in Value} = \text{Amount Financed Change} + \text{Product Change} \quad [22]$$

$$\text{Amount Financed Change} = \text{down payment change} + \text{selling price change} + \text{trade allowance change} + \text{sales tax change} \quad [23]$$

$$\text{Product Change} = \text{warranty change} + \text{GAP change} + \text{other 1 value change} + \text{other 2 value change} \quad [24]$$

Operation 3310 may comprise updating the Profit and Payment may also be updated (see, e.g., FIG. 20).

Adjustments may also be made to back-end products. If a warranty, GAP insurance or other product has been added to the deal, then it may be removed from the deal or its selling price reduced to balance the deal, at operation 3312. The reduction may be governed by the amount of margin earned on the product. Adjustments may also be made to amount financed by adjusting down payment, selling price, trade allowance, and/or ACV & trade allowance, at operation 3314. When adjustments are made in operation 3312 and/or operation 3314, the method may return to operation 3304 such that Amount Financed and Target Amount Financed Reduction less Total Change in Value may be recalculated. The screen may be updated with the new values. The changes may also be reflected in the Profit and Payment section on the right hand side, such as by using the method illustrated in FIG. 20 to update the Profit and Payment.

Rolling Back a Payment

At times dealership staff may find they need to reduce a payment. Desking tools and dealer management systems may perform a function known as "rolling back" a payment. In this regard, mathematical equations may be used to discover the change to an individual variable (such as selling price, term, interest rate or down payment) that is needed to achieve a given reduction in payment. These solutions may allow users to solve or "roll" a single variable at a time. To solve or make a change to a second variable, however, existing desking tools and dealer management systems may require a user to begin the process over by selecting the new variable they wish to solve for.

Desking tools and dealer management systems which provide for only rolling one variable at-a-time limit the user's ability to optimally structure their deals. There are a number of factors, each having a different effect upon gross profit, that can be adjusted which also result in reducing a payment. These factors may include, for example, adjusting the term of the loan, adjusting the interest buy rate, back-end spread or contract rate, reducing selling price of the vehicle, reducing the selling price of back-end products, eliminating back-end products from the transaction, increasing down payment, increasing trade allowance, increasing actual cash value of trade, and/or the like.

FIG. 34 illustrates a screen capture of an example user interface for rolling back a payment according to an example embodiment of the invention. Embodiments of the invention may accordingly address this problem by allowing users to quickly roll back a payment. In this regard, a user may enter a target payment 3402. In response to entry of the target payment, the required adjustment to term, rate and/or amount financed 3404 may be presented to the user. The user may then adjust any one or a combination of the applicable variables including, for example, term 3406, base (buy) rate, back-end spread or contract rate 3408, removing a back-end product 3410, reducing the price of a back-end product 3412, increasing down payment 3414, reducing selling price 3416, increasing trade allowance 3418, increasing the actual cash value (AVC) and/or trade allowance 3320, in order to roll back the payment to the target payment. In response to user adjustment of a variable, the payment as currently structured and the amounts 3404 may be recalculated so as to indicate to the user the effect of the adjustments and how much further the user needs to rollback one or more variables to achieve the target payment.

FIG. 35 illustrates a screen capture of an example user interface for rolling back a payment according to an example embodiment of the invention. Example embodiments of the invention may allow users to see (e.g., instantly) the effect of any single change 3502, or a combination of changes, upon the remaining required adjustment to rate, term or amount financed 3504 and/or other variables and may display remaining adjustment required on each variable 3506 and the effect of the changes upon front-end gross 3508, back-end gross 3510, total gross 3512 and payment 3514.

The ability to manipulate each of the individual components of the deal structure while instantly showing the remaining adjustment required and the effect of the adjustments to both gross profit and payment may help the dealer structure and optimize deals.

FIG. 36 illustrates a flowchart according to an example method for rolling back payment according to an example embodiment of the invention. The method may comprise determining a target (new) payment, at operation 3602. This determination may be based upon a target payment value entered by the user, such as in response to a solicitation. After that value is determined, the method may comprise calculating the Amount Financed using equation [3], at operation 3604. Operation 3606 may comprise calculating the Principle using equation [10] by using the New Payment determined in operation 3602. The calculated principle may be subtracted from Amount Financed to find Target Amount Financed Reduction, at operation 3608. Operation 3610 may comprise subtracting the Total Change in Value, which may be calculated using equation [22], from Target Amount Financed Reduction. The value determined in operation 3610 may be displayed to the user. When this value is negative, an indication may be provided to the user to indicate the value is negative. This indication may, for example, comprise displaying the value in red. See, e.g., 3702 in FIG. 37. The following equation may be used to find Present Value.

$$\text{Present Value} = \text{Amount Financed} - \text{Total Change in Value} \qquad [25]$$

Operation 3612 may comprise determining the Term using equation [12] by using the target (New) payment and Present Value. The difference between the new term and the current term may then be determined and displayed, in operation 3614. (When this value is negative, an indication may be provided to the user to indicate the value is negative. This indication may, for example, comprise displaying the value in red. See, e.g., FIG. 3704 in 37. Rate may be calculated in operation 3616, such as by using the method illustrated in FIG. 38. The difference between the new rate and the current rate may then be displayed, at operation 3618. When this value is negative, an indication may be provided to the user to indicate the value is negative. This indication may, for example, comprise displaying the value in red. See, e.g., 3706 in FIG. 37. Operation 3620 may comprise updating the Profit and Payment, such as in accordance with the method illustrated in FIG. 20.

Adjustments may be made to finance terms: term, buy rate, back-end spread and/or contract rate, at operation 3622. Adjustments can also be made to back-end products, at operation 3624. If a warranty, GAP insurance or other product has been added to the deal then one or more products may be removed or the selling price reduced. The reduction may be governed by the amount of margin earned on the product. Adjustments may also be made to amount financed: down payment, selling price, trade allowance and ACV & trade allowance, at operation 3626. In response to an adjustment made at operation 3622, 3624, and/or 3626, the method may return to operation 3604 such that the Amount Financed may be recalculated and the method may run again.

FIG. 38 illustrates a flowchart according to an example method for determining the rate at present value according to an example embodiment of the invention. The method may use the Payment [11] equation introduced earlier and shown below to find what the interest rate would be assuming the Present Value [25] as principle, using the current term and target payment.

Target Payment=Present Value*((1+Days/30*(Rate/ 1200))/(((1−1/((1+Rate/1200)^Term))/(Rate/ 1200))*(Rate/1200+1)))

The method may comprise running an iterative calculation to find the rate. The first iteration of the calculation may use a given interest rate 3802 and increment variable 3804. A test payment may be calculated with the initial rate, term and/or Present Value [25] as principle, at operation 3806. Operation 3808 may comprise comparing the test payment to the target payment. If the test payment is less than or equal to the target payment, the calculation of operation 3806 may be iteratively re-run by increasing the rate by the increment variable at operation 3810 until the limit of target payment is exceeded.

When it is determined in operation 3808 that target payment is exceeded, interest rate may reduced by the increment variable, at operation 3812. Operation 3814 may comprise returning the resulting rate as Rate @ Present Value.

Applying Changes to a Deal Structure to Other Saved Deals

Allowing a user to change components of a deal structure may affect factors that may influence other new or saved deal structures for that same customer. Failure to make those changes, if appropriate in other new or saved Deals, may result in deals being improperly structured or not optimized. The specific components that can influence other deal structures may include, for example, down payment, trade allowance, actual cash value of trade, and/or the like.

Accordingly, example embodiments of the invention may facilitate application of changes to a deal structure to other new or saved deals. Such example embodiments may ensure the desired changes are reflected properly in all deals.

FIG. 39 illustrates a screen capture of an example user interface for applying changes to a deal structure to other saved deals according to an example embodiment of the invention. When a user saves a deal and they have changed down payment 3902, trade allowance 3904 or actual cash value of trade 3906, a window (e.g., a popup window) 3908 may be displayed alerting the user that these values are different in other saved deals. An opportunity may then be provided to the user to apply those changes to the current deal only 3910, other saved deals 3912 and/or to the base values stored in customer information 3914.

FIG. 40 illustrates a flowchart according to an example method for applying changes to a deal structure to other deals, such as a saved deal, according to an example embodiment of the invention. Operation 4002 may comprise saving a deal, such as in response to a user command. In response to a deal being saved, the method may determine whether one or more values have been changed from previously saved values for the deal. For example, operation 4004 may comprise determining whether the initial down payment is equal to a current down payment. If it is determined that the down payment value has changed (e.g., initial down payment is not equal to current down payment), the changed down payment value may be added to a list for presentment to the user, at operation 4010. Operation 4006 may comprise determining whether the initial trade allowance is equal to the current trade allowance value. If it is determined that the trade allowance value has changed (e.g., initial trade allowance is not equal to current trade allowance), the changed trade allowance value may be added to a list for presentment to the user, at operation 4010. Operation 4008 may comprise determining whether the initial ACV is equal to the current ACV. If it is determined that the ACV has changed (e.g., initial ACV is not equal to current ACV), the changed ACV value may be added to a list for presentment to the user, at operation 4010. When one or more items/values have been added to the list (e.g., in operation 4010), the list may be presented to the user with the initial and new values of the items displayed, at operation 4012.

The user may then select where the new values are to be saved and click "Apply" 4014, (see for example 3916, FIG. 39) which may initiate the process 4016 illustrated in FIG. 41. Alternatively, the user may click "Cancel" 4018 (see for example 3918, FIG. 39) to close the window without saving the deal 4020.

FIG. 41 illustrates a flowchart according to an example process to apply changes according to an example embodiment of the invention. The process may comprise determining whether the changes are to be applied to this deal only, at operation 4102. This determination may, for example, be made based on user input received over the interface 3910 illustrated in FIG. 39). If the changes are to be applied to this deal only, changed values may be saved to the deal, at operation 4104. If the changes are not to be applied to "This Deal Only," a test may be run to determine whether the changes are to be applied to all saved deals, at operation 4106. This determination may, for example, be made based on user input received through the interface 3912 illustrated in FIG. 39. If it is determined that the changes are to be applied to all saved deals, changed values may be saved to the current deal and all saved deals, at operation 4108. Operation 4110 may comprise determining whether the changes are to be applied to customer information. This determination may, for example, be made based on user input received over the interface 3914 illustrated in FIG. 39. If the changes are to be applied to the customer information, the values may also be saved at the Customer Information level, at operation 4112.

Defining and Presenting Advance at Selling Price (Including the Limitations to Advance) and Total Advance at Amount Financed When calculating potential deals from inventory, desking tools may return to a user a list of vehicles sorted by front-end gross profit. In addition, a user may wish to know the calculated rate of Advance at Selling Price or Total Advance at Amount Financed with that list. Displaying these percentage rates may give the user unique and previously overlooked benefits.

First, these rates may directly relate to the method of Calculating and Presenting Available Back-end Spread and Back-end Product illustrated in FIG. 6. Seeing these percentage rates in a snap shot or at-a-glance view may help users understand the reason that back-end is available. Secondly, these rates may provide users with a more complete view of the financial structure of a particular vehicle as it relates to the lender.

When making decisions about loan approvals, lenders may approve not only the customer but also the collateral. The advance rates may show how the collateral is positioned relative to its loan-to-value. Knowing this may be the difference between a customer/deal being approved or turned down. Presenting a deal structure with an advance and total advance (loan-to-value) that is more favorable to the lender often may be a determining factor in whether an application for financing is approved, conditioned or turned down.

In calculating structures, there are times when advance (the amount of money a lender is willing to loan against a specific piece of collateral (vehicle)) is limited. A number of factors may limit advance and understanding those factors is difficult.

Failure to understand the limiting factors may result in confusion and/or poor business decisions. Readily providing this information may have significant business value to users. No existing desking tools or dealer management systems define or explain to the user the reasons advance has been limited.

Limitations to Advance may result from one of five (5) conditions:
Advance limited to (XXX.XX %) by Total Advance
Advance limited to (XXX.XX %) by Max Payment
Advance reduced to (XXX.XX %) by Advertised Price
Advance reduced to (XXX.XX %) by Book Value+$ XXX.XX
Advance reduced to (XXX.XX %) on Saved Structure FIGS. 42 and 43 illustrate screen captures of an example user interface for defining and presenting advance at selling price (including the limitations to advance) and total advance at amount financed according to an example embodiment of the invention. Accordingly, embodiments of the invention may address existing deficiencies by defining and presenting Advance at Selling Price (including the Limitations to Advance) and/or Total Advance at Amount Financed. In the example user interface illustrated in FIG. 42, two columns present to users the calculated amounts of Advance at Selling Price (Adv @ SP) 4202 and Advance at Amount Financed (Adv @ AF) 4204.

At least some embodiments of the invention may present and define to the user Advance at Selling Price. When a user positions a cursor over or otherwise selects an amount in the left hand column, a pop window 4206 may be displayed that presents to the user defined limits of advance 4208 and total advance 4210 for this structure. If advance has been limited by one of the five conditions listed above, additional text may present the reason for such limitation. For example, "Advance limited to 104.83% by Total Advance" 4212, "Advance limited to 101.73% by Advertised Price" 4302, and/or the like may be displayed.

FIG. 44 illustrates a flowchart according to an example method for defining and presenting Advance @ Selling Price and Advance @ Amount Financed according to an example embodiment of the invention. The method may comprise calculating and displaying the Advance @ Selling Price (e.g., using equation [26]), at operation 4402. Operation 4404 may comprise calculating and displaying the Advance @ Amount Financed, which may be calculated using equation [27]. Operations 4402 and 4404 may, for example, be performed for each vehicle in inventory or that meets certain buyer criteria. When a user positions the cursor over or otherwise selects one of the Advance @ Selling Price amounts, a descriptive box (e.g., a popup box) may be displayed to present Advance, at operation 4406 (see 4208, e.g., FIG. 42), and/or Total Advance, at operation 4408 (see 4210, e.g., FIG. 42). A descriptive box illustrated by operation 4406 and/or 4408 may describe the reason, if one exists, for limitation to Advance (see, e.g., 4212 in FIG. 42).

FIG. 45 illustrates a flowchart according to an example method for defining and presenting Advance @ Selling Price and Advance @ Amount Financed according to an example embodiment of the invention. The method illustrated in FIG. 45 may comprise first calculating Payment using equation [1] at Operation 4502, Total Advance Amount using equation [2] at Operation 4504, Amount Financed using equation [3] at Operation 4506 and Selling Price using equation [6] at operation 4508. Next tests may be run to determine if advance has been limited. Operation 4510 may comprise determining whether amount financed is equal to total advance amount. If Amount Financed is equal to Total Advance Amount, then Advance was limited by Total Advance, indication of which may be displayed at operation 4512. Operation 4514 may comprise determining whether calculated Monthly Payment is equal to Target Payment. If the payment is equal to the target payment, then Advance was limited by Target Payment, indication of which may be displayed at operation 4516. Operation 4518 may comprise determining whether the Selling Price is equal to Advertised Price. If the selling price is equal to the advertised price, then Advance was reduced by the Advertised Price, indication of which may be displayed at operation 4520. Operation 4522 may comprise determining whether Selling Price is equal to Book Value plus a dealer specified offset. If the selling price is equal to book value plus a dealer specified offset, then Advance was reduced by Book Value plus the offset, indication of which may be displayed at operation 4524. Operation 4526 may comprise determining whether the deal in question is a saved deal and whether Advance @ Selling Price (e.g., the value calculated using equation [26]) is less than advance. If both conditions determined in operation 4526 are true, then Advance was reduced based on the saved structure, indication of which may be displayed in operation 4528.

In this regard, by the method of FIG. 45, if advance has been limited, advance and total advance may be displayed along with the reason for the limitation or reduction to advance including the value of Advance @ Selling Price, such as may be calculated using equation [26]. If none of the above conditions are met, then the advance and total advance may be displayed without a reason for limitation or reduction.

Defining and Presenting the Relationship of Advance to Selling Price

When structuring deals it may be necessary that dealership staff stay beneath the limits of advance and total advance. Understanding how total advance is derived and compares to the amount financed may be straight forward. The amount financed may be directly presented on a Vehicle Buyer's Order. That number may then be compared directly to a total advance number.

Understanding how advance relates to the selling price of a vehicle is not as straight forward. The advance number in some cases may be compared directly to selling price but in many cases cannot. More experienced dealership staff may be aware of how selling price relates to advance, but less experienced staff often are not.

Failure to understand the relationship between advance and selling price may result in confusion and/or poor business decisions. Readily explaining this relationship may have significant business value as a training aid. Accordingly, embodiments of the invention may address deficiencies in existing art Embodiments of the invention may accordingly address this deficiency by quickly Defining and Presenting the Relationship of Advance to Selling Price. FIGS. 46 and 47 illustrate screen captures of an example user interface for defining and presenting the relationship of advance to selling price according to an example embodiment of the invention. When a user positions a cursor over or otherwise selects the asterisk 4602 in the Advance box, a descriptive window 4604 may define what is being presented to users. At least some embodiments of the invention may present and define to the user how Advance at Selling Price is calculated when a structure includes Negative Trade Equity 4606. A similar descriptive window 4702 may be provided for structures that include Positive Trade Equity 4704.

FIG. 48 illustrates a flowchart according to an example method for defining and presenting the relationship of advance to selling price according to an example embodiment of the invention. The method may be triggered or otherwise implemented, for example, in response to a user positioning the cursor over or otherwise selecting the asterisk or label Adv. @ Selling Price, at operation 4802. The method may comprise calculating Selling Price using equation [6] at operation 4804. The method may display Selling Price, at operation 4806. Operation 4808 may comprise calculating the Trade Equity, such as by using equation [19]. The method may additionally comprise running a test to determine if the trade equity is a positive or negative amount, at operation 4810.

If the Trade Equity is negative, a note or other alert regarding the effect of the Negative Trade Equity may be displayed, at operation 4812 (see, e.g., 4606 in FIG. 46). If the Trade Equity is positive, a note or other alert regarding the effect of the Positive Trade Equity may be displayed, at operation 4814 (see, e.g., 4704 in FIG. 47). Operations 4816 and 4818 may comprise displaying the trade equity and down payment amount, respectively. The method may further comprise using the selling price, trade equity and down payment to calculate the Advance Amount @ Selling Price using equation [18], at operation 4820. Operation 4822 may comprise displaying the value calculated in operation 4820. Selling price 4804, trade equity 4808, down payment 4818 and/or Advance @ Selling Price 4820 may, for example, be displayed in a simple equation to illustrate how Advance @ Selling Price is derived.

Example Embodiment for Facilitating Financing of a Product Transaction

FIG. 49 illustrates a flowchart according to an example method for facilitating financing of a product transaction according to an example embodiment of the invention. The operations illustrated in and described with respect to FIG. 49 may, for example, be performed by, under the direction of, and/or with the assistance of the processor 202, communication interface 206, display 208, user input interface 210, or combination thereof. Operation 4900 may comprise determining a maximum available back-end product for the product transaction as a function of one or more of a target payment limit or a total advance limit. Operation 4910 may comprise determining a maximum available back-end spread for the product transaction as a function of the target payment limit. Operation 4920 may comprise presenting the maximum available back-end product and the maximum available back-end spread.

Although not illustrated in FIG. 49, the method may optionally include determining the target payment limit. Determining the target payment limit may, for example, comprise by determining a target payment limit provided by a user (e.g., via the user input interface 210). Additionally or alternatively, determining the target payment limit may comprise determining a target payment limit imposed by a lender financing the transaction. As a further example, determining the target payment limit may comprise receiving or accessing the target payment limit from a data source 104.

Further, although not illustrated in FIG. 49, the method may optionally include determining a total advance limit. Determining the total advance limit may, for example, comprise determining the total advance limit based on one or more of customer qualifications, a product being purchased, a total advance limit imposed by a lender financing the transaction, and/or the like. In an example embodiment, determining the total advance limit may comprise receiving or accessing the advance limit from a data source 104.

Example Embodiment for Facilitating Rollback of an Amount Financed and/or a Payment Amount FIG. 50 illustrates a flowchart according to an example method for facilitating rollback of one or more of an amount financed or a payment amount for a product transaction according to an example embodiment of the invention. The operations illustrated in and described with respect to FIG. 50 may, for example, be performed by, under the direction of, and/or with the assistance of the processor 202, communication interface 206, display 208, user input interface 210, or combination thereof. Operation 5000 may comprise providing a plurality of adjustable items that may be adjusted to rollback the one or more of the amount financed or the payment amount. Providing the plurality of adjustable items may, for example, comprise causing the plurality of adjustable items to be displayed on a user interface configured to enable a user to adjust one or more of the adjustable items. Although not illustrated, the method may further comprise determining the provided plurality of adjustable items prior to operation 5000. The plurality of adjustable items may be determined based at least in part on whether the amount financed is to be rolled back, the payment amount is to be rolled back, or both the amount financed and the payment amount are to be rolled back. In this regard, in an example embodiment, only those items for which adjustment may affect the one or more of the amount financed or the payment amount to be rolled back may be provided.

Operation 5010 may comprise determining an adjustment of one or more adjustable items. In this regard, operation 5010 may, for example, comprise determining a user adjustment of one or more adjustable items made via a user interface. Operation 5020 may comprise determining one or more of an adjusted amount financed or an adjusted payment amount based at least in part on the determined adjustment. Operation 5020 may additionally comprise determining the effects of the adjustment upon one or more of payment or profit so as to determine an adjusted payment and/or an adjusted profit. Operation 5030 may comprise providing the determined one or more of the adjusted amount financed or the adjusted payment amount. Operation 5030 may additionally comprise providing one or more of adjusted payment or adjusted profit when determined in operation 5020.

Summary

The flowcharts described herein comprise flowcharts of systems, methods, and computer program products according to example embodiments of the invention It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices (e.g., the memory 204) in a computing device and executed by a processor (e.g., the processor 202) in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus (e.g., the deal structuring device 102, apparatus illustrated in FIG. 2, and/or other programmable apparatus) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (e.g., the deal structuring device 102, apparatus illustrated in FIG. 2, and/or other programmable apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, may be implemented by special purpose hardware-based computer systems which perform the specified functions or steps, or combinations of special purpose hardware and computer instructions.

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for facilitating financing of a product transaction, the method comprising:
    determining a maximum available back-end product for the product transaction as a function of one or more of a target payment limit or a total advance limit;
    determining, by a processor, a maximum available back-end spread for the product transaction as a function of one or more of the target payment limit or a spread limit;
    determining whether there is a dependency between available back-end spread and available back-end product for the product transaction; and
    presenting the maximum available back-end product and the maximum available back-end spread based on the dependency determination.

2. The method of claim 1, further comprising determining the total advance limit based on one or more of customer qualifications, a product being purchased, or a total advance limit imposed by a lender financing the transaction.

3. The method of claim 1, wherein determining a maximum available back-end product comprises determining an amount of principle that can be added to current principle within limits imposed by one or more of the total advance limit or the target payment limit as a function of an interest rate and a term for financing the product transaction.

4. The method of claim 1, wherein determining a maximum available back-end product comprises:
    determining an available principle at the total advance limit;
    determining an available principle at the target payment limit;
    determining the lesser of the available principle at the total advance limit and the available principle at the target payment limit; and
    determining the maximum available back-end product to be the lesser of the available principle at the total advance limit and the available principle at the target payment limit.

5. The method of claim 1, wherein determining a maximum available back-end spread comprises determining an amount of interest rate spread that can be added to a current interest rate for financing the product transaction within a limit imposed by the target payment as a function of a principle and a term for financing the product transaction.

6. The method of claim 1, wherein determining a maximum available back-end spread comprises determining a maximum available back-end spread as a function of a spread cap limit imposed by a law applicable to the product transaction, lender, or dealer, the maximum available back-end spread being determined so that a sum of the determined maximum available back-end spread and current spread does not exceed a limit imposed by the spread cap limit.

7. The method of claim 1, further comprising determining whether there is a dependency between available back-end spread and available back-end product; and
    wherein presenting the maximum available back-end product and the maximum available back-end spread comprises:
        presenting the maximum available back-end product and the maximum available back-end spread as flat values in an instance in which it is determined that there is not a dependency between available back-end spread and available back-end product; or
        presenting the maximum available back-end product as a range of values depending on available back-end spread, and presenting the maximum available back-end spread as a range of values depending on available back-end product, in an instance in which it is determined that there is a dependency between available back-end spread and available back-end product.

8. The method of claim 7, further comprising, in an instance in which it is determined that there is a dependency between available back-end spread and available back-end product:
determining a remaining back-end spread as a function of the determined maximum available back-end product; and
determining a remaining back-end product as a function of the determined maximum available back-end spread; and wherein:
presenting the maximum available back-end product as a range of values comprises presenting the maximum available back-end product as a range from the determined remaining back-end product to the determined maximum available back-end product; and
presenting the maximum available back-end spread as a range of values comprises presenting the maximum available back-end spread as a range from the determined remaining back-end spread to the determined maximum available back-end spread.

9. The method of claim 1, wherein presenting the maximum available back-end product and the maximum available back-end spread comprises directing display of the maximum available back-end product and maximum available back-end spread on a user interface configured to allow a user to apply available back-end product and available back-end spread by adjusting one or more adjustable items of a deal structure for the product transaction.

10. The method of claim 9, wherein the one or more adjustable items comprise one or more of term, a time period until first payment, participation, base rate, spread, contract rate, cost of a back-end product, margin of a back-end product, or selling price of a back-end product.

11. The method of claim 9, further comprising:
determining an adjustment of one or more adjustable items;
determining an adjusted payment based at least in part on the determined adjustment;
determining an adjusted profit based at least in part on the determined adjustment; and
directing display of the adjusted payment and the adjusted profit.

12. The method of claim 1, further comprising:
determining whether a deal for the product transaction is out of structure; and, in an instance in which it is determined that the deal is out of structure:
determining one or more problems causing the deal to be out of structure; and
providing indication of the determined problems.

13. The method of claim 12, wherein the determined one or more problems comprise problems with one or more of advance, total advance, or payment.

14. The method of claim 12, further comprising, in an instance in which it is determined that the deal is out of structure:
determining a priority of the determined problems; and
providing an indication of the determined priority.

15. The method of claim 12, further comprising, in an instance in which it is determined that the deal is out of structure:
providing one or more adjustable items that a user may adjust to resolve a selected problem;
determining an adjustment of one or more of the adjustable items;
determining an effect of the determined adjustment on the deal structure; and
providing an indication of any remaining adjustment required to correct the selected problem.

16. An apparatus for facilitating financing of a product transaction, wherein the apparatus comprises at least one processor, the at least one processor configured to cause the apparatus to at least:
determine a maximum available back-end product for the product transaction as a function of one or more of a target payment limit or a total advance limit;
determine a maximum available back-end spread for the product transaction as a function of the target payment limit;
determine whether there is a dependency between available back-end spread and available back-end product for the product transaction; and
present the maximum available back-end product and the maximum available back-end spread based on the dependency determination.

17. The apparatus of claim 16, wherein the at least one processor is further configured to cause the apparatus to determine the total advance limit based on one or more of customer qualifications, a product being purchased, or a total advance limit imposed by a lender financing the transaction.

18. The apparatus of claim 16, wherein the at least one processor is configured to cause the apparatus to determine a maximum available back-end product by determining an amount of principle that can be added to current principle within limits imposed by one or more of the total advance limit or the target payment limit as a function of an interest rate and a term for financing the product transaction.

19. The apparatus of claim 16, wherein the at least one processor is configured to cause the apparatus to determine a maximum available back-end product by:
determining an available principle at the total advance limit;
determining an available principle at the target payment limit;
determining the lesser of the available principle at the total advance limit and the available principle at the target payment limit; and
determining the maximum available back-end product to be the lesser of the available principle at the total advance limit and the available principle at the target payment limit.

20. The apparatus of claim 16, wherein the at least one processor is configured to cause the apparatus to determine a maximum available back-end spread by determining an amount of interest rate spread that can be added to a current interest rate for financing the product transaction within a limit imposed by the target payment as a function of a principle and a term for financing the product transaction.

21. The apparatus of claim 16, wherein the at least one processor is configured to cause the apparatus to determine a maximum available back-end spread by determining a maximum available back-end spread as a function of a spread cap limit imposed by a law applicable to the product transaction, lender, or dealer, the at least one processor being configured to cause the apparatus to determine the maximum available back-end spread so that a sum of the determined maximum available back-end spread and current spread does not exceed a limit imposed by the spread cap limit.

22. The apparatus of claim 16, wherein the at least one processor is configured to further cause the apparatus to determine whether there is a dependency between available back-end spread and available back-end product; and wherein the at least one processor is configured to cause the apparatus to present the maximum available back-end product and the maximum available back-end spread by:
presenting the maximum available back-end product and the maximum available back-end spread as flat values in an instance in which it is determined that there is not a dependency between available back-end spread and available back-end product; and
presenting the maximum available back-end product as a range of values depending on available back-end spread, and presenting the maximum available back-end spread as a range of values depending on available back-end product, in an instance in which it is determined that there is a dependency between available back-end spread and available back-end product.

23. The apparatus of claim 22, wherein the at least one processor is configured to further cause the apparatus, in an instance in which it is determined that there is a dependency between available back-end spread and available back-end product, to:
determine a remaining back-end spread as a function of the determined maximum available back-end product; and
determine a remaining back-end product as a function of the determined maximum available back-end spread; and wherein:
presenting the maximum available back-end product as a range of values comprises presenting the maximum available back-end product as a range from the determined remaining back-end product to the determined maximum available back-end product; and
presenting the maximum available back-end spread as a range of values comprises presenting the maximum available back-end spread as a range from the determined remaining back-end spread to the determined maximum available back-end spread.

24. The apparatus of claim 16, wherein the at least one processor is configured to cause the apparatus to present the maximum available back-end product and the maximum available back-end spread by directing display of the maximum available back-end product and maximum available back-end spread on a user interface configured to allow a user to apply available back-end product and available back-end spread by adjusting one or more adjustable items of a deal structure for the product transaction.

25. The apparatus of claim 24, wherein the one or more adjustable items comprise one or more of term, a time period until first payment, participation, base rate, spread, contract rate, cost of a back-end product, margin of a back-end product, or selling price of a back-end product.

26. The apparatus of claim 24, wherein the at least one processor is configured to further cause the apparatus to:
determine an adjustment of one or more adjustable items;
determine an adjusted payment based at least in part on the determined adjustment;
determine an adjusted profit based at least in part on the determined adjustment; and
direct display of the adjusted payment and the adjusted profit.

27. The apparatus of claim 16, wherein the at least one processor is configured to further cause the apparatus to:
determine whether a deal for the product transaction is out of structure; and, when in an instance in which it is determined that the deal is out of structure:
determine one or more problems causing the deal to be out of structure; and
provide indication of the determined problems.

28. The apparatus of claim 27, wherein the determined one or more problems comprise problems with one or more of advance, total advance, or payment.

29. The apparatus of claim 27, wherein the at least one processor is configured to further cause the apparatus, in an instance in which it is determined that the deal is out of structure, to:
determine a priority of the determined problems; and
provide an indication of the determined priority.

30. The apparatus of claim 27, wherein the at least one processor is configured to further cause the apparatus, in an instance in which it is determined that the deal is out of structure, to:
provide one or more adjustable items that a user may adjust to resolve a selected problem;
determine an adjustment of one or more of the adjustable items;
determine an effect of the determined adjustment on the deal structure; and
provide an indication of any remaining adjustment required to correct the selected problem.

31. The apparatus of claim 16, wherein the apparatus further comprises at least one memory storing instructions that when executed by the at least one processor cause the apparatus to at least:
determine the maximum available back-end product for the product transaction as a function of one or more of the target payment limit or the total advance limit;
determine the maximum available back-end spread for the product transaction as a function of the target payment limit; and
present the maximum available back-end product and the maximum available back-end spread.

32. A computer program product for facilitating financing of a product transaction, the computer program product comprising at least one non-transitory computer-readable storage medium having computer-readable program instructions stored therein, the computer-readable program instructions comprising:
program instructions configured to determine a maximum available back-end product for the product transaction as a function of one or more of a target payment limit or a total advance limit;
program instructions configured to determine a maximum available back-end spread for the product transaction as a function of the target payment limit;
program instructions configured to determine whether there is a dependency between available back-end spread and available back-end product for the product transaction; and
program instructions configured to present the maximum available back-end product and the maximum available back-end spread based on the dependency determination.

* * * * *